US012737339B2

(12) United States Patent
Ruia et al.

(10) Patent No.: US 12,737,339 B2
(45) Date of Patent: Sep. 15, 2026

(54) TECHNIQUES FOR GENERATING SERVICE PLANS

(71) Applicant: Oracle International Corporation, Redwood Shores, CA (US)

(72) Inventors: Ayush Ruia, Kirkland, WA (US); Himanish Pathak, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/268,744

(22) Filed: Jul. 14, 2025

(65) Prior Publication Data

US 2026/0023729 A1 Jan. 22, 2026

Related U.S. Application Data

(60) Provisional application No. 63/673,613, filed on Jul. 19, 2024.

(51) Int. Cl.
*G06F 16/20* (2019.01)
*G06F 16/22* (2019.01)

(52) U.S. Cl.
CPC ................................ *G06F 16/2264* (2019.01)

(58) Field of Classification Search
None
See application file for complete search history.

(56) References Cited

U.S. PATENT DOCUMENTS 8,577,842 B1 * 11/2013 Nagargadde ........ G06F 11/1464 707/639
10,673,716 B1 6/2020 Sethuramalingam et al.
(Continued)

OTHER PUBLICATIONS

Bramas et al., "Improving Parallel Executions by Increasing Task Granularity in Task-based Runtime Systems Using Acyclic DAG Clustering", PeerJ Computer Science, vol. 6, Jan. 13, 2020, pp. 1-26.
(Continued)

*Primary Examiner* — Jau Shya Meng
(74) *Attorney, Agent, or Firm* — Kilpatrick Townsend & Stockton LLP

(57) ABSTRACT

A system, method, and device used for generating code segments of a service plan that represents a process for bootstrapping a service. A first directed acyclic graph (DAG) comprising a first plurality of edges and a first plurality of nodes representing releases and dependencies between releases of a process for bootstrapping a plurality of services may be obtained. A second DAG may be generated from the first based on executing a clustering procedure. A third DAG that is specific to the service may be generated based on traversing the second DAG. Code segments of a service plan may be generated based at least in part on the third DAG. for generating code segments of a service plan that represents a process for bootstrapping a service. A first directed acyclic graph (DAG) comprising a first plurality of edges and a first plurality of nodes representing releases and dependencies between releases of a process for bootstrapping a plurality of services may be obtained. A second DAG may be generated from the first based on executing a clustering procedure. A third DAG that is specific to the service may be generated based on traversing the second DAG. Code segments of a service plan may be generated based at least in part on the third DAG.

20 Claims, 27 Drawing Sheets

(56) References Cited

U.S. PATENT DOCUMENTS

| | | | |
|---|---|---|---|
| 2016/0094477 | A1 | 3/2016 | Bai et al. |
| 2017/0357648 | A1* | 12/2017 | Fink .................... G06F 16/1873 |
| 2018/0307528 | A1 | 10/2018 | Ahmed et al. |
| 2019/0122156 | A1 | 4/2019 | Asthana et al. |
| 2021/0027315 | A1 | 1/2021 | Nanavati et al. |
| 2023/0251876 | A1 | 8/2023 | Mysore Jagadeesh et al. |
| 2024/0119092 | A1 | 4/2024 | Rosendahl et al. |
| 2024/0256251 | A1 | 8/2024 | Vergara et al. |

OTHER PUBLICATIONS

John et al., "Clustering Nodes in a Directed Acyclic Graph by Identifying Corridors of Coherent Flow", Available online at: https://researchrepository.ucd.ie/server/api/core/bitstreams/22eb8671-e111-4cc9-9edd-75aa395a44bc/content#:~:text=To%20apply%20the%20clustering%20algorithm,graph%20which%20has%20no%20cycles, Oct. 1, 2020, 7 pages.

Liang et al., "Cloud Service Provisioning Strategy using Data Center Consortium Clustering", Expert Systems with Applications, vol. 221, Jul. 1, 2023, 9 pages.

* cited by examiner

Figure 11:
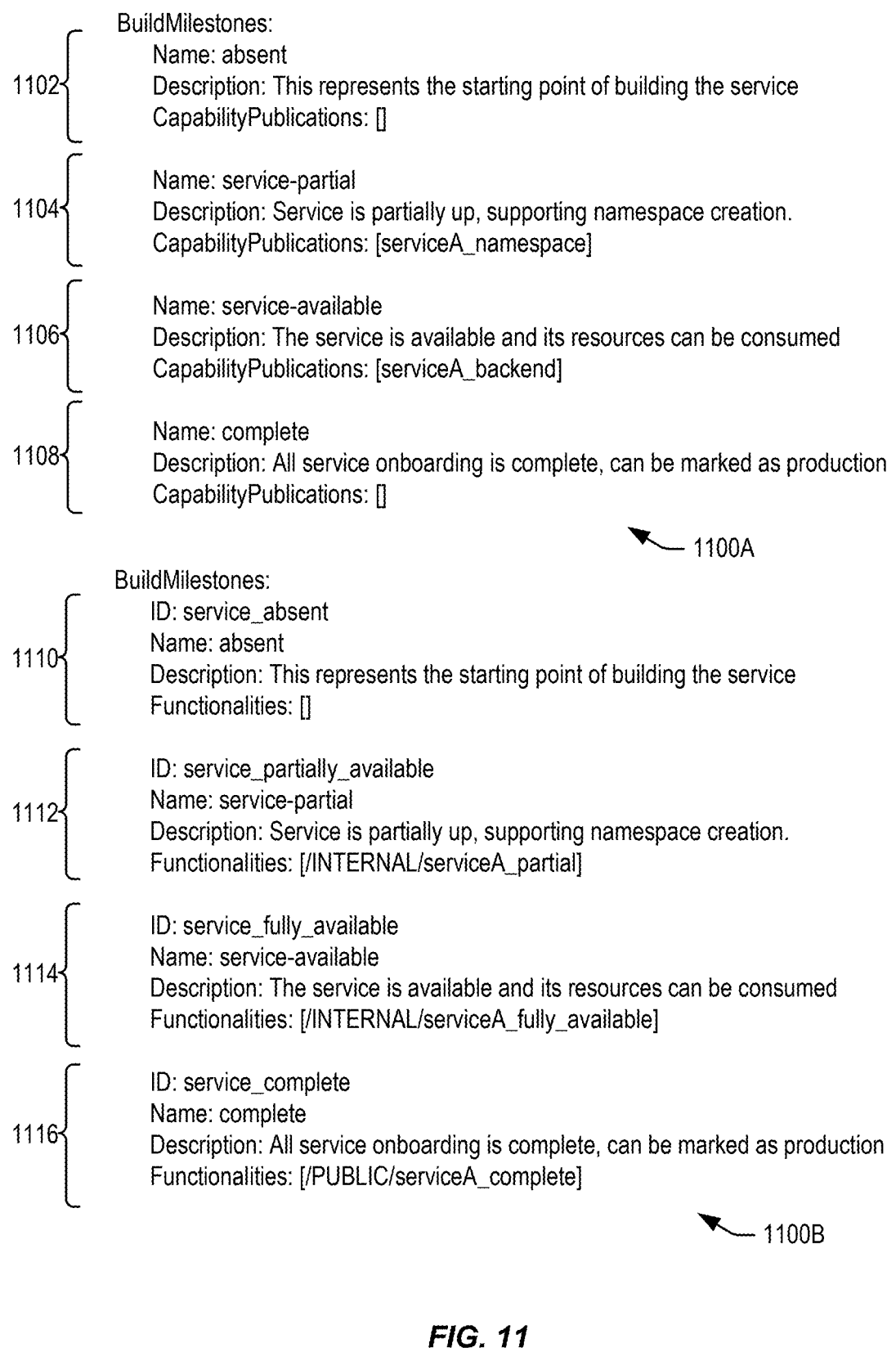

BuildMilestones:

1102
Name: absent
Description: This represents the starting point of building the service
CapabilityPublications: []

1104
Name: service-partial
Description: Service is partially up, supporting namespace creation.
CapabilityPublications: [serviceA_namespace]

1106
Name: service-available
Description: The service is available and its resources can be consumed
CapabilityPublications: [serviceA_backend]

1108
Name: complete
Description: All service onboarding is complete, can be marked as production
CapabilityPublications: []

1100A

BuildMilestones:

1110
ID: service_absent
Name: absent
Description: This represents the starting point of building the service
Functionalities: []

1112
ID: service_partially_available
Name: service-partial
Description: Service is partially up, supporting namespace creation.
Functionalities: [/INTERNAL/serviceA_partial]

1114
ID: service_fully_available
Name: service-available
Description: The service is available and its resources can be consumed
Functionalities: [/INTERNAL/serviceA_fully_available]

1116
ID: service_complete
Name: complete
Description: All service onboarding is complete, can be marked as production
Functionalities: [/PUBLIC/serviceA_complete]

```
ExecutionUnits:
    From: absent
    To: service-partial
    AutomationDependencies: [/PUBLIC/functions:1, /PUBLIC/OCI_Logging:1]
    Steps:
      Serial:
        FlockInvocation:
            ID: 'partial_service:infra'
            FlockConfig: partial_service_infra
            ChangeType: INFRA
            BuildFlags: partial_serviceA_infra_complete

        FlockInvocation:
            ID: 'partial_service:app'
            FlockConfig: partial_service_app
            ChangeType: APP
            BuildFlags: partial_serviceA_app_complete

    From: service-partial
    To: service-available
    AutomationDependencies: [/PUBLIC/serviceB_complete:1, /PUBLIC/serviceC_complete:1]
    Steps:
      Parellel:
        FlockInvocation:
            ID: 'full_service:infra'
            FlockConfig: full_service_infra1
            ChangeType: INFRA
            BuildFlags: full_serviceA_infra1_complete

        FlockInvocation:
            ID: 'full_service:app'
            FlockConfig: example_service_infra2
            ChangeType: INFRA
            BuildFlags: example_serviceA_infra2_complete
    .
    .
    .
```

```
FlockConfigs:
  Project: sample-project        <- 1402
  Flock: service-dp              <- 1404
  Phases:                                                    [1406]
    Name: phase_DP
    ExecutionTargets:                                        [1408]
      Name: service-region-{$TARGET_REGION}
      Alias: region-et
      Checkpoints:                                           [1410]
        Infra:
          Name: DP_initial_region_infra
          FlockConfig: DP_initial_region_infra      <- 1412
          ExternalCapabilityDependencies: [certificate_service_ready, capability_service_ready]   <- 1414
          CapabilityPublications: []                <- 1416

          Name: DP_complete_region_infra
          FlockConfig: DP_complete_region_infra
          ExternalCapabilityDependencies: [core_instance, dep_service_app, dep_service_pool]
          InternalCapabilityDependencies: [svc_internal_CP]
          CapabilityPublications: [svc_DP, svc_internal_DP]
        App:
          Name: DP_initial_region_app
          FlockConfig: DP_initial_region_app
          ExternalCapabilityDependencies: []
          CapabilityPublications: []

          Name: DP_complete_region_app
          FlockConfig: DP_complete_region_app
          ExternalCapabilityDependencies: [dep_service_deployment]
          CapabilityPublications: [svc_DP_complete]
          .
          .
          .
```

FIG. 14

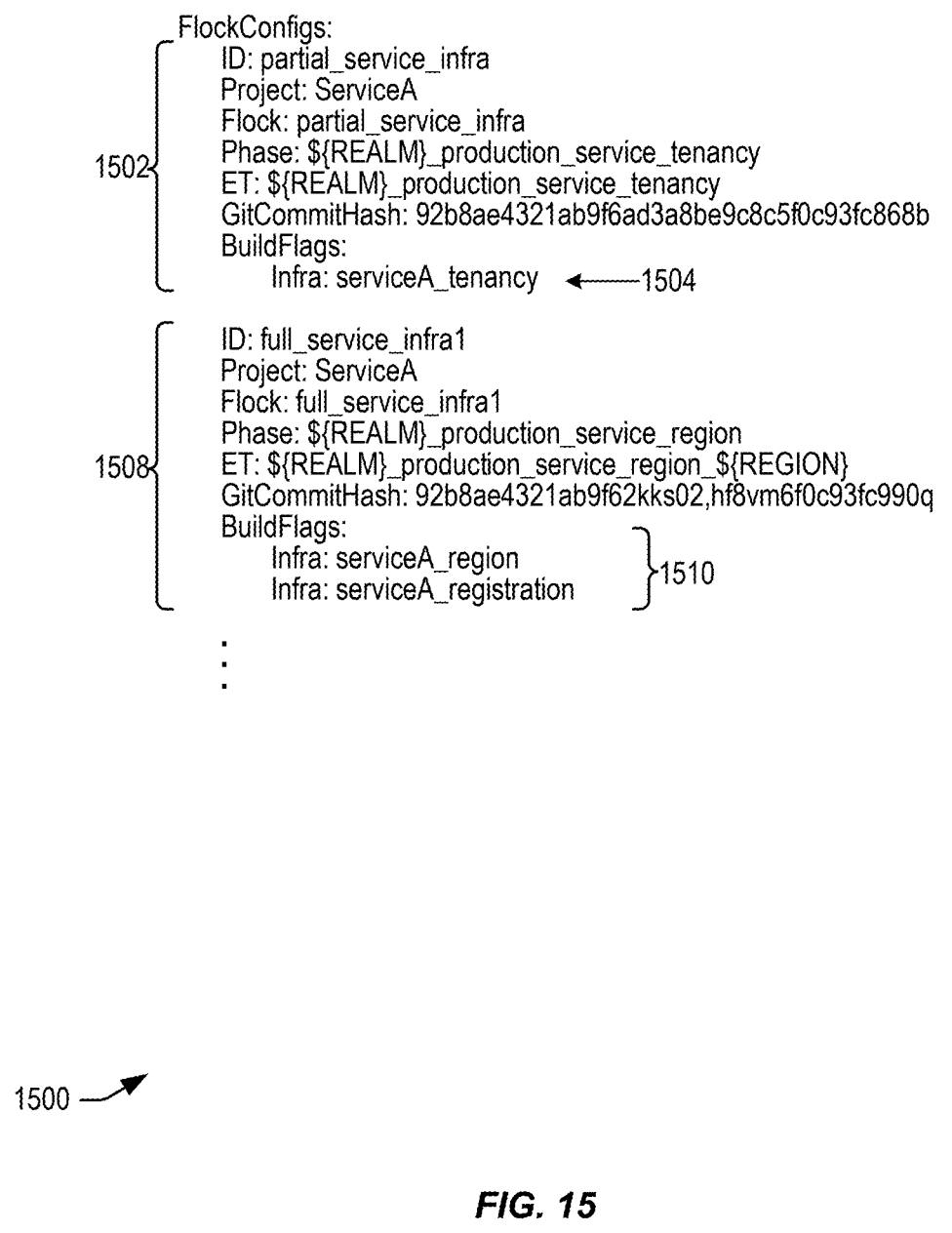

```
FlockConfigs:
    ID: partial_service_infra
    Project: ServiceA
    Flock: partial_service_infra
    Phase: ${REALM}_production_service_tenancy
    ET: ${REALM}_production_service_tenancy
    GitCommitHash: 92b8ae4321ab9f6ad3a8be9c8c5f0c93fc868b
    BuildFlags:
        Infra: serviceA_tenancy

    ID: full_service_infra1
    Project: ServiceA
    Flock: full_service_infra1
    Phase: ${REALM}_production_service_region
    ET: ${REALM}_production_service_region_${REGION}
    GitCommitHash: 92b8ae4321ab9f62kks02,hf8vm6f0c93fc990q
    BuildFlags:
        Infra: serviceA_region
        Infra: serviceA_registration
    .
    .
    .
```

FIG. 15

Service Plan 1702
Intra-Service Coordination
Inter-Service Coordination
1706
Build Milestone
1716
Cap./Skill Set
1720
1722
1708
Build Milestone
1718
Cap./Skill Set
Service(s)
1714
Cap./Skill Set
1710
Build Milestone
Cap./Skill Set
Cap./Skill Set
1712
Build Milestone
Cap./Skill Set

Service Plan – Service A
EU-R1 R2 R1
EU-R2 R3
EU-R3 R4 R5
2102 2108 2104 2110 2106

Service Plan – Service B
EU-B1 B2 B1
EU-B2 B3 B4 B6
EU-B3 B5
EU-B4 B7

Service Plan – Service C
EU-Y1 Y1
EU-Y2 Y2
EU-Y3 Y3

Service Plan – Service D
EU-G1 G1 G5
EU-G2 G3 G2
EU-G3 G4
EU-G4 G6

2100

Figure 22:
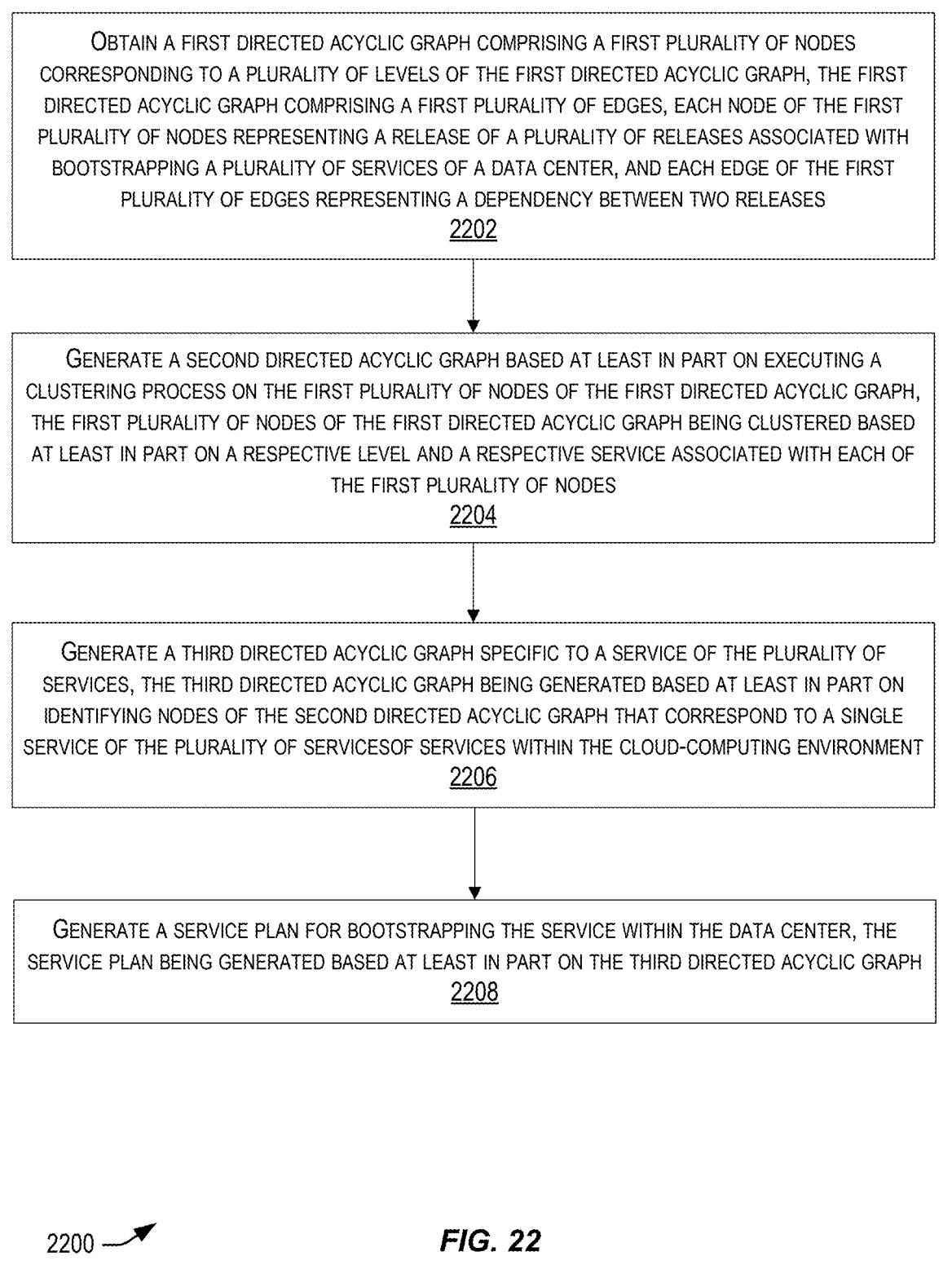

OBTAIN A FIRST DIRECTED ACYCLIC GRAPH COMPRISING A FIRST PLURALITY OF NODES CORRESPONDING TO A PLURALITY OF LEVELS OF THE FIRST DIRECTED ACYCLIC GRAPH, THE FIRST DIRECTED ACYCLIC GRAPH COMPRISING A FIRST PLURALITY OF EDGES, EACH NODE OF THE FIRST PLURALITY OF NODES REPRESENTING A RELEASE OF A PLURALITY OF RELEASES ASSOCIATED WITH BOOTSTRAPPING A PLURALITY OF SERVICES OF A DATA CENTER, AND EACH EDGE OF THE FIRST PLURALITY OF EDGES REPRESENTING A DEPENDENCY BETWEEN TWO RELEASES
2202

GENERATE A SECOND DIRECTED ACYCLIC GRAPH BASED AT LEAST IN PART ON EXECUTING A CLUSTERING PROCESS ON THE FIRST PLURALITY OF NODES OF THE FIRST DIRECTED ACYCLIC GRAPH, THE FIRST PLURALITY OF NODES OF THE FIRST DIRECTED ACYCLIC GRAPH BEING CLUSTERED BASED AT LEAST IN PART ON A RESPECTIVE LEVEL AND A RESPECTIVE SERVICE ASSOCIATED WITH EACH OF THE FIRST PLURALITY OF NODES
2204

GENERATE A THIRD DIRECTED ACYCLIC GRAPH SPECIFIC TO A SERVICE OF THE PLURALITY OF SERVICES, THE THIRD DIRECTED ACYCLIC GRAPH BEING GENERATED BASED AT LEAST IN PART ON IDENTIFYING NODES OF THE SECOND DIRECTED ACYCLIC GRAPH THAT CORRESPOND TO A SINGLE SERVICE OF THE PLURALITY OF SERVICESOF SERVICES WITHIN THE CLOUD-COMPUTING ENVIRONMENT
2206

GENERATE A SERVICE PLAN FOR BOOTSTRAPPING THE SERVICE WITHIN THE DATA CENTER, THE SERVICE PLAN BEING GENERATED BASED AT LEAST IN PART ON THE THIRD DIRECTED ACYCLIC GRAPH
2208

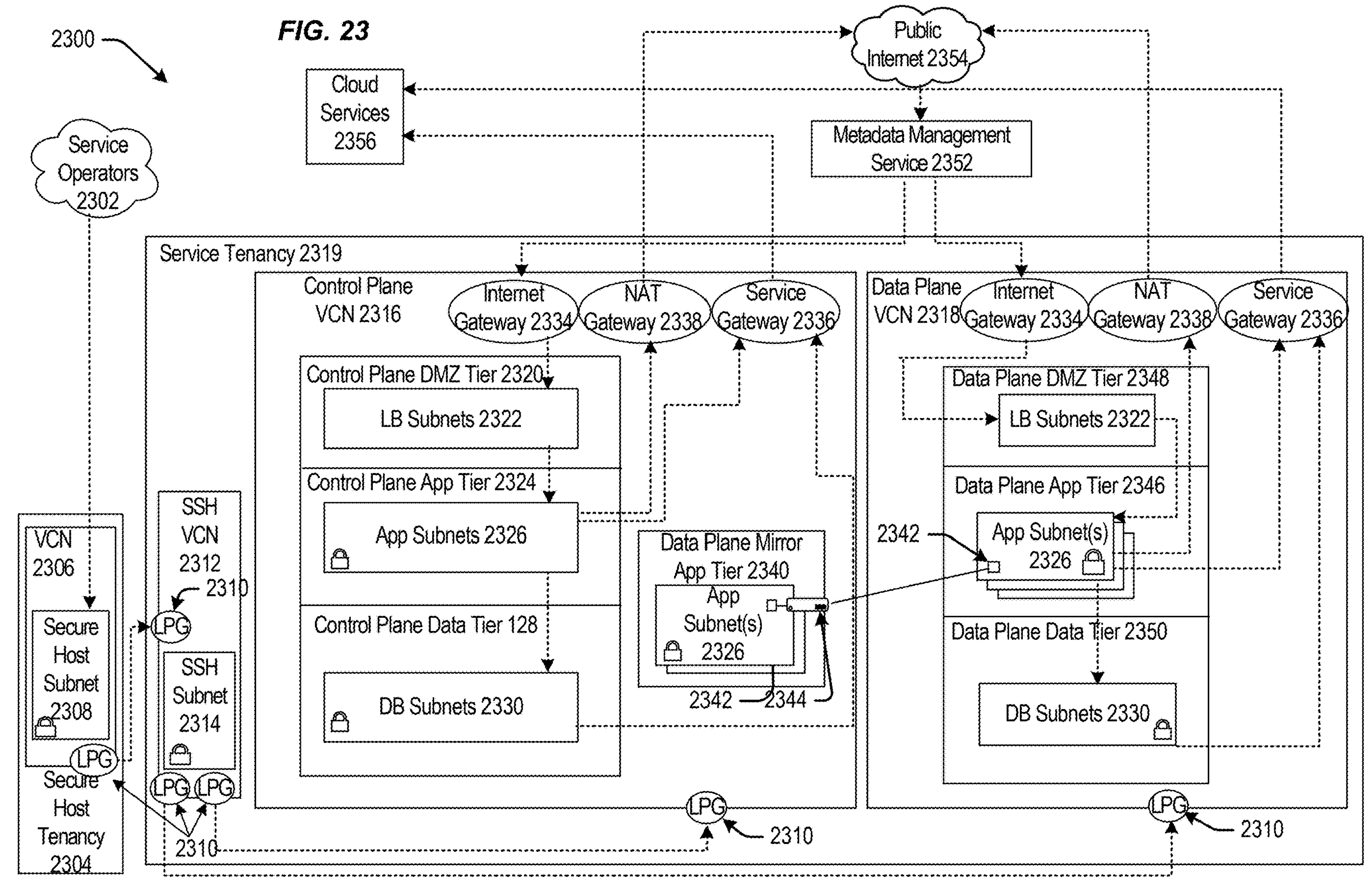

FIG. 23
2300
Service Operators 2302
Cloud Services 2356
Public Internet 2354
Metadata Management Service 2352
Service Tenancy 2319
Control Plane VCN 2316
Internet Gateway 2334
NAT Gateway 2338
Service Gateway 2336
Control Plane DMZ Tier 2320
LB Subnets 2322
Control Plane App Tier 2324
App Subnets 2326
Control Plane Data Tier 128
DB Subnets 2330
Data Plane Mirror App Tier 2340
App Subnet(s) 2326
2342
2344
Data Plane VCN 2318
Internet Gateway 2334
NAT Gateway 2338
Service Gateway 2336
Data Plane DMZ Tier 2348
LB Subnets 2322
Data Plane App Tier 2346
App Subnet(s) 2326
2342
Data Plane Data Tier 2350
DB Subnets 2330
SSH VCN 2312
SSH Subnet 2314
LPG
2310
VCN 2306
Secure Host Subnet 2308
Secure Host Tenancy 2304

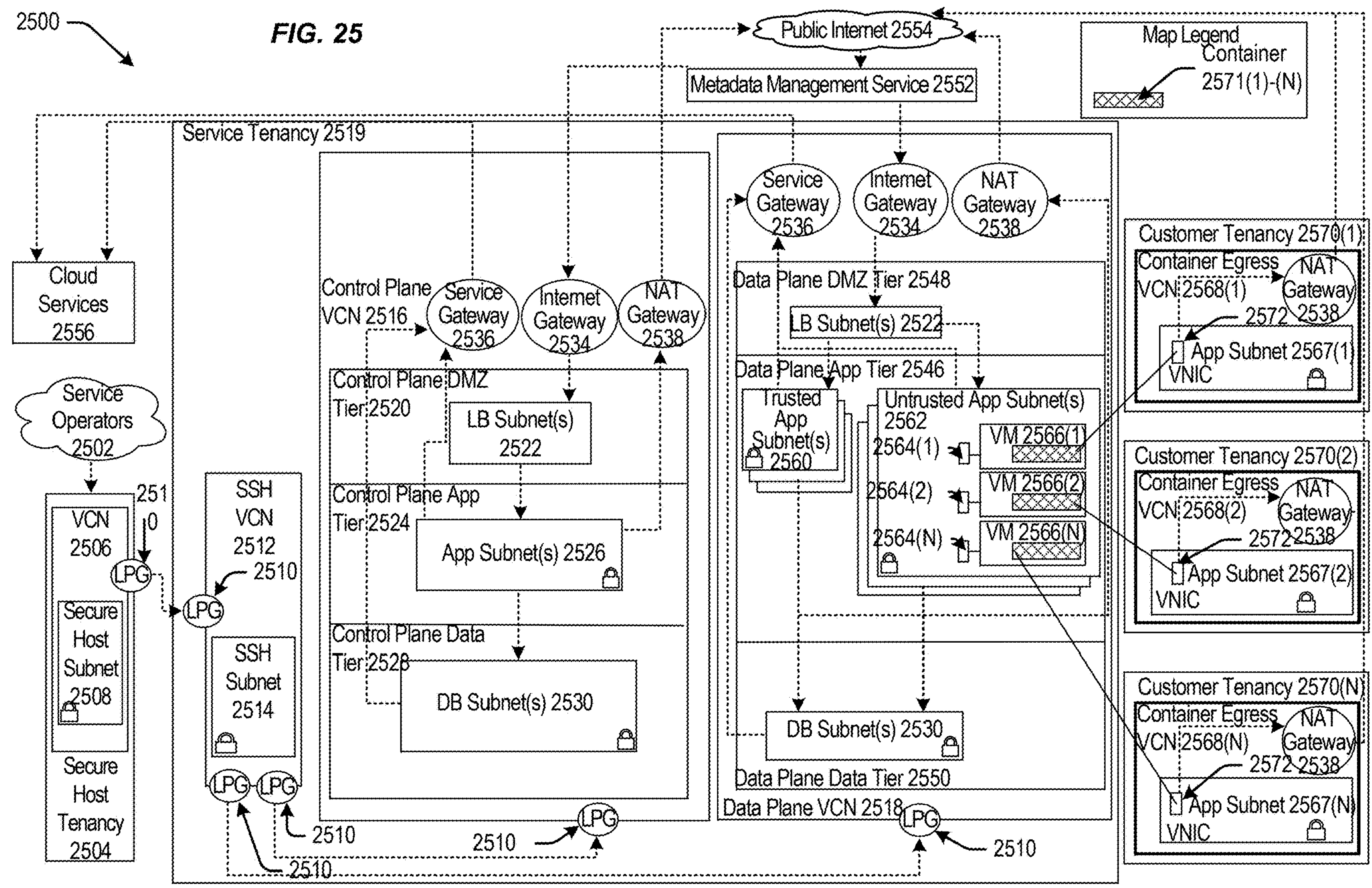
FIG. 25
2500
Public Internet 2554
Metadata Management Service 2552
Map Legend
Container
2571(1)-(N)
Cloud Services 2556
Service Operators 2502
VCN 2506
Secure Host Subnet 2508
Secure Host Tenancy 2504
LPG
2510
Service Tenancy 2519
SSH VCN 2512
SSH Subnet 2514
Control Plane VCN 2516
Service Gateway 2536
Internet Gateway 2534
NAT Gateway 2538
Control Plane DMZ Tier 2520
LB Subnet(s) 2522
Control Plane App Tier 2524
App Subnet(s) 2526
Control Plane Data Tier 2528
DB Subnet(s) 2530
Data Plane DMZ Tier 2548
Data Plane App Tier 2546
Trusted App Subnet(s) 2560
Untrusted App Subnet(s) 2562
2564(1)
2564(2)
2564(N)
VM 2566(1)
VM 2566(2)
VM 2566(N)
Data Plane Data Tier 2550
Data Plane VCN 2518
Customer Tenancy 2570(1)
Container Egress VCN 2568(1)
App Subnet 2567(1)
Customer Tenancy 2570(2)
Container Egress VCN 2568(2)
App Subnet 2567(2)
Customer Tenancy 2570(N)
Container Egress VCN 2568(N)
App Subnet 2567(N)
2572
VNIC

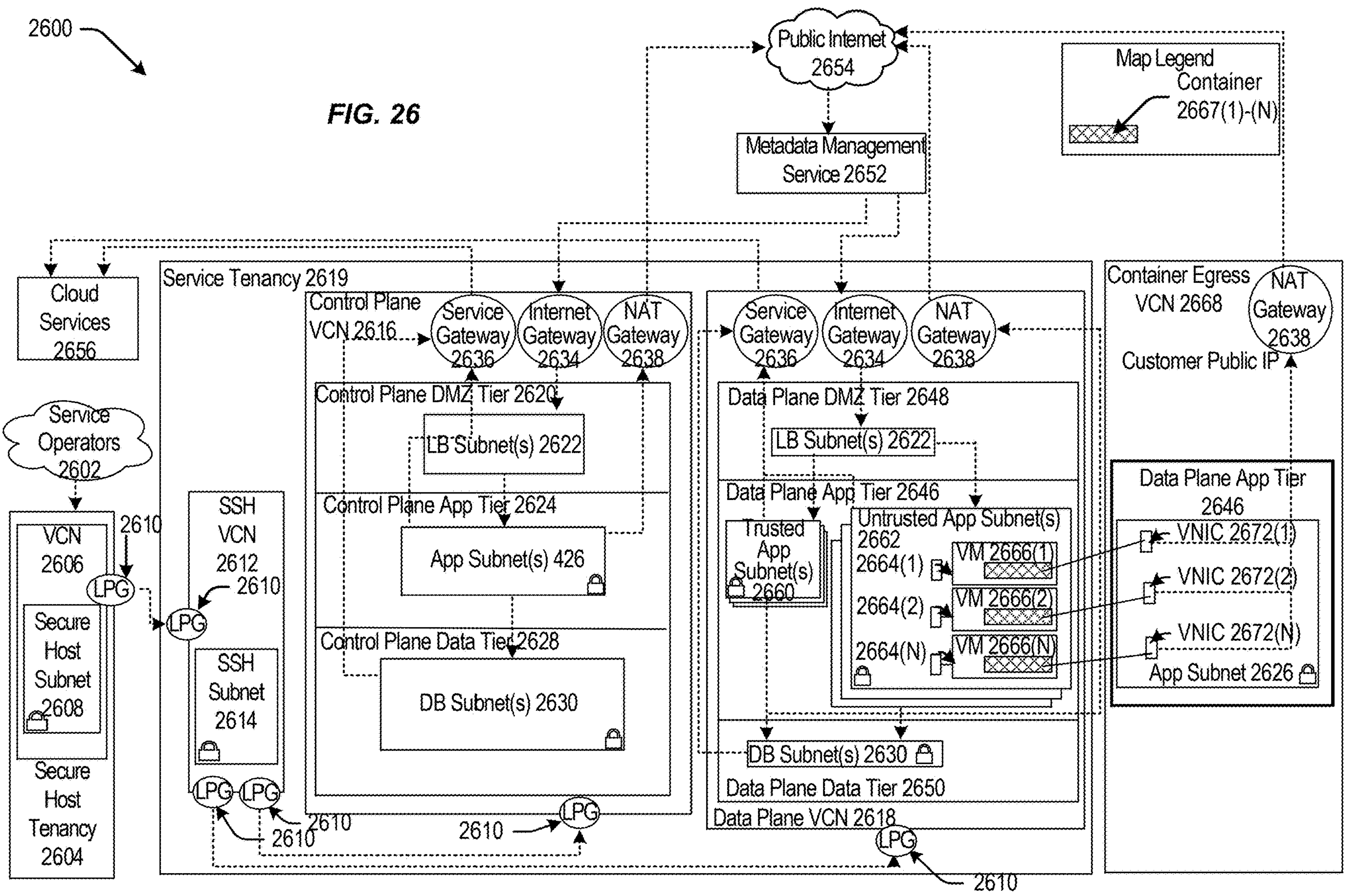
2600
FIG. 26
Public Internet 2654
Metadata Management Service 2652
Map Legend
Container 2667(1)-(N)
Cloud Services 2656
Service Operators 2602
VCN 2606
Secure Host Subnet 2608
Secure Host Tenancy 2604
LPG
2610
Service Tenancy 2619
SSH VCN 2612
SSH Subnet 2614
Control Plane VCN 2616
Service Gateway 2636
Internet Gateway 2634
NAT Gateway 2638
Control Plane DMZ Tier 2620
LB Subnet(s) 2622
Control Plane App Tier 2624
App Subnet(s) 426
Control Plane Data Tier 2628
DB Subnet(s) 2630
Data Plane DMZ Tier 2648
LB Subnet(s) 2622
Data Plane App Tier 2646
Trusted App Subnet(s) 2660
Untrusted App Subnet(s) 2662
2664(1)
2664(2)
2664(N)
VM 2666(1)
VM 2666(2)
VM 2666(N)
DB Subnet(s) 2630
Data Plane Data Tier 2650
Data Plane VCN 2618
Container Egress VCN 2668
NAT Gateway 2638
Customer Public IP
Data Plane App Tier 2646
VNIC 2672(1)
VNIC 2672(2)
VNIC 2672(N)
App Subnet 2626

TECHNIQUES FOR GENERATING SERVICE PLANS

CROSS-REFERENCE TO RELATED APPLICATIONS

This Non-Provisional application claims priority to U.S. Provisional Patent Application 63/673,613, filed Jul. 19, 2024, entitled "Automated Service Plan Generation," the disclosure of which is herein incorporated by reference in its entirety for all purposes.

BACKGROUND

Today, cloud infrastructure services utilize many individual services to build a data center (e.g., to bootstrap various resources in a data center of a particular geographic region). A region is a logical abstraction corresponding to a localized geographical area in which one or more data centers are (or are to be) located. Building a data center (also referred to performing a "region build") may include provisioning and configuring infrastructure resources and deploying code to those resources (e.g., to implement a variety of services). Any suitable number of data centers may be included in a region and therefore a region build may include operations for building multiple data centers. Bootstrapping operations for one service may depend on the availability of other functionality and/or services of the region. As the number of service teams and regions grows, the tasks performed for orchestrating provisioning and deployment drastically increase. Conventional tools for building a region require significant manual effort or automated techniques present drawbacks with respect to overhead, accuracy, and ease of use. Improvements can be made.

BRIEF SUMMARY

In the following description, for the purposes of explanation, specific details are set forth in order to provide a thorough understanding of certain embodiments. However, it will be apparent that various embodiments may be practiced without these specific details. The figures and description are not intended to be restrictive.

Some embodiments may include a computer-implemented method. The method may comprise obtaining, by a computing system, a first directed acyclic graph comprising a first plurality of edges and a first plurality of nodes corresponding to a plurality of levels. In some embodiments, each node of the first plurality of nodes represents a release of a plurality of releases associated with bootstrapping a plurality of services of a data center. Each edge of the first plurality of edges may represent a dependency between two releases of the plurality of releases. The method may comprise generating, by the computing system, a second directed acyclic graph based at least in part on executing a clustering procedure on the first plurality of nodes of the first directed acyclic graph. In some embodiments, the first plurality of nodes may be clustered based at least in part on a respective level and a respective service associated with each of the first plurality of nodes. The method may comprise generating, by the computing system, a third directed acyclic graph specific to a service of the plurality of services based at least in part on identifying nodes of the second directed acyclic graph that correspond to the service of the plurality of services. The method may comprise generating, by the computing system and based at least in part on the third directed acyclic graph, a service plan for bootstrapping the service within the data center.

In some embodiments, a set of nodes of the third directed acyclic graph individually correspond to a respective build milestone of a plurality of build milestones of the service plan.

In some embodiments, the method comprises generating a respective plurality of code segments corresponding to each build milestone of the plurality of build milestones.

In some embodiments, a plurality of edges of the third directed acyclic graph individually correspond to a respective execution unit of a plurality of execution units of the service plan.

In some embodiments, the method comprises generating a respective plurality of code segments corresponding to each execution unit of the plurality of execution units.

In some embodiments, the clustering procedure comprises, for each service of the plurality of services: 1) identifying a first node of a first level of the first directed acyclic graph, the first node being associated with a respective service, 2) identifying whether a second node exists that depends from the first node and that is associated with the respective service, and 3) generating, for the second directed acyclic graph, a node to represent the first node and the second node, based at least in part on identifying that the second node exists.

In some embodiments, the method comprises associating a respective node of the second directed acyclic graph with a superset of publications produced by one or more releases associated with the respective node.

Systems, devices, and computer readable media are disclosed, each of which may comprise one or more memories on which instructions corresponding to the methods disclosed herein may be stored. The instructions may be executed by one or more processors of the disclosed systems and devices to execute the methods disclosed herein. One or more computer programs can be configured to perform operations corresponding to the described methods by virtue of including instructions that, when executed one or more processors, cause the one or more processors to perform the operations.

BRIEF DESCRIPTION OF THE DRAWINGS

To easily identify the discussion of any particular element or act, the most significant digit or digits in a reference number refer to the figure number in which that element is first introduced.

FIG. 11 is a block diagram depicting two example build milestone entities that may be included in an example service plan and manifest, in accordance with at least one embodiment.

FIG. 13 depicts another example execution unit entity of an example service plan, in accordance with at least one embodiment.

FIG. 14 depicts an example flock config entity of an example service plan, in accordance with at least one embodiment.

FIG. 15 depicts another example flock config entity of an example service plan, in accordance with at least one embodiment.

FIG. 19 is a block diagram depicting a method for deriving one or more build milestones and execution units using the directed acyclic graph of FIG. 18, in accordance with at least one embodiment.

FIG. 22 is a flow diagram depicting an example method for deriving one or more build milestones and/or one or more execution units from a directed acyclic graph.

FIG. 23 is a block diagram illustrating one pattern for implementing a cloud infrastructure as a service system, according to at least one embodiment.

FIG. 25 is a block diagram illustrating another pattern for implementing a cloud infrastructure as a service system, according to at least one embodiment.

FIG. 26 is a block diagram illustrating another pattern for implementing a cloud infrastructure as a service system, according to at least one embodiment.

DETAILED DESCRIPTION

Figure 1:
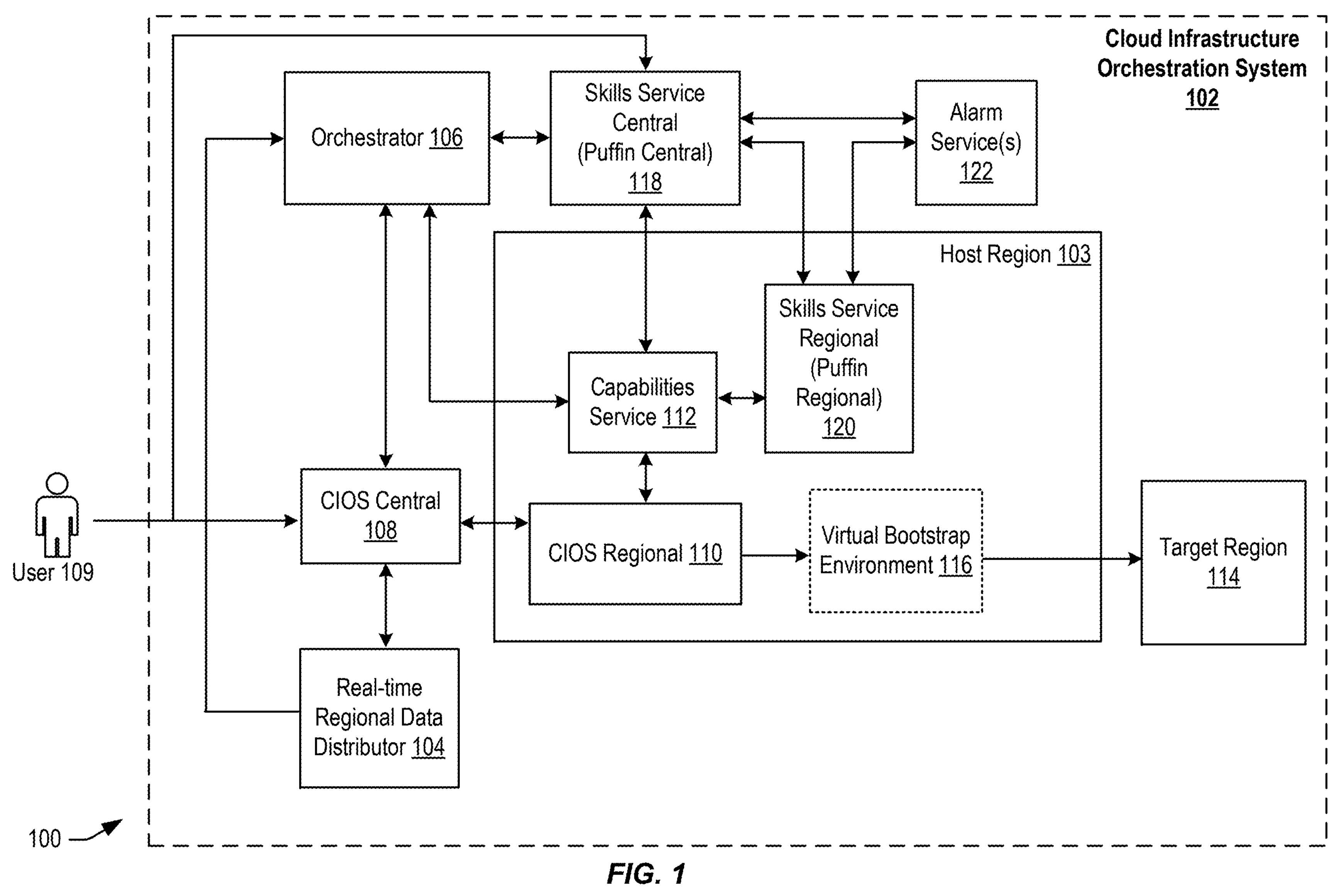
FIG. 1 is a block diagram of an environment in which an example Cloud Infrastructure Orchestration System (CIOS may operate to dynamically bootstrap services in a region, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Example Automated Data Center Build (Region Build) Infrastructure

The adoption of cloud services has seen a rapid uptick in recent times. Various types of cloud services are now provided by various cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP's infrastructure and which is used to provide a cloud service to a customer are separate from the customer's own on-premises servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, California; data centers in the US East region may be located in Ashburn, Virginia; data centers in the Australia East region may be located in Sydney, Australia; data centers in the Australia Southeast region may be located in Melbourne, Australia; and the like.

Data centers within a region may be organized into one or more availability domains, which are used for high availability and disaster recovery purposes. An availability domain can include one or more data centers within a region. Availability domains within a region are isolated from each other, fault tolerant, and are architected in such a way that data centers in multiple availability domains are very unlikely to fail simultaneously. For example, the availability domains within a region may be structured in a manner such that a failure at one availability domain within the region is unlikely to impact the availability of data centers in other availability domains within the same region.

When a customer or subscriber subscribes to or signs up for one or more services provided by a CSP, the CSP creates a tenancy for the customer. The tenancy is like an account that is created for the customer. In certain implementations, a tenancy for a customer exists in a single realm and can access all regions that belong to that realm. The customer's users can then access the services subscribed to by the customer under this tenancy.

As indicated above, a CSP builds or deploys data centers to provide cloud services to its customers. As a CSP's customer base grows, the CSP typically builds new data centers in new regions or increases the capacity of existing data centers to service the customers' growing demands and to better serve the customers. Preferably, a data center is built in close geographical proximity to the location of customers serviced by that data center. Geographical proximity between a data center and customers serviced by that data center lends to more efficient use of resources and faster and more reliable services being provided to the customers. Accordingly, a CSP typically builds new data centers in new regions in geographical areas that are geographically proximal to the customers serviced by the data centers. For example, for a growing customer base in Germany, a CSP may build one or more data centers in a new region in Germany.

Building a data center (or multiple data centers) in a region is sometimes also referred to as building a region. The term "region build" is used to refer to building one or more data centers in a region. Building a data center in a region involves provisioning or creating a set of new resources that are needed or used for providing a set of services that the data center is configured to provide. The end result of the region build process is the creation of a data center in a region, where the data center is capable of providing a set of services intended for that data enter and includes a set of resources that are used to provide the set of services.

Building a new data center in a region is a very complex activity requiring coordination between various service teams. At a high level, this involves the performance and coordination of various tasks such as: identifying the set of services to be provided by the data center, identifying various resources that are needed for providing the set of services, creating, provisioning, and deploying the identified resources, wiring the resources properly so that they can be used in an intended manner, and the like. Each of these tasks further have subtasks that need to be coordinated, further adding to the complexity. Due to this complexity, presently, the building of a data center in a region involves several manually initiated or manually controlled tasks that require careful manual coordination. As a result, the task of building a new region (i.e., building one or more data centers in a region) is very time consuming. It can take time, for example, many months to build a data center. Additionally, the process is very error prone, sometimes requiring several iterations before a desired configuration of the data center is achieved, which further adds to the time taken to build a data center. These limitations and problems severely limit a CSP's ability to grow in a timely manner responsive to increasing customer needs.

Bootstrapping operations have been coordinated and orchestrated by an orchestrator (e.g., a Multi-Flock Orchestrator, an orchestration service, etc.). In previous implementations, the orchestrator attempted to automatically detect dependencies between operations. The orchestrator utilized various versions of configuration files and/or software artifacts and attempted to intelligently and automatically identify the artifacts and manner in which a data center build was performed. As a data center was built, the orchestrator utilized capabilities (e.g., tags that could be toggled on or off to indicate availability of a resource or functionality) to drive these operations. However, both the automatic detection techniques and the use of capabilities included drawbacks.

Previous implementations of an orchestrator also lacked an exact plan of the work that may be needed (or is needed) to build a data center ahead of the actual build. The orchestrator utilized service build definitions that were spread across multiple flock configuration files ("flock configs") and interpreted by the orchestrator at runtime. This caused the orchestrator to execute a non-predetermined number of releases, in a non-predetermined order, each of which published a non-predetermined number of capabilities per release. To compensate for this indeterministic behavior, manually curated micro-schedules were generated and used to track the work and order of operations necessary to build the data center. These micro-schedules were not machine executable nor derived from code. Service teams were not prevented from changing their build automation which could cause the existing micro-schedules to be invalidated. Additionally, it was not possible to determine exact behavior of a service build when configuration files for that service rely on external data.

In previous implementations, tasks were triggered by publishing capabilities. Capability availability was not held constant over a release leading to non-determinism in the planned activity if any optional capabilities were published mid-release. The use of optional capabilities made it difficult to determine when a release was expected to publish a certain capability of if a resource was ever going to be created. Service teams could also introduce changes that created unsatisfiable cyclic dependencies between services causing the build to deadlock or depend upon a capability that would never be published. For at least these reasons, it was impossible to determine when dependent releases would be unblocked. Heterogeneity in different regions also meant that there was no single plan for how a service should be bootstrapped. Rather, a different plan existed for each region furthering compounding the difficulty in understanding how the service is built, as capabilities might be depended upon or published in certain types of regions and not others.

Service plans and manifests (SPAMs) may serve as a deterministic specification for the bootstrapping process of a single service. A service plan and manifest (SPAM) provides a complete service build description that specifies the releases and the deterministic/explicit order of those releases that may be necessary (or are necessary) to build a service. The SPAM may include clear expectations for the progress expected by each transition (e.g., each release execution corresponding to a particular phase/execution target). One or more services (e.g., all services to be bootstrapped within the region) may be associated with a corresponding SPAM. Information provided by these SPAMs may be utilized to eliminate various errors that can occur in a data center build by identifying issues early in the build lifecycle (e.g., upon SPAM submission) rather than at build time. SPAMs may be composed together by an orchestrator (e.g., a Multi-Flock Orchestrator, a region orchestration service, etc.) and used to form a directed acyclic graph (DAG) of work (e.g., releases) that identifies the expected order of release executions that may be needed (or in some instances, is needed) to build the data center and capability dependencies between those releases. The defined graph may be pre-validated for abnormalities such as cycles on creation and on subsequent region updates. The graph may be used to support improved error detection both prior to and during a build. The graph generated from SPAMs may be used to drive region build operations and/or it may be used to validate a different graph (e.g., one generated from flock configs as in previous implementations) that is used to drive the region build. The SPAM provides a deterministic specification of a build implementation for a given service that reduces, if not eliminates, the non-deterministic drawbacks present in previous implementations that utilized multiple flock configs to identify the releases that may be needed (or is needed) to build a service. This improves observability and understanding of the region build and reduces the time and complexity of identifying root cause when an error is experienced during region build.

Capabilities may be used with, or may be replaced with, skills as a mechanism with which build progress may be tracked. A "skill" may represent a functional unit that a service exposes and offers to consumers (e.g., other services). This functional unit (also referred to as "service functionality") can include all or a subset of the total functionality associated with a service. In some embodiments, skills may be scoped where access is controlled based on access and/or authorization policies and/or based on an association with a particular namespace. A skill may be provided in multiple versions in which one or more aspects of the skill differs from other versions, where each skill version represents a specific implementation of the skill. Each skill version may be identifiable using a unique skill identifier. Skills may enable enhanced and more accurate progress tracking of a region build over the tracking previously provided with capabilities, as well as improved root cause analysis functionality when errors or unexpected events occur in the build.

Service plans used by the region orchestrator to drive orchestration tasks may specify any suitable number of preconditions (e.g., required skill dependencies) and post-conditions (e.g., skill publications) that are expected to be met upon reaching different points (referred to as "execution target (ET) checkpoints"). The order of release execution may be identified in the service plan. In some embodiments, the releases may be expressed using ET checkpoint transitions. Each ET checkpoint transition (e.g., a transition from one ET checkpoint to another ET checkpoint) may be mapped to a corresponding infrastructure release or application release of the build. ET checkpoints may be associated with corresponding build flags that may be used to identify progress of the build. Executing a release may transition the ET from one ET checkpoint to another. Upon successful transition, one or more build flags that are associated with the release being executed at the ET may be set to indicate that the release was successfully executed (e.g., the corresponding infrastructure or application change corresponding to the release was successfully performed). The current ET checkpoint and build flags may be associated with a resource (e.g., an execution target resource) that is managed by the system. ET checkpoints and their use are discussed in more detail in U.S. Non-provisional application Ser. No. 18/661,396, filed May 10, 2024, entitled "Building a Data Center using Execution Target Checkpoints," the disclosure of which is incorporated by reference in its entirety for all purposes.

Using the SPAM enables an improved and deterministic plan to be generated for a region build. Tracking the ET checkpoints defined within the SPAM enables the region orchestrator to identify, at any suitable time, the progress already achieved and/or the amount and order of remaining work to be performed in an ongoing service and/or region/data center build.

A single region orchestrator may be executed for each region under build (e.g., each data center being built). In some embodiments, each instance of the region orchestrator may execute within a service cell. A "service cell" refers to an isolated hosting environment that is hosted on infrastructure that is dedicated to the service cell. A service cell may be isolated in that it does not share hosts or virtual machines with other service cells. In previous orchestrator implementations, data plane resources (e.g., instances in a computing cluster, etc.) were managed by a regional control plane. Any suitable orchestration tasks (e.g., provisioning, removing, modifying a node of the cluster, etc.) across for any given region were performed by the same regional control plane. The present disclosure relates to utilizing a service cell that is specific to the region, the data center, or the build. This enables multiple builds to be performed concurrently with separate instances of the region orchestrator managing each build.

Automated Service Plan Overview

Embodiments of the present disclosure relate to techniques for automatically generating/deriving one or more portions of a service plan. Previous implementations required service teams to manually define a centralized description (e.g., a service plan) from which the operations needed to build a service may be identified. A service plan refers to a description of how to build a service in a data center. A "service manifest" details which configuration files (e.g., "flocks") and artifacts (e.g., software) are to be utilized to build the service. Service plan generation can not only be tedious, but service teams lacked the understanding of other service builds to define portions of the service plan in a way that maintains dependency invariants. The present disclosure is directed to automated techniques for deriving portions of a service plan that maintain dependency invariants between services.

Certain Definitions

A "region" is a logical abstraction corresponding to a geographical location. A region can include any suitable number of one or more execution targets.

A "phase" refers to a group of execution targets that can be execute at the same time.

An "execution target" refers to a unit (e.g., a set of devices, a tenancy, etc.) against which a release may be executed. In some embodiments, an execution target may be the smallest granular unit against which CIOS can execute a release. An execution target may be specific to a region and a tenancy. Execution targets may be aggregated into one or more phases. For some services, an execution target represents an "instance" of a service. A single service can be bootstrapped to each of one or more execution targets. An execution target may be associated with a set of devices (e.g., a data center).

A "release" refers to a representation of an intent to orchestrate a specific change to a service (e.g., deploy version 8, "add an internal DNS record," etc.). In some embodiments, a release corresponds to a change type that indicates the release is an infrastructure change (e.g., provisioning) or an application change (e.g., a deployment). A release may target one or more phases or execution targets.

"Bootstrapping" is intended to refer to the collective tasks associated with provisioning and deployment of any suitable number of resources (e.g., infrastructure components, artifacts, etc.) corresponding to a single service.

A "service" refers to functionality provided by a set of resources. A set of resources for a service includes any suitable combination of infrastructure, platform, or software (e.g., an application) hosted by a cloud provider that can be configured to provide the functionality of a service. A service can be made available to users through the Internet.

An "artifact" refers to code being deployed to an infrastructure component (e.g., a physical or virtual host) or a Kubernetes engine cluster, this may include, but is not limited to, software (e.g., an application), configuration information (e.g., a configuration file) for an infrastructure component, or the like.

A "flock configuration file" or "flock config," for brevity refers to a configuration file that describes a set of resources (e.g., infrastructure components and artifacts, also referred to as a "flock") associated with a single service. A flock config may correspond to a single release (e.g., provisioning and/or deployment tasks that are to be performed as a unit). A flock config may correspond to an infrastructure release or an application release. A service may be built using any suitable number of releases and corresponding flock configs. A flock config may include declarative statements that specify one or more aspects corresponding to a desired state of the resources of the service for that release.

A "flock" refers to a set of CIOS managed resources or a set of execution targets that can be deployed as a unit. A flock may exist within an organizational unit referred to as a "project."

A "service cell" may refer to an isolated hosting environment that is hosted on infrastructure that is dedicated to the service cell. A service cell may be isolated in that it does not share hosts or virtual machines with other service cells. A service cell may be a kind of logical data center (e.g., a logical grouping of performance isolation and fault isolation) within a single availability domain, region, or data center.

"Service state" refers to a point-in-time snapshot of every resource (e.g., infrastructure resources, artifacts, etc.) associated with the service. The service state indicates status corresponding to provisioning and/or deployment tasks associated with service resources.

IaaS provisioning (or "provisioning") refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned device." Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment") refers to the process of providing and/or installing a new application, or a new version of an application, onto a provisioned infrastructure component. Once the infrastructure component has been provisioned (e.g., acquired, assigned, prepared, etc.), additional software may be deployed (e.g., provided to and installed on the infrastructure component). The infrastructure component can be referred to as a "resource" after provisioning and deployment has concluded. Examples of resources may include, but are not limited to, virtual machines, databases, object storage, block storage, load balancers, and the like.

A "virtual bootstrap environment" (ViBE) refers to a virtual cloud network that is provisioned in the overlay of an existing region (e.g., a "host region"). Once provisioned, a ViBE is connected to a new region using a communication channel (e.g., an IPsec Tunnel VPN). Certain essential core services (or "seed" services) like a deployment orchestrator, a public key infrastructure (PKI) service, and the like can be provisioned in a ViBE. These services can provide the capabilities required to bring the hardware online, establish a chain of trust to the new region, and deploy the remaining services in the new region. Utilizing the virtual bootstrap environment can prevent circular dependencies between bootstrapping resources by utilizing resources of the host region. Services can be staged and tested in the ViBE prior to the physical region (e.g., the target region) being available.

A "Cloud Infrastructure Orchestration Service" (CIOS) may refer to a system configured to manage provisioning and deployment operations for any suitable number of services as part of a region build.

A "host region" refers to a region that hosts a virtual bootstrap environment (ViBE). A host region may be used to bootstrap a ViBE.

A "target region" refers to a region under build.

A "capability" identifies is a legacy resource previously used during region build that signaled that another resource, service, or feature was available, or that an event had occurred. By way of example, a capability could be published indicating that a resource is available for authorization/authentication processing (e.g., a subset of the functionality to be provided by a service). As another example, a capability could be published indicating the full functionality of the service is available. Capabilities were used to identify functionality on which a resource or service depended and/or functionality of a resource or service that was available for use. A capability was associated with an alphanumeric identifier and was used to indicate the capability is available or unavailable. Capabilities and their use in orchestration is discussed in more detail in U.S. Non-provisional application Ser. No. 18/661,401, filed May 10, 2024, entitled "Managing Data Center Orchestration using Service Plans and Manifests," the disclosure of which is incorporated by reference in its entirety for all purposes.

"Publishing a capability" refers to "publishing" as used in a "publisher-subscriber" computing design or otherwise providing an indication that a particular capability is available (or unavailable). In capabilities based orchestration implementations, capabilities were "published" (e.g., collected by a Capabilities Service, provided to a Capabilities Service, pushed, pulled, etc.) to provide an indication that functionality of a resource/service was available or that an event had occurred. In some embodiments, capabilities may have been published/transmitted via an event, a notification, a data transmission, a function call, an API call, or the like. An event (or other notification/data transmission/etc.) indicating availability of a particular capability could be broadcasted/addressed (e.g., published) to a Capabilities Service.

A "Capabilities Service" may be a service configured to monitor and maintain capabilities data that indicates which capabilities are current available in a region. A Capabilities Service may be provided within a Cloud Infrastructure Orchestration System and may be used to identify what capabilities, services, features have been made available in a region, or which events have occurred within the region. The described Capabilities Service may service as a central repository/authority of all capabilities that have been published in the region (e.g., during a region build).

An "Orchestrator" is intended to refer to a service or system that initiates tasks involved in bootstrapping one or more services during a region build. A Multi-Flock Orchestrator (MFO), an example of an orchestrator, may be a computing component (e.g., a service) configured to coordinate events between components of the CIOS to provision and deploy services to a target region (e.g., a new region). An orchestrator may track relevant events (e.g., indicated through capabilities and/or skills as described herein) for each service of the region build and takes actions in response to those events (e.g., based on determining upstream dependencies have been met for a given release/skill, etc.).

A "Region Orchestrator" is intended to refer to a service or system that initiates tasks involved in bootstrapping one or more services during a region build. A region orchestrator may be specific to a particular region or data center and may be configured to manage all bootstrapping operations within that region/data center. A region orchestrator may be a computing component (e.g., a cloud-computing service) configured to coordinate events between components of the CIOS to provision and deploy services to a target region (e.g., a new region). A region orchestrator may track relevant events (e.g., indicated through skills as described herein) for each service of the region build and takes actions in response to those events (e.g., based on determining upstream dependencies have been met for a given release/skill, etc.).

A "Real-time Regional Data Distributor" (RRDD) may be a service or system configured to manage region data. This region data can be injected into flock configs to dynamically create execution targets for new regions.

A "Telemetry Service" may be a service or system that is configured to manage/monitor time series data associated with one or more services/resources and trigger (e.g., publish, store, etc.) various alarms and/or corresponding alarm states based at least in part on analyzing the time series data.

A "Skills Service" (also referred to as "Puffin") may be a service or system that is configured to store planned and/or actual dependency relationships between services, resources, or units of functionality (also referred to as "service functionality"). Puffin may be configured as a central registry with which service teams may register their services/microservices. It should be appreciated that the unit of functionality may relate to functionality provided by a computing component other than a service.

A "skill" may represent a functional unit that a service exposes and offers to consumers (e.g., other services). This functional unit (also referred to as "service functionality" or "functionalities") can include all or a subset of the total functionality associated with a service. In some embodiments, skills may be scoped where access is controlled based on access and/or authorization policies and/or based on an association with a particular namespace. A skill may be provided in multiple versions in which one or more aspects of the skill differs from other versions, where each skill version represents a specific implementation of the skill. Each skill version may be identifiable using a unique skill identifier. Skills are intended to replace the capabilities of previous implementations (e.g., labels/tags that could be toggled on and off) and to enable enhanced and more accurate progress tracking of a region build as well as improved root cause analysis functionality when errors or unexpected events occur in the build. A skill may be monitored for health and may be configured to maintain health data. A "skill" may collectively refer to any suitable number of data structures in which data defining the skill may be maintained. Skills may be associated with an identifier (e.g., a phonebookID) that identifies one or more entities or contacts. Services may specify a skill's run-time dependencies using one or more user interfaces provided by Puffin, while build-time skill dependencies may be declared within a SPAM and reflected in one or more user interfaces hosted by Puffin.

A "fleet" refers to a logical environment (e.g., preproduction, production, etc.) to which a skill can be scoped. By way of example, a skill associated with a production fleet may be separate from a skill of the same name utilized with a preproduction fleet. A "project" may be similarly utilized to scope skills. In some embodiments, a skill may be scoped/applied to a particular environment based at least in part on any suitable combination of attributes such as skillID, skillversionID, compartmentID, namespaceID, producerServiceID, skillName, fleet, project, or the like, that collectively identify a particular application of a skill.

A "service plan specification" or "service plan," for brevity, refers to any suitable document or data that specifies a build implementation of a given service. A service plan may include any suitable combination of build milestones, execution units, and flock configurations. In some embodiments, service plans describe preconditions (e.g., via skill dependencies) and post-conditions (e.g., skills published/installed) for each step along of path of installing a service. A service plan may detail specific releases that may be needed (or that are needed) to build a service and the order by which the releases are to be performed to build the service. A service plan may separate inter-service coordination and intra-service coordination and/or may specify the expected state of a service at any suitable point of a region build.

A "service manifest" or "manifest," for brevity, identifies the versions for flock configs and artifacts that are to be used to build a service. A service manifest may include a collection of service manifest items, each service manifest item identifying a particular flock config or artifact that may be needed (or is needed) to build a service. In some embodiments, a service manifest item may be associated with a git commit hash of the flock and all version declarations for any artifact that is required in application releases for that service's build.

A "SPAM" (also referred to as a "service build description") refers to a combination of a service plan and a manifest that collectively provide a deterministic specification of the process for building a service and, in some cases, uninstalling the service to revert to an earlier working state. In some embodiments, a SPAM details a combination and order of releases that may be needed (or is needed) to build the service. A manifest of the SPAM may define all resources to be used for the releases, while the service plan specifies an order of release execution based on capability dependencies. A SPAM may be used to track compliance of a region build. A SPAM details the releases that may be necessary (or are necessary) to build a service where each release may be associated with pre-conditions and post-conditions. The preconditions may refer to skills that may (or in some instances, must) be present such that a release can be created that will result in the postconditions being satisfied. The post-conditions may be skills that should (or in some cases, must) be published as a consequence of the release succeeding. SPAMs may be created by service teams and are derived from YAML files they author. The SPAM may be delineated into discrete sections, including execution units which define transitions between well-defined points in the service's build, known as "build milestones." A service may transition from one build milestone to the next by performing the releases defined by an execution unit. Execution units may specify the external dependencies (capabilities) that may be (or are) required to perform the releases defined within the unit. Build milestones may specify the capabilities published by the service that should (or in some cases, must) be made available once the service has reached that milestone. In some embodiments, the capabilities specified by a build milestone include capabilities that are intended for consumption by other services.

A "SPAM set" refers to a collection on SPAMs that are mutually compatible and/or that are previously associated with one another. A SPAM set may be used to derive a version set with which a directed acyclic graph may be generated and used to drive operations for building a data center. In some embodiments, a SPAM set may be associated with a scope and/or a regional context.

A "build strategy" may include cross-SPAM rules that may be enforced by a Region Orchestrator to ensure specific orderings of particular build steps. Build strategies, which may be defined globally, may be used to describe and validate complex laddering that occurs to bring up mutually dependent services at runtime as well as broader rules around the ordering of services during region build. Build strategies may act as guardrails on dependencies between tightly coupled skills/services and enable the system to catch violations of contracts earlier than region build. In some embodiments, build strategies may be developed and updated by architects from affected service teams. A build strategy may include a set of rules with each rule having pre-conditions, post-conditions, and a name or other suitable identifier. Pre and/or post conditions of a rule may be declared as being implemented by a SPAM (e.g., an execution unit of a SPAM) or by another build strategy. A build strategy may be versioned (e.g., using major/minor/patch designations). A minor version changes may add new rules, patch version changes may include updates to non-functional portions of the build strategy.

A "build milestone" (also referred to as a "stage") refers to an entity defined in a service plan that identifies a synchronization point between the service build (e.g., the process for building a particular service) and the rest of the data center build. Build milestones refer to stages involved in the deployment of a service in a region under build (e.g., a data center being built within a region). Build milestones may be defined coarsely to limit their number and provide a high-level overview of the process for building a service. As a non-limiting example, a set of build milestones for a service may include "absent" (e.g., a default starting milestone), "service functionality X available," "service available," and "service build complete."

An "execution unit" refers to another entity of a service plan. One or more execution units may describe the process for transitioning from one build milestone to the next via a directed acyclic graph of CIOS releases (e.g., infrastructure and/or application releases). Execution units may represent a series of infrastructure and application installations/changes (e.g., bring up a load-balancer) to transition from one build milestone to the nest, or to un-install infrastructure or applications (e.g., tear down the load-balancer). An execution unit may define releases across one or more execution targets. In some embodiments, build dependencies (expressed as skills that depend on another skill) may be met (and in some cases, must be met) before an execution unit can be invoked. Execution unit definitions may be used to describe the workflow to transition a service from one build milestone to another along with the required preconditions (e.g., installed and available skills) and postconditions (e.g., skills that will be installed and made available through execution the releases of the execution unit). In some embodiments, an execution unit can declare that it implements one or more build strategy rules.

"Execution context" refers to one or more inputs of a region build planner that may be used to override execution of specific steps within one or more SPAMs of a SPAM set. The execution context (e.g., input data to the region build planner) may define specific milestones to reach for one or more SPAMs and may specify plan concurrency (e.g., SPAMs which may be concurrently executed).

An "execution target checkpoint" or "ET checkpoint," for brevity, refers to a defined point in the data center build of a given execution target (e.g., a set of devices, a tenancy, etc.). An ET checkpoint may be associated with certain preconditions (e.g., required capability dependencies) and postconditions (capability publications) that are expected to have been met upon reaching that ET checkpoint. In some embodiments, steps identified within an execution unit may reference ET checkpoint transitions that may map logically to expected CIOS releases (e.g., infrastructure releases or application releases).

A "region archetype" or "region type" may represent an overall structure of a region (e.g., an ONSR region, a single-availability-domain-region, a first region in a realm) that could be used to impact a service's installation. In some embodiments, a service plan may reference dimensions of a region archetype to conditionally change the service plan definition.

A "version set" may be used to define all flock configuration file and artifact versions across all services in a specific regional context (e.g., given a specific region such as "region1" and a specific version set identifier such as "golden" or "break glass"). A version set may be composed of many version set items, each of which may specify a flock and the artifacts for that flock. These entities may identify the existence of SPAMs and SPAM sets. By way of example, in some embodiments, a version set may be associated with a corresponding SPAM set. Any suitable version set item may be associated with a SPAM from which it was derived and/or corresponding to a common service.

"Static analysis" refers to an execution of a static analysis of code (e.g., that identifies data center infrastructure components as objects using a declarative configuration language) to infer publications and/or dependencies (e.g., skill and/or publications and/or dependencies). In some embodiments, a static flock analysis may be performed utilizing an infrastructure-as-code software tool (e.g., Terraform®). In some embodiments, this software tool may generate one or more data structures (e.g., directed acyclic graphs) that represent these dependencies/publications. Each node in the graph may correspond to a flock config and/or a release, with edges identifying capability publications and/or dependencies between releases.

In some examples, techniques for implementing a Cloud Infrastructure Orchestration Service (CIOS) are described herein. Such techniques, as described briefly above, can be configured to manage bootstrapping (e.g., provisioning and deploying software to) infrastructure components within a cloud environment (e.g., a region). In some instances, the CIOS can include computing components (e.g., a CIOS Central and a CIOS Regional) that may be configured to manage bootstrapping tasks (provisioning and deployment) for a given service and an Orchestrator (e.g., a multi-flock orchestrator) configured to initiate/manage region builds (e.g., bootstrapping operations corresponding to multiple services in a region/data center).

CIOS enables region/data center building and world-wide infrastructure provisioning and code deployment with minimal manual run-time effort from service teams (e.g., beyond an initial approval and/or physical transportation of hardware, in some instances). The high-level responsibilities of CIOS include, but are not limited to, coordinating region builds in an automated fashion with minimal human intervention, providing users with a view of the current state of resources managed by the CIOS (e.g., of a region, across regions, world-wide, etc.), and managing bootstrapping operations for bootstrapping resources within a region.

The CIOS may provide view reconciliation, where a view of a desired state (e.g., a desired configuration) of resources may be reconciled with a current/actual state (e.g., a current configuration) of the resources. In some instances, view reconciliation may include obtaining state data to identify what resources are actually running and their current configuration and/or state. Reconciliation can be performed at a variety of granularities, such as at a service level.

CIOS can perform plan generation, where differences between the desired and current state of the resources are identified. Part of plan generation can include identifying the operations that would need to be executed to bring the resources from the current state to the desired state. Once the user is satisfied with a plan, the plan can then be marked as approved or rejected. Thus, users can spend less time reasoning about the plan and the plans are more accurate because they are machine generated. Plans are almost too detailed for human consumption; however, CIOS can provide this data via a sophisticated user interface (UI).

In some examples, CIOS can handle execution of change management by automatically executing the approved plan. Once an execution plan has been created and approved, engineers may no longer need to participate in change management unless CIOS initiates roll-back. CIOS can handle rolling back to a previous service version by automatically generating a plan that returns the service to a previous (e.g., pre-release) state (e.g., when CIOS detects service health degradation while executing).

CIOS can measure service health by monitoring alarms and executing integration tests. CIOS can help teams quickly define roll-back behavior in the event of service degradation, which it can later execute automatically. CIOS can automatically generate and display plans and can track approval. CIOS can combine the functionality of provisioning and deployment in a single system that coordinates these tasks across a region build. CIOS can discover dependencies between execution tasks at every level (e.g., resource level, execution target level, phase level, service level, etc.) through a static analysis (e.g., including parsing and processing content) of one or more configuration files. Using these dependencies, CIOS can generate various data structures from these dependencies that can be used to drive task execution (e.g., tasks regarding provisioning of infrastructure resources and deployment of artifacts across the region).

Today, during Large Scale Events (LSEs) (e.g., events in which a substantial error, blockage, or delay is experienced in a region build), incident management and region build operators frequently incur wide-spread overhead and sometimes delays, e.g., in collecting status, attribution of the issue, assessment of impacts, and the recovery of services, due to the heavily human-based and non-systemic approach of conventional approaches. Due to the complexity of the various dependencies between services, it can be extremely difficult and time intensive for operators to identify the contributing cause of the event. This causes delays in remediation as well as the ability to assess when an event has concluded. Similarly, building a region includes challenges in which human involvement may be utilized to troubleshoot and/or detect of failures or blocking situations. Conventionally, it is difficult for service teams to determine what dependencies exist for their service. Both the dependencies the service may have on other services, and vice versa. Additionally, service teams have incomplete indicators ahead of an actual region build as to whether their region build design will have critical issues (such as cyclic dependencies) that prevent or delay the build of their service.

FIG. 1 is a block diagram of an environment 100 in which a Cloud Infrastructure Orchestration System (CIOS) 102 may operate to dynamically bootstrap services in a region/data center, according to at least one embodiment. CIOS 102 can include, but is not limited to, the following components: Real-time Regional Data Distributor (RRDD) 104, Orchestrator 106, CIOS Central 108, CIOS Regional 110, Capabilities Service 112, Virtual Bootstrap Environment 116, Puffin Central 118, Puffin Regional 120, and Alarm Service(s) 122. Specific functionality provided by CIOS Central 108 and CIOS Regional 110 is described in more detail in U.S. application Ser. No. 17/016,754, entitled "Techniques for Deploying Infrastructure Resources with a Declarative Provisioning Tool," the entire contents of which are incorporated in its entirety for all purposes. In some embodiments, any suitable combination of the components of CIOS 102 may be provided as a service. In some embodiments, some portion of CIOS 102 may be deployed to a region (e.g., a data center represented by host region 103). In some embodiments, CIOS 102 may include any suitable number of cloud services (not depicted in FIG. 1) discussed in further detail below with respect to FIGS. 2 and 3.

Real-time Regional Data Distributor (RRDD) 104 may be configured to maintain and provide region data that identifies realms, regions, execution targets, and availability domains. In some cases, the region data may be in any suitable form (e.g., JSON format, data objects/containers, XML, etc.). Region data maintained by RRDD 104 may include any suitable number of subsets of data which can individually be referenceable by a corresponding identifier. By way of example, an identifier "all_regions" can be associated with a data structure (e.g., a list, a structure, an object, etc.) that includes a metadata for all defined regions. As another example, an identifier such as "realms" can be associated with a data structure that identifies metadata for a number of realms and a set of regions corresponding to each realm. In general, the region data may maintain any suitable attribute of one or more realm(s), region(s), availability domains (ADs), execution target(s) (ETs), and the like, such as identifiers, DNS suffixes, states (e.g., a state of a region), and the like. The RRDD 104 may be configured to manage region state as part of the region data. A region state may include any suitable information indicating a state of bootstrapping within a region. By way of example, some example region states can include "initial," "building," "production," "paused," or "deprecated." The "initial" state may indicate a region that has not yet been bootstrapped. A "building" state may indicate that bootstrapping of one or more flocks within the region has commenced. A "production" state may indicate that bootstrapping has been completed and the region is ready for validation. A "paused" state may indicate that CIOS Central 108 or CIOS Regional 110 has paused internal interactions with the regional stack, likely due to an operational issue. A "deprecated" state may indicate the region has been deprecated and is likely unavailable and/or will not be contacted again.

CIOS Central 108 is configured to provide any suitable number of user interfaces with which users (e.g., user 109) may interact with CIOS 102. By way of example, users can make changes to region data via a user interface provided by CIOS Central 108. CIOS Central 108 may additionally provide a variety of interfaces that enable users to: view changes made to flock configs and/or artifacts, generate and view plans, approve/reject plans, view status on plan execution (e.g., corresponding to tasks involving infrastructure provisioning, deployment, region build, and/or desired state of any suitable number of resources managed by CIOS 102. CIOS Central 108 may implement a control plane configured to manage any suitable number of CIOS Regional 110 instances. CIOS Central 108 can provide one or more user interfaces for presenting region data, enabling the user 109 to view and/or change region data. CIOS Central 108 can be configured to invoke the functionality of RRDD 104 via any suitable number of interfaces. Generally, CIOS Central 108 (also referred to as a "provisioning and deployment manager") may be configured to manage region data, either directly or indirectly (e.g., via RRDD 104). CIOS Central 108 may be configured to compile flock configs (and/or SPAMs) to inject region data as variables within the flock configs (and/or SPAMs). CIOS Central 108 may be instructed (e.g., by Orchestrator 106) to perform one or more releases (e.g., infrastructure or application releases) corresponding to flock configs.

Each instance of CIOS Regional 110 may correspond to a module configured to execute bootstrapping tasks that are associated with a single service of a region (e.g., a data center such as host region 103). CIOS Regional 110 can receive desired state data from CIOS Central 108. In some embodiments, desired state data may include a flock config that declares (e.g., via declarative statements) a desired state of resources associated with a service. CIOS Central 108 can maintain current state data indicating any suitable aspect of the current state of the resources associated with a service. In some embodiments, CIOS Regional 110 can identify, through a comparison of the desired state data and the current state data, that changes that may be (or are) needed to one or more resources. For example, CIOS Regional 110 can determine that one or more infrastructure components need to be provisioned, one or more artifacts deployed, or any suitable change that may be (or is) needed to the resources of the service to bring the state of those resources in line with the desired state. As CIOS Regional 110 performs bootstrapping operations, it may publish data indicating various capabilities of a resource as they become available. A "capability" identifies a unit of functionality associated with a service. The unit could be a portion, or all of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use. In some embodiments, CIOS Regional 110 may transmit data indicating a state transition of a skill. By way of example, in some embodiments, CIOS Regional 110 performs bootstrapping operations which result in publishing a skill (e.g., transmitting skill metadata including a skill state value indicating the skill is installed). The skill metadata may be transmitted to Puffin (e.g., Puffin Regional 120) and used to update the skill state of the corresponding skill.

Capabilities Service 112 is configured to maintain capabilities data that indicates 1) what capabilities of various services are currently available, 2) whether any resource/service is waiting on a particular capability, 3) what particular resources and/or services are waiting on a given capability, or any suitable combination of the above. Capabilities Service 112 may provide an interface with which capabilities data may be requested. Capabilities Service 112 may provide one or more interfaces (e.g., application programming interfaces) that enable it to transmit capabilities data to Orchestrator 106, CIOS Regional 110 (e.g., each instance of CIOS Regional 110), Puffin Regional 120, and/or Puffin Central 118. In some embodiments, Capabilities Service 112 may store capabilities data in a data store that is accessible to one or more components of CIOS 102. Orchestrator 106, CIOS Regional 110 (e.g., each instance of CIOS Regional 110), Puffin Regional 120, and/or Puffin Central 118, and/or any suitable component or module of CIOS Regional 110 may be configured to request capabilities data from Capabilities Service 112 or otherwise obtain capabilities data (e.g., from a data store configured to store capabilities data generated by the Capabilities Service 112). Although the Capabilities Service 112 is depicted as being a separate component of CIOS 102, it should be appreciated that, in some embodiments, the functionality provided by Capabilities Service 112 may be provided, in whole or in part, as part of the Skills Service via any suitable combination of Puffin Central 118 and Puffin Regional 120.

In some embodiments, each regional component such as CIOS Regional 110, Capabilities Service 112, Puffin Regional 120, and/or Virtual Bootstrap Environment 116 may be one of many regional components. Each regional component may be specific to a given region (e.g., as depicted in FIG. 1, Host Region 103). Therefore, another region may include similar, but separate, components that are specific to that region. In some embodiments, central components (e.g., Orchestrator 106, CIOS Central 108, RRDD 104, and Puffin Central 118) may include one or more components that are configured to manage build operations corresponding to one or more regions. By way of example only, a single orchestrator (Orchestrator 106) may be utilized to manage bootstrapping operations for building any suitable number of data centers, or multiple instances of Orchestrator 106 may be utilized, each driving the bootstrapping operations for a subset of those data centers or a single data center.

In some embodiments, Orchestrator 106 (an example of which may be a multi-flock orchestrator, an orchestration service, etc.) may be configured to drive region build efforts. In some embodiments, Orchestrator 106 can manage information that describes which flock config versions and/or artifact versions are to be utilized to bootstrap a given service within a region (or to make a unit of change to a target region). In some embodiments, Orchestrator 106 may manage any suitable combination of flock configs and/or service plans. In some embodiments, Orchestrator 106 may be configured to monitor (or be otherwise notified of) changes to the region data managed by Real-time Regional Data Distributor 104. In some embodiments, receiving an indication that region data has been changed may cause a region build to be triggered by Orchestrator 106. In some embodiments, Orchestrator 106 may collect various flock configs, artifacts, and/or SPAMs to be used for a region build. Some, or all, of the flock configs and/or SPAMs may be configured to be region agnostic. That is, the flock configs and/or SPAMs may not explicitly identify what regions to which the flock is to be bootstrapped. In some embodiments, Orchestrator 106 may trigger a data injection process through which the collected flock configs and/or SPAMs are recompiled (e.g., by CIOS Central 108). During recompilation, operations may be executed (e.g., by CIOS Central 108) to cause the region data maintained by Real-time Regional Data Distributor 104 to be injected into the config files and/or SPAMs. Flock configs and/or SPAMs can reference region data through variables/parameters without requiring hard-coded identification of region data. The flock configs and/or SPAMs can be dynamically modified at run time using this data injection rather than having the region data be hardcoded, and therefore, and more difficult to change.

In some embodiments, Orchestrator 106 can perform a static flock analysis in which the flock configs and/or service plans are parsed to identify dependencies between resources, execution targets, execution target checkpoints, phases, and flocks, and in particular to identify circular dependencies that need to be removed. In some embodiments static flock analysis (SFA) data corresponding to this analysis may be stored (e.g., via DB 312) for subsequent use. In some embodiments, Orchestrator 106 can generate any suitable number of data structures based on the dependencies identified. These data structures (e.g., directed acyclic graph(s), linked lists, etc.) may be utilized by CIOS 102 to drive operations for performing a region build. By way of example, these data structures may collectively define an order by which services are bootstrapped within a region. An example of such a data structure is discussed further below with respect to Build Dependency Graph 338 of FIG. 3. If circular dependencies (e.g., service A requires service B and vice versa) exist and are identified through the static flock analysis and/or graph, Orchestrator 106 may be configured to notify any suitable service teams that changes are required to the corresponding flock config to correct these circular dependencies. Orchestrator 106 can be configured to traverse one or more data structures to manage an order by which services are bootstrapped to a region. Orchestrator 106 can identify (e.g., using data obtained from Capabilities Service 112) capabilities available within a given region at any given time. Orchestrator 106 may utilize this data to identify when it can bootstrap a service, when bootstrapping is blocked, and/or when bootstrapping operations associated with a previously blocked service can resume. Based on this traversal, Orchestrator 106 can perform a variety of releases in which instructions are transmitted by Orchestrator 106 to CIOS Central 108 to perform bootstrapping operations corresponding to any suitable number of flock configs. In some examples, Orchestrator 106 may be configured to identify that one or more flock configs may require multiple releases due to circular dependencies found within the graph. As a result, Orchestrator 106 may transmit multiple instruction sets to CIOS Central 108 for a given flock config to break the circular dependencies identified in the graph.

In some embodiments, one or service plan and manifests (SPAMs) may be utilized by the Orchestrator 106. A service plan and manifest may provide a deterministic specification of a build description for a service than previously provided by one or more flock configs. While flock configs specify aspects of a single release associated with a single service, a service plan may provide a single specification of the order and conditional requirements for executing all of the releases that may be needed (or are needed) to build a given service. Previous implementations of flock configs included optional dependencies which allowed for a degree of indeterministic behavior with respect to the order of operations performed during a region build. The inclusion of optional dependencies may require the Orchestrator 106 to perform multiple passes of the build dependency graph, resulting in wasteful processing. These types of dependencies make it difficult, if not impossible, for the system to track region build progress, identify remaining operations yet to be performed, and/or identify build completion. Service plans and manifests (SPAMs) may be utilized to eliminate at least some of the drawbacks to previous indeterministic approaches.

SPAMs (one SPAM corresponding to one service to be bootstrapped in the region) allow service teams to describe the corresponding operations that may be needed (or are needed) to build their service and may allow for separation between internal coordination (e.g., coordination of operations internal to the service) and external coordination (e.g., coordination of operations between components of different services). A number of visualizations may be provided (e.g., via Orchestrator 106 or any suitable component of CIOS 102) via one or more user interfaces. One visualization may depict a directed acyclic graph describing the build operations internal to a given service, and a separate visualization may depict a directed acyclic graph describing the order of build operations corresponding to multiple services (e.g., all services of the region/data center). As a specific example, one or more visualization can present a region-level directed acyclic graph (DAG) including only external coordination (e.g., an order of operations corresponding to coordination between services) while omitting operations that are internal with respect to each service. This DAG, for example, may depict nodes corresponding to one service's capabilities (or skills) on which other services depend, while excluding nodes corresponding to capability (or skill) dependencies between service components/functional units of the same service.

A SPAM may include an external interaction interface that includes a service build definition that includes a number of build milestones. Each build milestone may be associated with a set of capabilities (and/or skills) that the service is expected to publish upon reaching a given milestone. To transition between build milestones, the SPAM may include execution units that encapsulate a directed acyclic graph (DAG) of one or more releases, each release being equivalent to operations previously defined with a single flock config. Each execution unit may define a set of build time dependencies that identify one or more capabilities (and/or skills) that are required by at least one of the releases of the execution unit.

A SPAM may include a service build implementation. An execution unit of the SPAM may describe one or more releases that may be needed (or are needed) to build a service, with potentially multiple execution units being defined. Each execution unit may be associated with one or more execution target checkpoint transitions, each of which may be used to specify the expected capabilities that should be available before the time of the release and the capabilities that should be published as the result of performing the release.

In some embodiments, the Orchestrator 106 may be configured to aggregate SPAMs corresponding to each service to be deployed in a region to generate a larger directed acyclic graph (e.g., the Build Dependency Graph 338 of FIG. 3) which may capture all of the operations necessary to build a region/data center. The collection of SPAMs identified from this aggregation may be referred to as a "SPAM set." In some embodiments, the Orchestrator 106 may utilize the DAG generated from a SPAM set to validate a DAG and/or operations performed using flock configs, while the DAG generated from flock configs is used to drive build operations/release execution. Alternatively, the Orchestrator 106 may utilize the DAG generated from the SPAM set to drive build operations/release execution. The utilization of a SPAM/SPAM set may be utilized by the system to generate a deterministic execution plan with which the region build may be executed.

In some embodiments, Puffin Central 118 may provide a number of user interfaces with which one or more skills can be defined. A skill may be used with, or in lieu of, previously capabilities and enables improvements over previous capabilities-based implementations. In contrast with capabilities, skills may be scoped (e.g., controllable through access and authorization policies), versioned, and attributed to a particular service and/or contact. Skills may be associated with a lifecycle and may be monitored for health and are designed to be more highly visible/accessible than capabilities. Puffin Central 118 may provide an authoritative registry for skills. Various user interfaces managed by Puffin Central 118 may be utilized to define, maintain, and manage skills that each service offers, as well as their dependency relationships with other services. Puffin Central 118 may be utilized to declare and persist strongly defined metadata of services in a versioned manner. This metadata may be used to generate a blueprint for build-time and run-time dependencies. These blueprints can be used to validate build plans, to drive orchestration decisions during region build, and to improve time-to-engage and time-to-diagnose measures during region build and/or Large-Scale Events (LSEs).

Puffin Central 118 may be configured to serve as a source of truth for services and may maintain metadata including each service's upstream and downstream dependencies and service team contact information and methods for each service across regions and realms (e.g., a set of regions). Each skill may represent a function unit that a service exposes and offers to consumers (e.g., other services). In some embodiments, skills may be scoped where access is controlled based on access and/or authorization policies and/or based on an association with a particular namespace. A skill may be associated with multiple versions in which one or more aspects of the skill differs from previous versions, where each skill version represents a specific implementation of the skill. Each skill version may be identifiable using a unique skill identifier. In some embodiments, Puffin Central 118 may be configured to generate a skill corresponding to a previously defined capability in order to provide backward compatibility with previous capabilities-based region build implementations.

In some embodiments, Puffin may maintain compatibility between skills and capabilities, such that any suitable combination of the two may be utilized to define a process by which a service is to be built. Based on maintaining a mapping between skills and/or capabilities a service publishes, Puffin may ensure that a skill may be transitioned based on capabilities and/or a capability may be published due to a state change of a corresponding skill. In some embodiments, Puffin may generate "shadow skills" (e.g., system-generated skills that represent corresponding capabilities) and/or shadow capabilities (e.g., system-generated capabilities that publish when a corresponding skill is transitioned to an installed state). These features, provided by Puffin, enable the orchestrator to use any suitable combination of skills and/or capabilities to drive orchestration during a region build (e.g., during a process for building a data center).

In some embodiments, a skill may be mapped to one or more capabilities. Puffin Regional 120 may be configured to publish and/or store skills metadata based on capabilities data published (or stored) by the Capabilities Service 112. In some embodiments, Puffin Regional 120 may publish capabilities data to the Capabilities Service 112 and/or store such data based at least in part on publishing a skill or identifying a skill has transitioned to or is otherwise associated with a particular state. In some embodiments, some services may utilize flock configurations that express progress using capabilities, while other services may utilize a service plan and manifest that defines a deterministic build process in which progress is expressed with capabilities and/or skills. Using the mapping (or multiple mappings) between skills and capabilities, Puffin Regional 120 may enable a region build to be performed using any suitable combination of capabilities and/or skills to indicate that 1) service or resource functionality is available, 2) a particular event has transpired, 3) a particular fact is true, 4) a condition has been met, or any suitable combination of the above. This mapping or mappings enable CIOS 102 to perform a region build/data center build using any suitable combination of capabilities and/or skills, enabling service teams to transition from capabilities-based implementations to skills-based implementations gradually.

In some embodiments, any suitable computing component of the Puffin Service (e.g., Puffin Central 118 and/or Puffin Regional 120) may be configured to monitor the health and/or lifecycle of a skill according to a predefined skill lifecycle. Health monitoring may be performed using one or more alarms that are associated with a given skill. In some embodiments, a telemetry service (e.g., an example of alarm service(s) 122) may utilize an application programming interface provided by the Puffin Service (including Puffin Central 118 and/or Puffin Regional 120) when an alarm is triggered. As another example, the Puffin Service (e.g., Puffin Regional 120) may request alarm data from the alarm service(s) 122 and/or from storage locations at which the alarm service(s) 122 store the alarm data. The Puffin Service may present, via one or more user interfaces, information related to the health of a skill based on the alarms corresponding to the alarm data obtained and their corresponding association to a given skill.

In some embodiments, the Puffin Service (e.g., Puffin Central 118 and/or Puffin Regional 120) may expose one or more application programming interfaces (APIs) with which validation operations may be performed. By way of example, a SPAM describing the build process with respect to one or more services may be provided via a given API (e.g., by the Orchestrator 106). The Puffin Service (e.g., Puffin Central 118) may execute any suitable operations for validating that all services and skills identified in the SPAM have been previously registered with the Puffin Service and that the build process defined in the SPAM does not violate previously defined dependency relationships maintained by the Puffin Service. Additionally, or alternatively, Orchestrator 106 may perform any suitable validation check such as determining whether each flock config and/or artifact identified in a given service's manifest is referenced within the service's corresponding service plan and/or that no flock config and/or artifact is referenced within the service plan that is not referenced within the manifest. Orchestrator 106 may perform validation operations (e.g., a static analysis including parsing the service plan) to determine that a service plan lacks circular dependencies. If a circular dependency is found within a service plan, Orchestrator 106 may provide a notification and/or restrict the service plan and corresponding manifest from being utilized. In some embodiments, such restrictions may include restricting the service plan and manifest from being added to a SPAM set (e.g., a set of SPAMs to be used to perform a region build). In some embodiments, the Orchestrator 106 may perform any suitable validation operations to ensure that SPAMs of a SPAM set and/or a SPAM that is being considered as an addition to a preexisting SPAM set are mutually compatible. This may include analyzing the SPAM set (alone or with a SPAM that is being considered for addition) to ensure that the SPAMs of the SPAM set do not include circular dependencies.

In some embodiments, a user can request that a new region (e.g., target region 114) be built. This can involve bootstrapping resources corresponding to a variety of services. In some embodiments, target region 114 may not be communicatively available (and/or secure) at a time at which the region build request is initiated. Rather than delay bootstrapping until such time as target region 114 is available and configured to perform bootstrapping operations, CIOS 102 may initiate the region build using a virtual bootstrap environment (e.g., Virtual Bootstrap Environment (ViBE) 116. ViBE 116 may be an overlay network that is hosted by host region 103 (a preexisting region that has previously been configured with a core set of services and which is communicatively available and secure). Orchestrator 106 can leverage resources of the host region 103 to bootstrap resources to the VIBE 116 (generally referred to as "building the ViBE"). By way of example, Orchestrator 106 can provide instructions through CIOS Central 108 that cause an instance of CIOS Regional 110 within a host region (e.g., host region 103) to bootstrap another instance of CIOS Regional within the VIBE 116. Once the CIOS Regional within the ViBE is available for processing, bootstrapping the services for the target region 114 can continue within the VIBE 116. When target region 114 is available to perform bootstrapping operations, the previously bootstrapped services within ViBE 116 may be migrated to target region 114. Utilizing these techniques, CIOS 102 can greatly improve the speed at which a region is built by drastically reducing the need for any manual input and/or configuration to be provided. In some embodiments, any suitable combination of the components depicted as part of CIOS 102 may individually be examples of the cloud services of FIGS. 23-26 (e.g., 2356 of FIG. 23) and may be configured to operate in any suitable infrastructure pattern such as the examples described below in connection with FIGS. 23-26.

Figure 2:
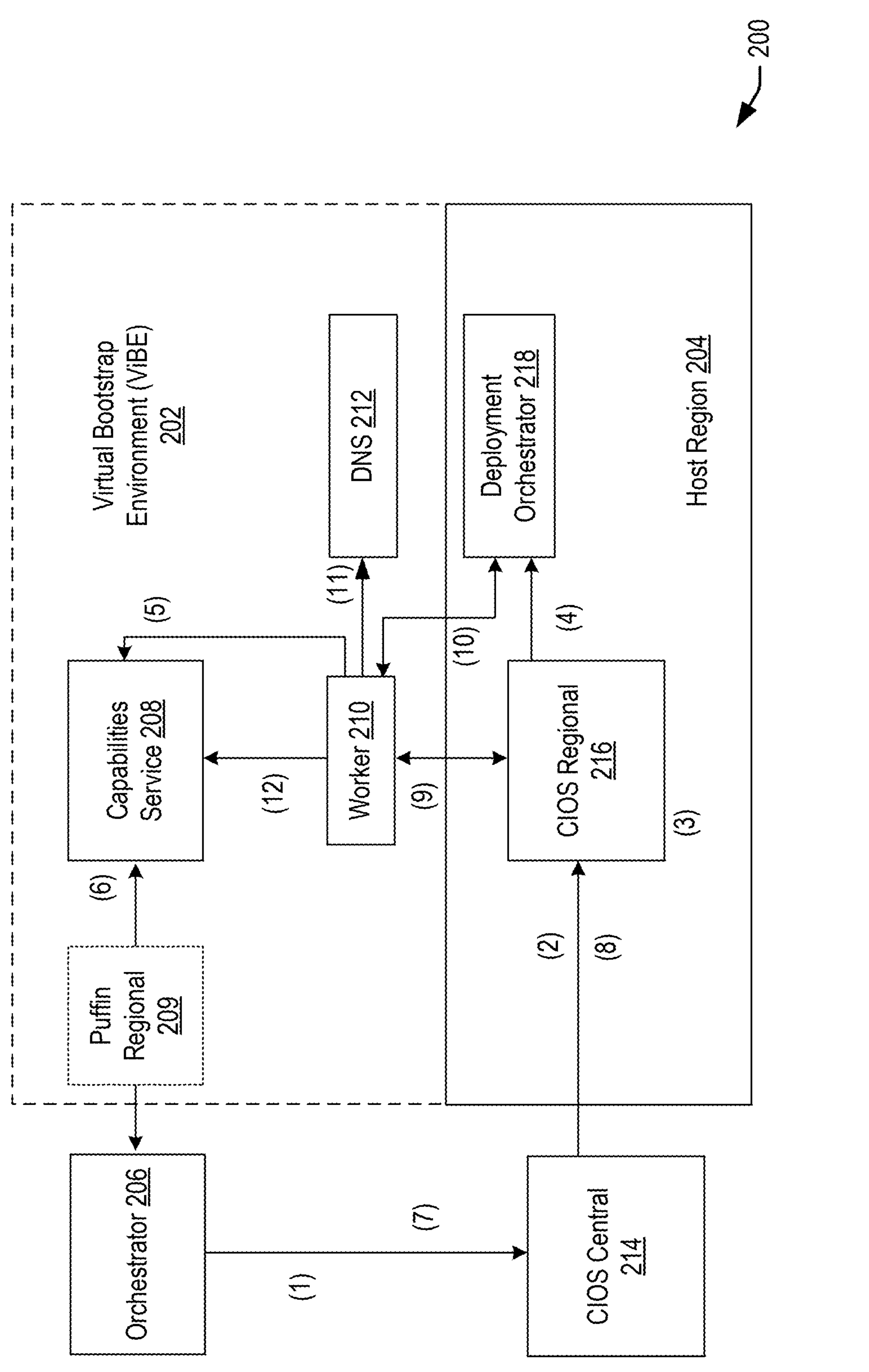
FIG. 2 is a block diagram for illustrating an environment and method for building a virtual bootstrap environment (ViBE), in accordance with at least one embodiment.

FIG. 2 is a block diagram for illustrating an environment and method 200 for building a virtual bootstrap environment (ViBE) 202 (an example of ViBE 116 of FIG. 1), according to at least one embodiment. ViBE 202 represents a virtual cloud network that is provisioned in the overlay of an existing region (e.g., host region 204, an example of the host region 103 of FIG. 1 and in an embodiment is a Host Region Service Enclave). ViBE 202 represents an environment in which services can be staged for a target region (e.g., a region under build such as target region 114 of FIG. 1) before the target region becomes available.

In order to bootstrap a new region (e.g., target region 114 of FIG. 1), a core set of services may be bootstrapped. While those core set of services exist in the host region 204, they do not yet exist in the ViBE (nor the target region). These essential core services provide the functionality needed to provision devices, establish a chain of trust to the new region, and deploy remaining services into a region. The VIBE 202 may be a tenancy that is deployed in a host region 204 and used as a virtual region.

When the target region is available to provide bootstrapping operations, the VIBE 202 can be connected to the target region so that services in the ViBE can interact with the services and/or infrastructure components of the target region. This will enable deployment of production level services, instead of self-contained seed services as in previous systems, and may be connected over the internet to the target region. Conventionally, a seed service was deployed as part of a container collection and used to bootstrap dependencies necessary to build out the region. Using infrastructure/tooling of an existing region, resources may be bootstrapped (e.g., provisioned and deployed) into the VIBE 202 and connected to the service enclave of a region (e.g., host region 204) in order to provision (reserve and/or configure) hardware and deploy services until the target region is self-sufficient and can be communicated with directly. Utilizing the ViBE 202 allows for meeting the dependencies and providing the services needed to be able to provision/prepare infrastructure and deploy software while making use of the host region's resources in order to break circular dependencies of core services.

Orchestrator 206 (an example of Orchestrator 106 of FIG. 1) may be configured to perform operations to build (e.g., configure) ViBE 202. Orchestrator 206 can obtain applicable flock configs and/or SPAMs corresponding to various resources to be bootstrapped to the new region (in this case, a ViBE region, ViBE 202). By way of example, Orchestrator 206 may obtain a flock config (e.g., a "ViBE flock config") that identifies aspects of bootstrapping Capabilities Service 208 (e.g., an example of Capabilities Service 112) and/or Worker 210. In some embodiments, Orchestrator 206 may additionally obtain a flock configuration identifying aspects of bootstrapping any suitable portion of a skills service (e.g., Puffin Regional 120 of FIG. 1). In some embodiments, one or more service plan and manifests (SPAMs) may be used to identify these aspects (e.g., specifying operations previously defined in one or more flock configuration files and/or the resources/artifacts that may be needed (or are needed) to bootstrap a service from start to finish) for bootstrapping any suitable combination of Capabilities Service 208, Worker 210, and/or Puffin Regional 209. As another example, Orchestrator 206 may obtain another flock config and/or SPAM corresponding to bootstrapping Domain Name Service (DNS) 212 to ViBE 202.

The method 200 may begin at step 1, where Orchestrator 206 may instruct CIOS Central 214 (e.g., an example of CIOS Central 108 and CIOS Central 214 of FIGS. 1 and 2, respectively). For example, Orchestrator 206 may transmit a request (e.g., including the ViBE flock config, which may be one flock config identified in a service plan) to request bootstrapping of the Capabilities Service 208 and Worker 210 (and in some embodiments, Puffin Regional 209) that, at this time do not yet exist in the VIBE 202. In some embodiments, a corresponding SPAM for the Capabilities Service 208, Worker 210, and/or Puffin Regional 209 may be utilized in lieu of or in addition to the ViBE flock config. 1*n* some embodiments, CIOS Central 214 may have access to all flock configs and/or SPAMs. Therefore, in some examples, Orchestrator 206 may transmit an identifier for the ViBE flock config and CIOS Central 214 may independently obtain the ViBE flock config from storage (e.g., from database (DB) 308 or DB 312 of FIG. 3).

At step 2, CIOS Central 214 may provide the ViBE flock config via a corresponding request to CIOS Regional 216. CIOS Regional 216 may parse the ViBE flock config to identify and execute specific infrastructure provisioning and deployment operations at step 3.

In some embodiments, the CIOS Regional 216 may utilize additional corresponding services for provisioning and deployment. For example, at step 4, CIOS Regional 216 CIOS Regional may instruct deployment orchestrator 218 (e.g., an example of a core service, or other write, build, and deploy applications software, of the host region 204) to execute instructions that in turn cause Capabilities Service 208, Worker 210, and in some embodiments Puffin Regional 209, to be bootstrapped within ViBE 202.

At step 5, capabilities data may be transmitted to the Capabilities Service 208 (from the CIOS Regional 216, Deployment Orchestrator 218 via the Worker 210 or otherwise) indicating that resources corresponding to the ViBE flock are available. Capabilities Service 208 may persist this data. In some embodiments, the Capabilities Service 208 adds this information to a list it maintains of available capabilities with the VIBE. By way of example, the capability provided to Capabilities Service 208 at step 5 may indicate the Capabilities Service 208 and Worker 210 (and in some embodiments, Puffin Regional 209) are available for processing. In some embodiments, skills metadata may be transmitted to Puffin Regional 209 indicating that any suitable combination of functionality corresponding to the Capabilities Service 208, Worker 210, and/or Puffin Regional 209 is available.

At step 6, Orchestrator 206 may identify that the Capabilities Service 208, Worker 210, and/or Puffin Regional 209 are available based on receiving or obtaining data (an identifier corresponding to a capability and/or skill) from the Capabilities Service 208 and/or Puffin Regional 209.

In some embodiments, published capabilities may be processed by Puffin Regional 209 (e.g., Puffin Regional 120 of FIG. 1) prior to processing by Orchestrator 206. In some embodiments, Puffin Regional 209 may be configured to provide forward and backward compatibility between skills and capabilities. By way of example, in some embodiments, if a capability is published to Puffin Regional 209, Puffin Regional 209 may query known skills (e.g., via a skills table or other suitable record of registered/previously generated skills) to check if any skill is associated with the capability. If no skill is associated with the capability, Puffin Regional 209 may be configured to create a skill (referred to as a "shadow skill) to represent the capability using the skill construct (e.g., including the data structures discussed below in connection with FIG. 4). When orchestrator 206 publishes skills (or updates skill state) during the process of performing a region build, Puffin Regional 209 may receive this data and identify one or more capabilities that are associated with the corresponding skill(s). Puffin Regional 209 may publish any or all capabilities associated with the skill that have not yet been published. In some embodiments, publishing such data may include storing an indication that these capabilities are available. In this manner, Puffin Regional 209 may support full compatibility between capabilities and skills such that any suitable combination of the two may be utilized to drive the operations performed during a region build.

Although some embodiments describe shadow skill generation being conducted at build time, it should be appreciated that the Puffin Service may generate shadow skills at any suitable time and according of a variety of methods. By way of example, historical capabilities data (e.g., capabilities data historically published during one or more previous region builds) may be obtained by the Puffin Service (e.g., Puffin Central 118 and/or Puffin Regional 120 of FIG. 1, and/or Puffin Regional 209 of FIG. 2, etc.) at any suitable time (e.g., prior to initiation of a region build, prior to deployment within the region, upon completion of region build, etc.). In some embodiments, the historical capabilities data may be stored (e.g., by an instance of Capabilities Service 112 of FIG. 1) in a data store that is accessible the Puffin Service. The Puffin Service may process the historical capabilities data (e.g., one or more files, records, tables, data structures, etc.) to identify one or more capabilities for which no corresponding skill currently exists. Identifying a corresponding skill may include matching any suitable portion of a tag or label of a capability with any suitable attribute and/or portion of an attribute (e.g., one or more tokens/words of a service name and/or identifier) associated with a service. A shadow skill may be generated by the Puffin Service for each historically published capability that fails to match any known skills. As described above, these shadow skills may be configured to represent a corresponding historically published capability and may be used to maintain compatibility between skills and capabilities, and between skill-based service build definitions (e.g., a SPAM) and capability-based service build definitions (e.g., a flock, a SPAM, etc.).

At step 7, as a result of receiving/obtaining the data at step 6, the Orchestrator 206 may instruct CIOS Central 214 to bootstrap a DNS service (e.g., DNS 212) to the ViBE 202. The instructions may identify or include a particular flock config and/or SPAM corresponding to the DNS service.

At step 8, the CIOS Central 214 may instruct the CIOS Regional 216 to deploy DNS 212 to the ViBE 202. In some embodiments, the DNS flock config and/or SPAM for the DNS 212 may be provided by the CIOS Central 214.

At step 9, Worker 210, now that it is deployed in the ViBE 202, may be assigned by CIOS Regional 216 to the task of deploying DNS 212. Worker may execute a declarative infrastructure provisioner in the manner described above in connection with FIG. 3 to identify a set of operations that are needed to deploy DNS 212. These operations may be identified based at least in part on from comparing the flock config (the desired state), or corresponding portion of a SPAM, to a current state of the (currently non-existing) resources associated with DNS 212.

At step 10, the Deployment Orchestrator 218 may instruct Worker 210 to deploy DNS 212 in accordance with the operations identified at step 9. As depicted, Worker 210 proceeds with executing operations to deploy DNS 212 to ViBE 202 at step 11. At step 12, Worker 210 may notify Capabilities Service 208 (via a capability) or Puffin Regional 209 (directly, or via Capabilities Service 208 and using a skill) that DNS 212 is available in ViBE 202. Orchestrator 206 may subsequently identify that the resources associated with the ViBE flock config and the DNS flock config are available any may proceed to bootstrap any suitable number of additional resources to the ViBE.

After steps 1-12 are concluded, the process for building the VIBE 202 may be considered complete and the VIBE 202 may be considered built and ready for additional bootstrapping (e.g., the bootstrapping of various cloud services such as cloud services 2356 of FIG. 23). At any suitable time during steps 1-12, Puffin Regional 209 may receive and/or obtain alarm data from one or more alarm services (e.g., the alarm service(s) 122 of FIG. 1). In some embodiments, the alarm data may be processed by Puffin Regional 209 (or Puffin Regional 209 may communicate the alarm data or data derived from the alarm data to Puffin Central 118 of FIG. 1). In some embodiments, Puffin Regional 209 (and/or Puffin Central 118) may communicate skill health information to Orchestrator 206 indicating corresponding health states associated with one or more skills. In some embodiments, Puffin Regional 209, Puffin Central 118, and/or Orchestrator 206 may be configured to execute operations that may pause (partially or fully) any suitable portion of the operations discussed above in connection with the method 200. In some embodiments, this may cause a regions state associated with the region within which method 200 is executed, to be updated to a state that indicates the build of the region is paused. In some embodiments, Puffin Regional 209, Puffin Central 118, and/or Orchestrator 206 may be configured to resume the operations of method 200 (and update the region state accordingly) based at least in part on user input, on subsequent alarm data indicating an update to a health state of one or more skills, on a skill health override value, or the like.

Figure 3:
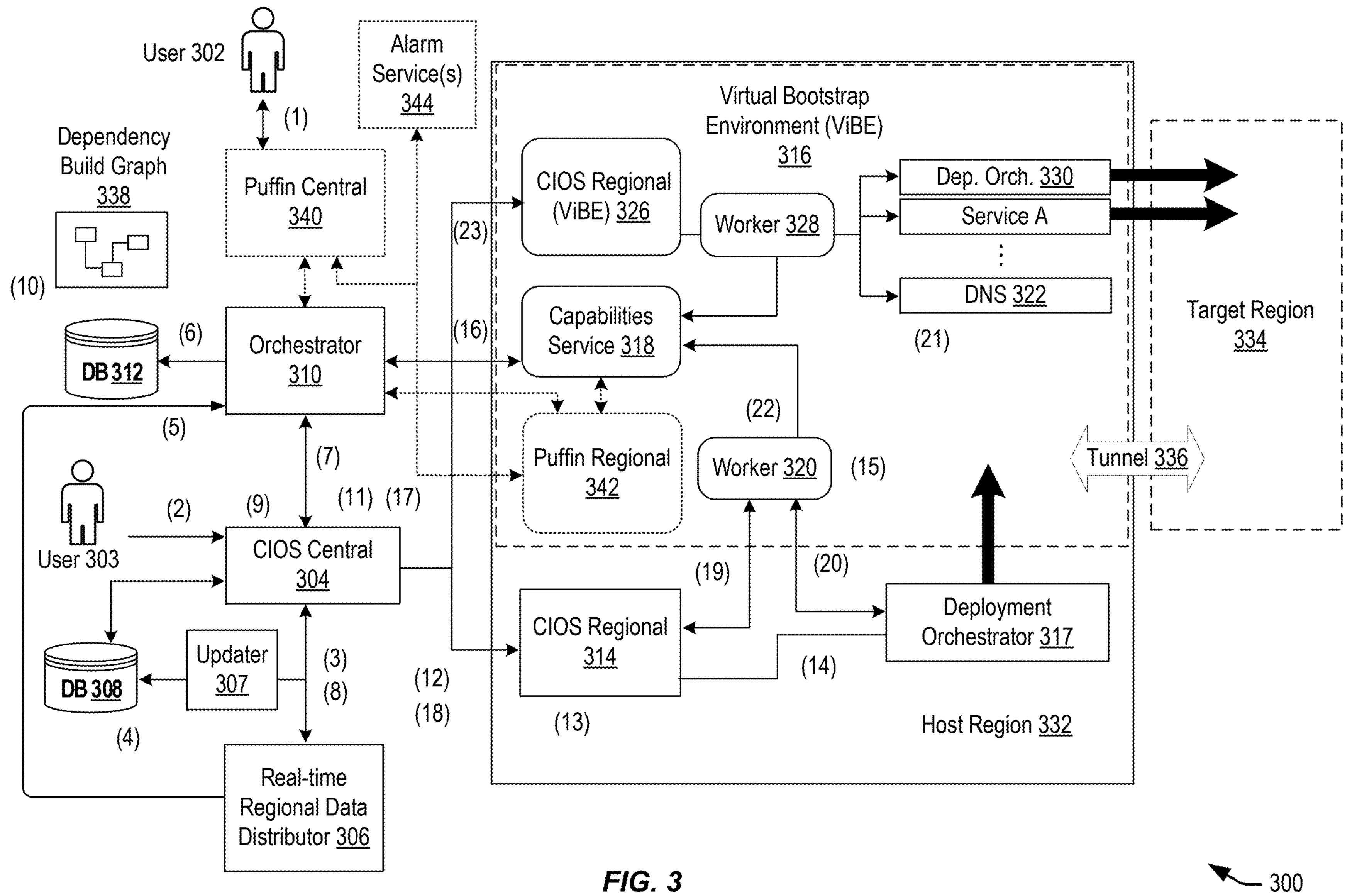
FIG. 3 is a block diagram for illustrating an environment and method for bootstrapping services to a target region utilizing the VIBE, in accordance with at least one embodiment.

FIG. 3 is a block diagram for illustrating an environment and method 300 for bootstrapping services to a target region utilizing the ViBE, according to at least one embodiment.

The method 300 may begin at step 1, where user 302 (e.g., a service team member) may interact with any suitable number of user interfaces managed by Puffin Central 340 (e.g., Puffin Central 118 of FIG. 1). Puffin Central 340 may be configured to read service and/or skill metadata from predefined files or the user 302 may enter service metadata and/or skill metadata at one or more of the provided user interfaces. In some embodiments, Puffin Central 340 may store all service and skill metadata and serve as a centralized authority for the same. At any suitable time, any suitable user may view the service and/or skill metadata such as prior to and/or during performance of the region build.

At step 2, user 303 may utilize any suitable user interface provided by CIOS Central 304 (an example of CIOS Central 108 and CIOS Central 214 of FIGS. 1 and 2, respectively) to modify region data. By way of example, user 303 may create a new region to which a number of services are to be bootstrapped.

At step 3, CIOS Central 304 may execute operations to send the change to RRDD 306 (e.g., an example of RRDD 104 of FIG. 1). At step 4, RRDD 306 may store the received region data in database 308, a data store configured to store region data including any suitable identifier, attribute, state, etc. of a region, AD, realm, ET, or the like. In some embodiments, updater 307 may be utilized to store region data in database 308 or any suitable data store from which such updates may be accessible (e.g., to service teams). In some embodiments, updater 307 may be configured to notify (e.g., via any suitable electronic notification) of updates made to database 308.

At step 5, Orchestrator 310 (an example of the Orchestrator 106 and/or 206 of FIGS. 1 and 2, respectively) may detect the change in region data. In some embodiments, Orchestrator 310 may be configured to poll RRDD 306 for changes in region data. In some embodiments, RRDD 306 may be configured to publish or otherwise notify Orchestrator 310 of region data changes.

At step 6, detecting the change in region data may trigger Orchestrator 310 to obtain a version set (e.g., a version set associated with a particular identifier such as a "golden version set" identifier) identifying a particular version for each flock config and a particular version for each artifact to be used to build the region. The version set may be obtained from DB 312. As flock configs and/or artifacts evolve and change over time, multiple versions of each may be maintained, and certain versions of each may be used for a region build. The version set may be persisted in DB 312 such that Orchestrator 310 may identify which versions of flock configs and artifacts to use for building a region (e.g., a ViBE region, a Target Region/non-ViBE Region, etc. The flock configs (e.g., all versions of the flock configs) and/or artifacts (e.g., all versions of the artifacts) may be stored in DB 308, DB 312, or any suitable data store accessible to the CIOS Central 304 and/or Orchestrator 310.

In some embodiments, Orchestrator 310 may identify any suitable number of SPAMs (collectively referred to as a "SPAM set") corresponding to the infrastructure to be provisioned and artifacts to be deployed as part of a region build. In some embodiments, each SPAM may identify versions corresponding to one or more flock configs and/or one or more artifacts that may be needed (or are needed) to build a single service. In embodiments in which one or more SPAMs are utilized, the SPAM(s) (or any suitable portion of the SPAM(s)) may be stored within DB 312 and utilized to identify the particular flock config and/or artifact versions to be utilized for building the region. In some embodiments, the flock configs and/or artifact versions of a SPAM set may be included in the version set and stored within DB 312. This enables some service teams to utilize a set of flock configs to define their service's build implementation while other service teams may choose to utilize a SPAM to define their service's build implementation.

In some embodiments, any suitable flock version sets and/or version set items may be derived from any suitable number of SPAMs and the Orchestrator 310 may be configured to verify compliance of a flock's behavior (e.g., the build/orchestration operations identified within a flock config) complies with the process defined by a corresponding SPAM. The Orchestrator 310 may be configured to ingest SPAMs which provide the information that may be required (or in some cases, that is required) to build an up-front plan of work and to introduce better guardrails than those available in previous implementations. Any suitable number of SPAMs may be aggregated into corresponding SPAM sets in a similar way that flocks may be aggregated into version sets. SPAM sets may enforce the invariant that all SPAMs within the set are mutually compatible and compose together to form a viable graph of releases required to build a region. In some embodiments, SPAM sets may be used within a given regional context to improve service build progress tracking. SPAM operations may be validated before they are applied and rejected if they are invalid, unlike version set item operations which were unconditionally applied. The utilization of SPAMs may enable the Orchestrator 310 to build a deterministic plan of work prior to building a region, to block updates that would jeopardize or break an ongoing or future build, to improve the tracking of process of a service build, to detect deviations of flock behavior from the SPAM's specification, and to alert operators of deviations and status.

At step 7, Orchestrator 310 may request CIOS Central 304 to recompile each of the flock configs associated with the version set (including any suitable number of flock configs identified by a SPAM of a SPAM set) with the current region data. In some embodiments, the request may indicate a version for each flock config and/or artifact.

At step 8, CIOS Central 304 may obtain current region data from the DB 308 (e.g., directly, or via Real-time Regional Data Distributor 306) and retrieve any suitable flock config and artifact in accordance with the versions requested by Orchestrator 310.

At step 9, CIOS Central 304 may recompile the obtained flock configs with the region data obtained at step 8 to inject those flock configs with current region data. CIOS Central 304 may return the compiled flock configs to Orchestrator 310. In some embodiments, CIOS Central 304 may simply indicate compilation is done, and Orchestrator 310 may access the recompiled flock configs via RRDD 306.

In some embodiments, at step 10, Orchestrator 310 may perform a static flock analysis of the recompiled flock configs (and/or SPAMs). As part of the static flock analysis, Orchestrator 310 may parse the flock configs (and/or SPAMs) (e.g., using a library associated with a declarative infrastructure provisioner (e.g., Terraform®, or the like)) to identify dependencies. Data generated by the static flock analysis (e.g., "SFA data," including the identified dependencies) may be stored for subsequent use. From the analysis and the dependencies identified (e.g., the SFA data), Orchestrator 310 may generate any suitable number of data structures (e.g., directed acyclic graphs) that identify an order for releases identified in the flock configs (or from any suitable portion of one or more service plans, such as from a flock config entity of the service plan). A DAG that is generated based on a flock config (and/or any portion of a SPAM including, but not limited to flock config entity 800 of FIG. 8) and that specifies the releases and order of releases necessary to build a service may be referred to as a "service DAG." In some embodiments, Orchestrator 310 may generate a directed acyclic graph (referred to as a "build diagram") corresponding to each SPAM in which each node represents a build milestone with edges indicating execution units and capabilities (and/or skills) that transition the service between build milestones. Each execution unit may represent a number of releases that, when performed, transition the service between build milestones. Any suitable number of service DAGs can be composed together to form Build Dependency Graph 338. Build Dependency Graph 338 may be an acyclic directed graph that identifies an order by which releases are to be executed to bootstrap one or more services within the new region.

In some embodiments, Build Dependency Graph 338 may be a region-level dependency graph that includes every release that may be needed (or that is needed) for every service to be bootstrapped within the region/data center. Each node in the Build Dependency Graph 338 may correspond to bootstrapping any suitable portion of a service. By way of example, each node of the Build Dependency Graph 338 may correspond to a single release. The specific bootstrapping order (e.g., the order of release execution) may be identified based at least in part on the dependencies. In some embodiments, the dependencies may be expressed as an attribute of the node and/or indicated via edges of the graph that connect the nodes. Orchestrator 310 may traverse the Build Dependency Graph 338 (e.g., beginning at a starting node) to drive the operations of the region build. Any suitable portion of a service DAG and/or the Build Dependency Graph 338 may be presented via one or more user interfaces (e.g., one or more interfaces provided by any suitable component of CIOS 102 of FIG. 1, including orchestrator 310, CIOS Central 304, or the like).

In some embodiments, Orchestrator 310 may utilize a cycle detection algorithm to detect the presence of a cycle (e.g., service A depends on service B and vice versa). Orchestrator 310 can identify orphaned capabilities dependencies. For example, Orchestrator 310 can identify orphaned nodes of the Build Dependency Graph 338 that do not connect to any other nodes. Orchestrator 310 may identify falsely published capabilities (e.g., when a capability was prematurely published, and the corresponding functionality is not actually yet available). Orchestrator 310 can detect from the graph that one or more instances of publishing the same capability exist. In some embodiments, any suitable number of these errors may be detected and Orchestrator 310 (or another suitable component such as CIOS Central 304) may be configured to notify or otherwise present this information to users (e.g., via an electronic notification, a user interface, or the like). In some embodiments, Orchestrator 310 may be configured to force delete/recreate resources to break circular dependencies and may once again provide instructions to CIOS Central 304 to perform bootstrapping operations for those resources and/or corresponding flock configs.

A starting node of the Build Dependency Graph 338 may correspond to building the ViBE 316 (or individual services within the ViBE), a second node may correspond to bootstrapping DNS. The steps 11-16 may correspond to deploying (via deployment orchestrator 317, an example of the deployment orchestrator 218 of FIG. 2) the resources and/or artifacts identified in a corresponding VIBE flock config or SPAM to ViBE 316 (e.g., an example of ViBE 116 and 202 of FIGS. 1, and 2, respectively). That is, steps 11-16 of FIG. 3 generally correspond to steps 1-6 of FIG. 2. Once notified that capabilities (or skills) exist (e.g., indicating that Capabilities Service 318, Worker 320, and/or Puffin Regional 342, corresponding to Capabilities Service 208, Worker 210, and Puffin Regional 209 of FIG. 2, respectively, are deployed/available) the Orchestrator 310 may recommence traversal of the Build Dependency Graph 338 to identify which operations/releases to be executed next.

Orchestrator 310 may continue traversing the Build Dependency Graph 338 to identify that one or more releases corresponding to deploying DNS 322 are to be executed. Steps 17-22 may be executed to deploy DNS 322 (an example of the DNS 212 of FIG. 2). These operations may generally correspond to steps 7-12 of FIG. 2.

At step 22, a capability (or skill) may be published and/or stored indicating that DNS 322 is available. In some embodiments, CIOS Regional 314 and/or Deployment Orchestrator 317 may initially communicate the availability of the capability or skill (e.g., to Capabilities Service 318 or Puffin Regional 342, respectively). If a skill is published, Puffin Regional 342 may transmit data to Capabilities Service 318 to indicate one or more corresponding capabilities are published. Upon detecting the publishing of a capability (e.g., via data provided by Capabilities Service 318, perhaps triggered based on skill-related data provided by Puffin Regional 342), Orchestrator 310 may recommence traversal of the Build Dependency Graph 338. On this traversal, the Orchestrator 310 may identify that any suitable portion of an instance of CIOS Regional (e.g., an example of CIOS Regional 314) is to be deployed to the VIBE 316. In some embodiments, steps 17-22 may be substantially repeated with respect to deploying CIOS Regional (ViBE) 326 (an instance of CIOS Regional 314, CIOS Regional 110 of FIG. 1) and Worker 328 to the VIBE 316. A capability may be transmitted to the Capabilities Service 318 that CIOS Regional (ViBE) 326 is available. If a skill is used to indicate that CIOS Regional (ViBE) 326 is available, Puffin Regional 342 may transmit data to Capabilities Service 318 indicating one or more corresponding capabilities are available. The interactions between Puffin Regional 342 and Capabilities Service 318 enable any suitable combination of capabilities and/or skills to be utilized to express progress through the region build. In some embodiments, when the Build Dependency Graph 338 identifies transitions through capability publishing and dependencies, progress evidenced with skill publishing may be used to trigger corresponding capabilities publishing to enable skills to trigger progress of the region build.

Upon detecting the CIOS Regional (ViBE) 326 is available, Orchestrator 310 may recommence traversal of the Build Dependency Graph 338. On this traversal, the Orchestrator 310 may identify that a deployment orchestrator (e.g., Deployment Orchestrator 330, an example of the Deployment Orchestrator 317) is to be deployed to the VIBE 316. In some embodiments, steps 16-21 may be substantially repeated with respect to deploying Deployment Orchestrator 330. Information that identifies a capability may be transmitted to the Capabilities Service 318 (e.g., by CIOS Regional 314, worker 320, and/or Puffin Regional 342), indicating that Deployment Orchestrator 330 is available.

After Deployment Orchestrator 330 is deployed, ViBE 316 may be considered available for processing subsequent requests. Upon detecting Deployment Orchestrator 330 is available, Orchestrator 310 may instruct subsequent bootstrapping requests to be routed to ViBE components rather than utilizing host region components (components of host region 332). Thus, Orchestrator 310 can continue traversing the Build Dependency Graph 338, at each node instructing release execution to the VIBE 316 via CIOS Central 304. CIOS Central 304 may transmit release requests CIOS Regional (ViBE) 326 to effectuate release execution as instructed by Orchestrator 310.

At any suitable point during this process, Target Region 334 may become available. Indication that the Target Region is available may be identifiable from region data for the Target Region 334 being provided by the user 303 (e.g., as an update to the region data). The availability of Target Region 334 may depend on establishing a network connection between the Target Region 334 and external networks (e.g., the Internet). The network connection may be supported over a public network (e.g., the Internet), but use software security tools (e.g., IPSec) to provide one or more encrypted tunnels (e.g., IPSec tunnels such as tunnel 336) from the VIBE 316 to Target Region 334. As used herein, "IPSec" refers to a protocol suite for authenticating and encrypting network traffic over a network that uses Internet Protocol (IP) and can include one or more available implementations of the protocol suite (e.g., Openswan, Libreswan, strongSwan, etc.). The network may connect the ViBE 316 to the service enclave of the Target Region 334.

Prior to establishing the IPSec tunnels, the initial network connection to the Target Region 334 may be on a connection (e.g., an out-of-band VPN tunnel) sufficient to allow bootstrapping of networking services until an IPSec gateway may be deployed on an asset (e.g., bare-metal asset) in the Target Region 334. To bootstrap the Target Region's network resources, Deployment Orchestrator 330 can deploy the IPSec gateway at the asset within Target Region 334. The Deployment Orchestrator 330 may then deploy VPN hosts at the Target Region 334 configured to terminate IPSec tunnels from the VIBE 316. Once services (e.g., Deployment Orchestrator 330, Service A, etc.) in the VIBE 316 can establish an IPSec connection with the VPN hosts in the Target Region 334, bootstrapping operations from the ViBE 316 to the Target Region 334 may begin.

In some embodiments, the bootstrapping operations may begin with services in the ViBE 316 provisioning resources in the Target Region 334 to support hosting instances of core services as they are deployed from the VIBE 316. For example, a host provisioning service may provision hypervisors on infrastructure (e.g., bare-metal hosts) in the Target Region 334 to allocate computing resources for VMs. When the host provisioning service completes allocation of physical resources in the Target Region 334, the host provisioning service may publish information indicating a capability that indicates that the physical resources in the Target Region 334 have been allocated. The capability may be published to Capabilities Service 318 via CIOS Regional (ViBE) 326 (e.g., by Worker 328).

With the hardware allocation of the Target Region 334 established and posted to Capabilities Service 318, CIOS Regional (ViBE) 326 can orchestrate the deployment of instances of core services from the VIBE 316 to the Target Region 334. This deployment may be similar to the processes described above for building the ViBE 316, but using components of the ViBE (e.g., CIOS Regional (ViBE) 326, Worker 328, Deployment Orchestrator 330) instead of components of the Host Region 332 service enclave (e.g., CIOS Regional 314 and Deployment Orchestrator 317). The deployment operations may generally correspond to steps 17-22 described above.

As a service is deployed from the ViBE 316 to the Target Region 334, the DNS record associated with that service may correspond to the instance of the service in the VIBE 316. The DNS record associated with the service may be updated at any suitable time to complete deployment of the service to the Target Region 334. Said another way, the instance of the service in the ViBE 316 may continue to receive traffic (e.g., requests) until the DNS record is updated. A service may deploy partially into the Target Region 334 and publish information indicating a capability (e.g., to Capabilities Service 318) that the service is partially deployed. For example, a service running in the ViBE 316 may be deployed into the Target Region 334 with a corresponding compute instance, load balancer, and associated applications and other software, but may need to wait for database data to migrate to the Target Region 334 before being completely deployed. The DNS record (e.g., managed by DNS 322) may still be associated with the service in the VIBE 316. Once data migration for the service is complete, the DNS record may be updated to point to the operational service deployed in the Target Region 334. The deployed service in the Target Region 334 may then receive traffic (e.g., requests) for the service, while the instance of the service in the VIBE 316 may no longer receive traffic for the service.

At any suitable time during method 300, Puffin Regional 209 may receive and/or obtain alarm data from one or more alarm services (e.g., the alarm service(s) 344, an example of the alarm service(s) 122 of FIG. 1). In some embodiments, the alarm data may be processed by Puffin Regional 342 (or Puffin Regional 342 may communicate the alarm data or data derived from the alarm data to Puffin Central 340). In some embodiments, Puffin Regional 342 and/or Puffin Central 340 may communicate skill health information to Orchestrator 310 indicating corresponding health states associated with one or more skills. In some embodiments, Puffin Regional 342, Puffin Central 340, and/or Orchestrator 310 may be configured to execute operations that pause or otherwise halt any suitable portion of the operations discussed above in connection with the method 300. In some embodiments, Puffin Regional 342, Puffin Central 340, and/or Orchestrator 310 may be configured to resume and/or execute any suitable portion of the operations of method 300 (e.g., based at least in part on user input, subsequent alarm data indicating an update to a health state associated with one or more skills, based at least in part on a skill health override value, or the like).

Figure 4:
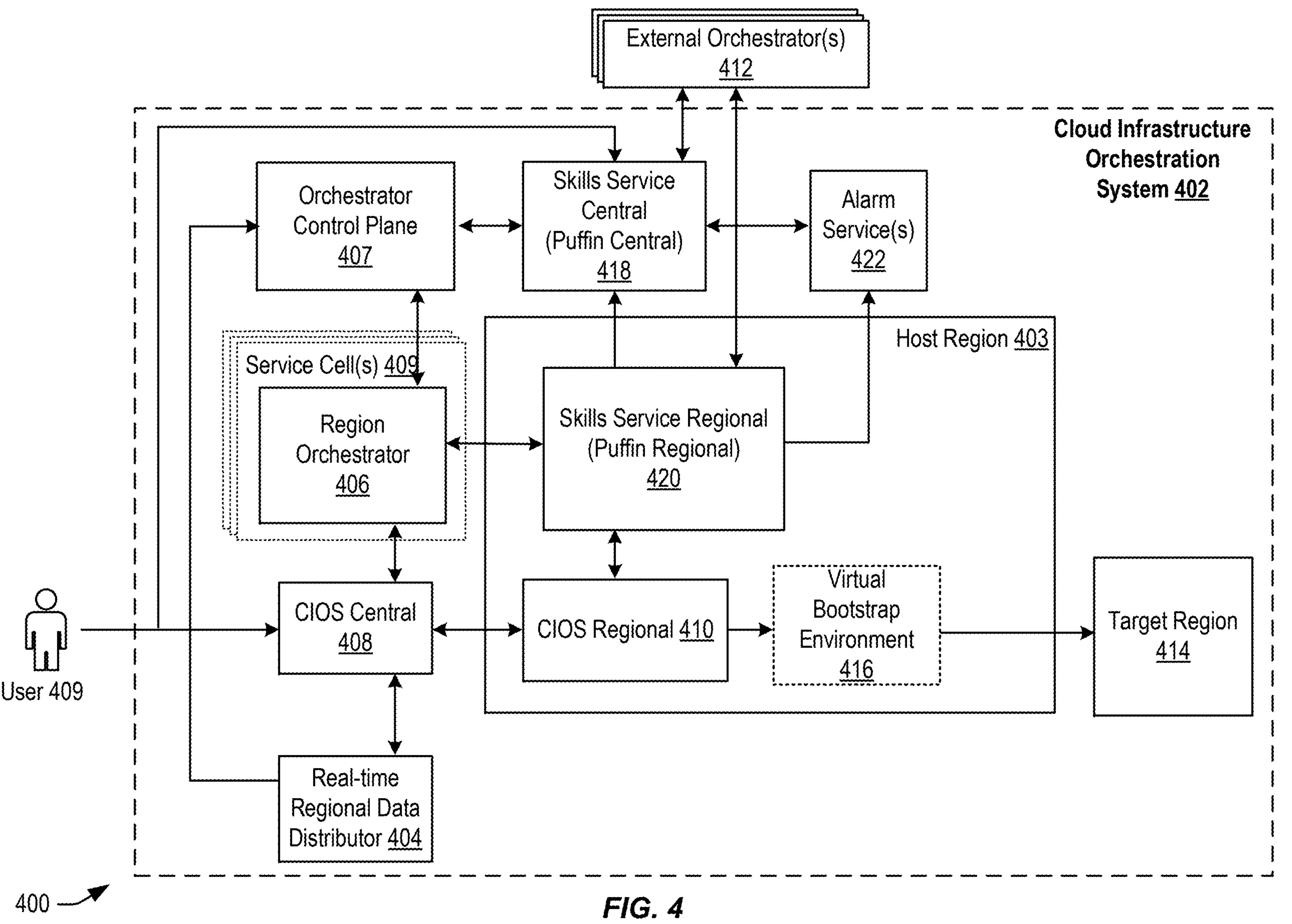
FIG. 4 is a block diagram of an environment in which another example Cloud Infrastructure Orchestration System (CIOS may operate to dynamically bootstrap services in a region), in accordance with at least one embodiment.

FIG. 4 is a block diagram of an environment 400 in which a Cloud Infrastructure Orchestration System (CIOS) 402 in which a Cloud Infrastructure Orchestration System (CIOS may operate to dynamically bootstrap services in a region/data center, according to at least one embodiment. CIOS 402 can include, but is not limited to, the following components: Real-time Regional Data Distributor (RRDD) 404, Region Orchestrator 406 (operating in a corresponding service cell of service cell(s) 409), Orchestrator Control Plane 407, CIOS Central 408, CIOS Regional 410, Virtual Bootstrap Environment 416, Puffin Central 418, Puffin Regional 420, and Alarm Service(s) 422. In some embodiments, any suitable combination of the components of CIOS 402 may be provided as a service. In some embodiments, some portion of CIOS 402 may be deployed to a region (e.g., a data center represented by host region 403). In some embodiments, CIOS 402 may include any suitable number of cloud services (not depicted in FIG. 4) discussed in further detail below with respect to FIGS. 5 and 6.

Real-time Regional Data Distributor (RRDD) 404 may be configured to maintain and provide region data that identifies realms (which may include one or more regions), regions (which may include one or more availability domains), execution targets, and availability domains. In some cases, the region data may be in any suitable form (e.g., JSON format, data objects/containers, XML, etc.). Region data maintained by RRDD 404 may include any suitable number of subsets of data which can individually be referenceable by a corresponding identifier. By way of example, an identifier "all_regions" can be associated with a data structure (e.g., a list, a structure, an object, etc.) that includes a metadata for all defined regions. As another example, an identifier such as "realms" can be associated with a data structure that identifies metadata for a number of realms and a set of regions corresponding to each realm. In general, the region data may maintain any suitable attribute of one or more realm(s), region(s), availability domains (ADs), execution target(s) (ETs), and the like, such as identifiers, DNS suffixes, states (e.g., a state of a region), and the like. The RRDD 404 may be configured to manage region state as part of the region data. A region state may include any suitable information indicating a state of bootstrapping within a region. By way of example, some example region states can include "initial," "building," "production," "paused," or "deprecated." The "initial" state may indicate a region that has not yet been bootstrapped. A "building" state may indicate that bootstrapping of one or more flocks within the region has commenced. A "production" state may indicate that bootstrapping has been completed and the region is ready for validation. A "paused" state may indicate that CIOS Central 408 or CIOS Regional 410 has paused internal interactions with the regional stack, likely due to an operational issue. A "deprecated" state may indicate the region has been deprecated and is likely unavailable and/or will not be contacted again.

CIOS Central 408 may be configured to provide any suitable number of user interfaces with which users (e.g., user 409) may interact with CIOS 402 or view data associated with one or more region builds. By way of example, users can make changes to region data via a user interface provided by CIOS Central 408. CIOS Central 408 may additionally provide a variety of interfaces that enable users to: view changes made to flock configs and/or artifacts, generate and view plans, approve/reject plans, view status on plan execution (e.g., corresponding to tasks involving infrastructure provisioning, deployment, region build, and/or desired state of any suitable number of resources managed by CIOS 402. CIOS Central 408 may implement a control plane configured to manage any suitable number of CIOS Regional 410 instances. CIOS Central 408 can provide one or more user interfaces for presenting region data, enabling the user 409 to view and/or change region data. CIOS Central 408 can be configured to invoke the functionality of RRDD 404 via any suitable number of interfaces. Generally, CIOS Central 408 (also referred to as a "provisioning and deployment manager") may be configured to manage region data, either directly or indirectly (e.g., via RRDD 404). CIOS Central 408 may be configured to compile SPAMs to inject region data as variables within the SPAMs. CIOS Central 408 may be instructed (e.g., by region orchestrator 406) to perform one or more releases (e.g., infrastructure or application releases) according to a given SPAM.

Orchestrator Control Plane 407 may be configured to provide any suitable number of user interfaces with which users (e.g., user 409) may interact with CIOS 402 or view data associated with one or more region builds. Orchestrator Control Plane 407 may include a build planning module that may be configured to generate a region build plan. Additional details of region build plans and their generation are provided in more detail with the following figures. In some embodiments, Orchestrator Control Plane 407 may be configured to provide and/or instruct any suitable number of region orchestrators (e.g., Region Orchestrator 408) operating in any suitable service cell (e.g., service cell(s) 409).

In some embodiments, an external orchestrator may be used in lieu of Region Orchestrator 408. In these instances, an external orchestrator (e.g., one of external orchestrator(s) 412) may communicate with the Region Orchestrator 406 via Puffin (e.g., Puffin Central 418 and/or Puffin Regional 420) by consuming the signals they wait for and signaling completion of their work via installation of Skills. When the region build plan reaches an external execution unit, the Region Orchestrator 406 may wait for an external orchestrator to signal completion via publishing the relevant skills.

Each instance of CIOS Regional 410 may correspond to a module configured to execute bootstrapping tasks that are associated with a service of a region (e.g., a data center such as host region 403). CIOS Regional 410 can receive desired state data from CIOS Central 408. In some embodiments, desired state data may correspond to an infrastructure or software release. In some embodiments, the desired state data may be expressed as part of a flock config that declares (e.g., via declarative statements) a desired state of resources associated with a service. CIOS Central 408 can maintain current state data indicating any suitable aspect of the current state of the resources associated with a service. In some embodiments, CIOS Regional 410 can identify, through a comparison of the desired state data and the current state data, that changes that may be (or are) needed to one or more resources. For example, CIOS Regional 410 can determine that one or more infrastructure components need to be provisioned, one or more artifacts deployed, or any suitable change that may be (or is) needed to the resources of the service to bring the state of those resources in line with the desired state. As CIOS Regional 410 performs bootstrapping operations, it may publish data indicating a transition of a skill from one state to another. A skill state may identify a unit of functionality associated with a service is, or is not, available. The unit could be a portion, or all of the functionality to be provided by the service. By way of example, data may be transmitted from CIOS Regional 410 to Puffin Regional 420 indicating that the state of a skill corresponding to a resource has transitioned to "installed," indicating the resource is available for authorization/authentication processing (e.g., a subset of the functionality to be provided by the resource). Skills can be used to identify functionality on which a resource or service depends and/or functionality of a resource or service that is available for use. By way of example, in some embodiments, CIOS Regional 410 performs bootstrapping operations which result in publishing a skill (e.g., transmitting skill metadata including a skill state value). The skill metadata may be transmitted to Puffin (e.g., Puffin Regional 420) and used to update the skill state of the corresponding skill.

In some embodiments, Puffin Central 418 may provide a number of user interfaces with which one or more skills can be defined. A skill may be used in lieu of capabilities and enables improvements over previous capabilities-based implementations. Unlike capabilities, skills may be scoped (e.g., controllable through access and authorization policies), versioned, and attributed to a particular service and/or contact. Skills may be associated with a lifecycle and may be monitored for health and are designed to be more highly visible/accessible than capabilities. Puffin Central 418 may provide an authoritative registry for skills. Various user interfaces managed by Puffin Central 418 may be utilized to define, maintain, and manage skills that each service offers, as well as their dependency relationships with other services. Puffin Central 418 may be utilized to declare and persist strongly defined metadata of services in a versioned manner. This metadata may be used to generate a blueprint for build-time and run-time dependencies. These blueprints can be used to validate build plans, to drive orchestration decisions during region build, and to improve time-to-engage and time-to-diagnose measures during region build and/or Large-Scale Events (LSEs).

Puffin Central 418 may be configured to serve as a source of truth for services and may maintain metadata including each service's upstream and downstream dependencies and service team contact information and methods for each service across regions and realms (e.g., a set of regions). Each skill may represent a function unit that a service exposes and offers to consumers (e.g., other services). In some embodiments, skills may be scoped where access is controlled based on access and/or authorization policies and/or based on an association with a particular namespace. A skill may be associated with multiple versions in which one or more aspects of the skill differs from previous versions, where each skill version represents a specific implementation of the skill. Each skill version may be identifiable using a unique skill identifier.

In some embodiments, any suitable computing component of the Puffin Service (e.g., Puffin Central 418 and/or Puffin Regional 420) may be configured to monitor the health and/or lifecycle of a skill according to a predefined skill lifecycle. Health monitoring may be performed using one or more alarms that are associated with a given skill. In some embodiments, a telemetry service (e.g., an example of alarm service(s) 422) may utilize an application programming interface provided by the Puffin Service (including Puffin Central 418 and/or Puffin Regional 420) when an alarm is triggered. As another example, the Puffin Service (e.g., Puffin Regional 420) may request alarm data from the alarm service(s) 422 and/or from storage locations at which the alarm service(s) 422 store the alarm data. The Puffin Service may present, via one or more user interfaces, information related to the health of a skill based on the alarms corresponding to the alarm data obtained and their corresponding association to a given skill.

In some embodiments, the Puffin Service (e.g., Puffin Central 418 and/or Puffin Regional 420) may expose one or more application programming interfaces (APIs) with which validation operations may be performed. By way of example, a SPAM describing the build process with respect to one or more services may be provided via a given API (e.g., by the Region Orchestrator 406). The Puffin Service (e.g., Puffin Central 418) may execute any suitable operations for validating that all services and skills identified in the SPAM have been previously registered with the Puffin Service and that the build process defined in the SPAM does not violate previously defined dependency relationships maintained by the Puffin Service. Additionally, or alternatively, Region Orchestrator 406 may perform any suitable validation check such as determining whether each flock config and/or artifact identified in a given service's manifest is referenced within the service's corresponding service plan and/or that no flock config and/or artifact is referenced within the service plan that is not referenced within the manifest. Region Orchestrator 406 may perform validation operations (e.g., a static analysis including parsing the service plan) to determine that a service plan lacks circular dependencies. If a circular dependency is found within a service plan, Region Orchestrator 406 may provide a notification and/or restrict the service plan and corresponding manifest from being utilized. In some embodiments, such restrictions may include restricting the service plan and manifest from being added to a SPAM set (e.g., a set of SPAMs to be used to perform a region build). In some embodiments, the Region Orchestrator 406 may perform any suitable validation operations to ensure that SPAMs of a SPAM set and/or a SPAM that is being considered as an addition to a preexisting SPAM set are mutually compatible. This may include analyzing the SPAM set (alone or with a SPAM that is being considered for addition) to ensure that the SPAMs of the SPAM set do not include circular dependencies.

In some embodiments, each regional component such as Region Orchestrator 406, CIOS Regional 410, Puffin Regional 420, and/or Virtual Bootstrap Environment 416 may be one of many regional components. Each regional component may be specific to a given region (e.g., as depicted in FIG. 4, Host Region 403). Therefore, another region may include similar, but separate, components that are specific to that region. In some embodiments, central components (e.g., Region Orchestrator 406, CIOS Central 408, RRDD 404, and Puffin Central 418) may include one or more components that are configured to manage build operations corresponding to one or more regions. By way of example only, a single orchestrator (Region Orchestrator 406) may be utilized to manage bootstrapping operations for building any suitable number of data centers, or multiple instances of Region Orchestrator 406 may be utilized, each driving the bootstrapping operations for a subset of those data centers or a single data center. In some embodiments, each Region Orchestrator 406 may operate within one of service cell(s) 409 and isolated from other instances of the Region Orchestrator 406.

In some embodiments, Region Orchestrator 406 (e.g., an orchestration service) may be configured to drive region build efforts. In some embodiments, Region Orchestrator 406 may manage information that describes which flock config versions and/or artifact versions are to be utilized to bootstrap a given service within a region (or to make a unit of change to a target region). In some embodiments, Region Orchestrator 406 may manage any suitable combination of flock configs and/or service plans. In some embodiments, Region Orchestrator 406 may be configured to monitor (or be otherwise notified of) changes to the region data managed by Real-time Regional Data Distributor 404. In some embodiments, receiving an indication that region data has been changed may cause a region build to be triggered by Region Orchestrator 406. In some embodiments, Region Orchestrator 406 may identify SPAMs to be used for a region build. Some, or all, of the SPAMs may be configured to be region agnostic. That is, the SPAMs may not explicitly identify what region(s) to which the flock is to be bootstrapped. In some embodiments, Region Orchestrator 406 may trigger a data injection process through which the collected flock configs and/or SPAMs are recompiled (e.g., by CIOS Central 408). During recompilation, operations may be executed (e.g., by CIOS Central 408) to cause the region data maintained by Real-time Regional Data Distributor 404 to be injected into the config files and/or SPAMs. SPAMs can reference region data through variables/parameters without requiring hard-coded identification of region data. Any suitable portion of the SPAMs can be dynamically modified at run time using this data injection rather than having the region data be hardcoded, and therefore, more difficult to change.

In some embodiments, Region Orchestrator 406 can perform a static analysis in which the identified service plans are parsed to identify execution targets, execution target checkpoints, phases, and flocks, and/or to identify circular dependencies between resources that need to be removed. In some embodiments static analysis data corresponding to this analysis may be stored (e.g., via SPAM store 612 of FIG. 6) for subsequent use. In some embodiments, Region Orchestrator 406 can generate any suitable number of data structures based on the dependencies identified. These data structures (e.g., directed acyclic graph(s), linked lists, etc.) may be utilized by CIOS 402 to drive operations for performing a region build. By way of example, these data structures may collectively define an order by which services are bootstrapped within a region. An example of such a data structure is discussed further below with respect to Build Plan 638 of FIG. 6. If circular dependencies (e.g., a service A skill requires a service B skill and vice versa) exist and are identified through the static analysis and/or graph, Region Orchestrator 406 may be configured to notify any suitable service teams that changes are required to the corresponding SPAM to correct these circular dependencies. Region Orchestrator 406 can be configured to traverse one or more data structures to manage an order by which services are bootstrapped to a region. Region Orchestrator 406 can identify (e.g., using data obtained from Puffin Regional 420) the status of each skill within a given region at any suitable time. Region Orchestrator 406 may utilize this data to identify when it can bootstrap a service, when bootstrapping is blocked, and/or when bootstrapping operations associated with a previously blocked service can resume. Based on this traversal, Region Orchestrator 406 can perform a variety of releases in which instructions are transmitted by Orchestrator 406 to CIOS Central 408 to perform bootstrapping operations corresponding to any suitable number of flock configs.

In some embodiments, the service plans and manifests (SPAMs) utilized by Region Orchestrator 406 may provide a deterministic specification of a build description for a service than previously provided by one or more flock configs. While flock configs specify aspects of a single release associated with a single service, a service plan may provide a single specification of the order and conditional requirements for executing all of the releases that may be needed (or are needed) to build a given service. Previous implementations of flock configs included optional dependencies which allowed for a degree of indeterministic behavior with respect to the order of operations performed during a region build. The inclusion of optional dependencies required an orchestrator to perform multiple passes of the build dependency graph, resulting in wasteful processing. These types of dependencies make it difficult, if not impossible, for the system to track region build progress, identify remaining operations yet to be performed, and/or identify build completion. Service plans and manifests (SPAMs) may be utilized to eliminate at least some of the drawbacks to previous indeterministic approaches.

SPAMs (one SPAM corresponding to one service to be bootstrapped in the region) allow service teams to describe the corresponding operations that may be needed (or are needed) to build their service and may allow for separation between internal coordination (e.g., coordination of operations internal to the service) and external coordination (e.g., coordination of operations between components of different services). A number of visualizations may be provided (e.g., via Region Orchestrator 406 or any suitable component of CIOS 402) via one or more user interfaces. One visualization may depict a directed acyclic graph describing the build operations internal to a given service, and a separate visualization may depict a directed acyclic graph describing the order of build operations corresponding to multiple services (e.g., all services of the region/data center). As a specific example, one or more visualizations can present a region-level directed acyclic graph (DAG) including only external coordination (e.g., an order of operations corresponding to coordination between services) while omitting operations that are internal with respect to each service. This DAG, for example, may depict nodes corresponding to one service's skills on which other services depend, while excluding nodes corresponding to skill dependencies between service components/functional units of the same service.

A SPAM may include an external interaction interface that includes a service build definition that includes a number of build milestones. Each build milestone may be associated with a set of capabilities (and/or skills) that the service is expected to publish upon reaching a given milestone. To transition between build milestones, the SPAM may include execution units that encapsulate a directed acyclic graph (DAG) of one or more releases, each release being equivalent to operations previously defined with a single flock config. Each execution unit may define a set of build time dependencies that identify one or more capabilities (and/or skills) that are required by at least one of the releases of the execution unit.

A SPAM may include a service build implementation. An execution unit of the SPAM may describe one or more releases that may be needed (or are needed) to build a service, with potentially multiple execution units being defined. Each execution unit may be associated with one or more execution target checkpoint transitions, each of which may be used to specify the expected capabilities that should be available before the time of the release and the capabilities that should be published as the result of performing the release.

In some embodiments, the Region Orchestrator 406 may be configured to aggregate SPAMs corresponding to each service to be deployed in a region to generate a larger directed acyclic graph (e.g., the Build Plan 638 of FIG. 6) which may capture all of the operations necessary to build a region/data center. The collection of SPAMs identified from this aggregation may be referred to as a "SPAM set." In some embodiments, the Region Orchestrator 406 may utilize the DAG generated from a SPAM set to validate a DAG and/or operations performed using flock configs, while the DAG generated from flock configs is used to drive build operations/release execution. Alternatively, the Region Orchestrator 406 may utilize the DAG generated from the SPAM set to drive build operations/release execution. The utilization of a SPAM/SPAM set may be utilized by the system to generate a deterministic execution plan with which the region build may be executed.

In some embodiments, a user can request that a new region (e.g., target region 414) be built. This can involve bootstrapping resources corresponding to a variety of services. In some embodiments, target region 414 may not be communicatively available (and/or secure) at a time at which the region build request is initiated. Rather than delay bootstrapping until such time as target region 414 is available and configured to perform bootstrapping operations, CIOS 402 may initiate the region build using a virtual bootstrap environment (e.g., Virtual Bootstrap Environment (ViBE) 416. ViBE 416 may be an overlay network that is hosted by host region 403 (a preexisting region that has previously been configured with a core set of services and which is communicatively available and secure). Region Orchestrator 406 may leverage resources of the host region 403 to bootstrap resources to the VIBE 416 (generally referred to as "building the ViBE"). By way of example, Region Orchestrator 406 may provide instructions through CIOS Central 408 that cause an instance of CIOS Regional 410 within a host region (e.g., host region 403) to bootstrap another instance of CIOS Regional within the VIBE 416. Once the CIOS Regional within the ViBE is available for processing, bootstrapping the services for the target region 414 can continue within the VIBE 416. When target region 414 is available to perform bootstrapping operations, the previously bootstrapped services within ViBE 416 may be migrated to target region 414. Utilizing these techniques, CIOS 402 can greatly improve the speed at which a region is built by drastically reducing the need for any manual input and/or configuration to be provided. In some embodiments, any suitable combination of the components depicted as part of CIOS 402 may individually be examples of the cloud services of FIGS. 23-26 (e.g., 2356 of FIG. 23, 2456 of FIG. 24, etc.) and may be configured to operate in any suitable infrastructure pattern such as the examples described below in connection with FIGS. 23-26.

Figure 5:
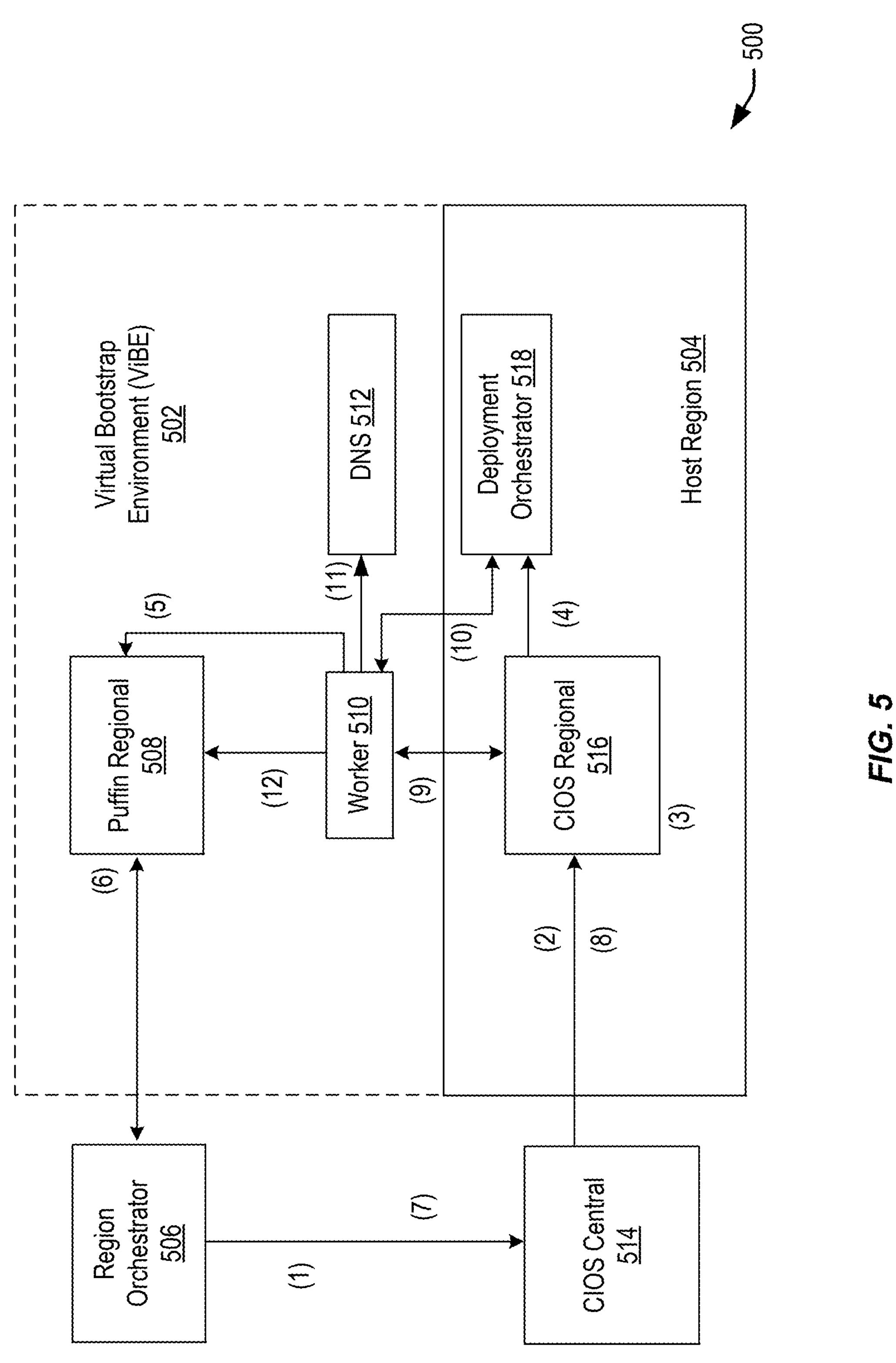
FIG. 5 is a block diagram for illustrating an environment and another method for building a virtual bootstrap environment (ViBE), in accordance with at least one embodiment.

FIG. 5 is a block diagram for illustrating an environment and method 500 for building a virtual bootstrap environment (ViBE) 502 (an example of ViBE 416 of FIG. 4), according to at least one embodiment. ViBE 502 represents a virtual cloud network that is provisioned in the overlay of an existing region (e.g., host region 504, an example of the host region 403 of FIG. 4 and in an embodiment is a Host Region Service Enclave). ViBE 502 represents an environment in which services can be staged for a target region (e.g., a region under build such as target region 414 of FIG. 4) before the target region becomes available.

In order to bootstrap a new region (e.g., target region 414 of FIG. 4), a core set of services may be bootstrapped. While those core set of services exist in the host region 504, they do not yet exist in the ViBE (nor the target region). These essential core services provide the functionality needed to provision devices, establish a chain of trust to the new region, and deploy remaining services into a region. The VIBE 502 may be a tenancy that is deployed in a host region 504 and used as a virtual region.

When the target region is available to provide bootstrapping operations, the VIBE 502 can be connected to the target region so that services in the ViBE can interact with the services and/or infrastructure components of the target region. This will enable deployment of production level services, instead of self-contained seed services as in previous systems, and may be connected over the internet to the target region. Conventionally, a seed service was deployed as part of a container collection and used to bootstrap dependencies necessary to build out the region. Using infrastructure/tooling of an existing region, resources may be bootstrapped (e.g., provisioned and deployed) into the VIBE 502 and connected to the service enclave of a region (e.g., host region 504) in order to provision (reserve and/or configure) hardware and deploy services until the target region is self-sufficient and can be communicated with directly. Utilizing the ViBE 502 allows for meeting the dependencies and providing the services needed to be able to provision/prepare infrastructure and deploy software while making use of the host region's resources in order to break circular dependencies of core services.

Region Orchestrator 506 (an example of Region Orchestrator 406 of FIG. 4) may be configured to perform operations to build (e.g., configure) ViBE 502. Region Orchestrator 506 can obtain applicable SPAMs corresponding to various resources to be bootstrapped to the new region (in this case, a ViBE region, ViBE 502). By way of example, Region Orchestrator 506 may obtain a SPAM for building any suitable portion of DNS 512, Worker 510, and/or Puffin Regional 508. In some embodiments, Region Orchestrator 506 may obtain a SPAM identifying aspects of bootstrapping any or all resources of the VIBE 502.

The method 500 may begin at step 1, where Region Orchestrator 506 may instruct CIOS Central 514 (e.g., an example of CIOS Central 408 and CIOS Central 514 of FIGS. 4 and 5, respectively) to build a service of the VIBE 502 or building the VIBE 502 in whole or in part. For example, Region Orchestrator 506 may transmit a request (e.g., including the flock config identified within a SPAM corresponding to building Puffin Regional 508 and a flock config corresponding to building worker 510 identified within the same or a different SPAM) to request bootstrapping of the Puffin Regional 508 and worker 510 that, at this time do not yet exist in the ViBE 502. In some embodiments, CIOS Central 514 may have access to all SPAMs. Therefore, in some examples, Region Orchestrator 506 may transmit one or more identifiers for one or more SPAMs and CIOS Central 514 may independently obtain the corresponding flock config(s) (e.g., flock configs identified by each manifest and/or service plan) from storage (e.g., from database (DB) 608 or SPAM store 612 of FIG. 6).

At step 2, CIOS Central 514 may provide the flock config(s) via a corresponding request to CIOS Regional 516. CIOS Regional 516 may parse the flock config(s) to identify and execute specific infrastructure provisioning and deployment operations at step 3.

In some embodiments, the CIOS Regional 516 may utilize additional corresponding services for provisioning and deployment. For example, at step 4, CIOS Regional 516 CIOS Regional may instruct deployment orchestrator 518 (e.g., an example of a core service, or other write, build, and deploy applications software, of the host region 504) to execute instructions that in turn cause Puffin Regional 508 and Worker 510, to be bootstrapped within ViBE 502.

At step 5, skills data may be transmitted to the Puffin Service 508 (from the CIOS Regional 516, Deployment Orchestrator 518 via the Worker 510 or otherwise) indicating that Puffin Regional and/or Worker 510 are available. Puffin Service 508 may persist this data. In some embodiments, the Puffin Regional 508 receives state transition data (e.g., from CIOS Regional 516) that indicates a particular skill has a particular status. By way of example, the skill provided to Puffin Regional 508 at step 5 may indicate the Puffin Regional 508 and Worker 510 are available for processing.

At step 6, Puffin Service 508 may identify that the Puffin Service 508 and/or Worker 510 are available based on receiving or obtaining data (an identifier corresponding to a skill) from Puffin Regional 508.

At step 7, as a result of receiving/obtaining the data at step 6 from Puffin Regional 508, Region Orchestrator 506 may instruct CIOS Central 514 to bootstrap a DNS service (e.g., DNS 512) to the VIBE 502.

At step 8, the CIOS Central 514 may instruct the CIOS Regional 516 to deploy DNS 512 to the ViBE 502. In some embodiments, the DNS SPAM for the DNS 512 may be provided by the CIOS Central 514 or one or more corresponding flock configs for bootstrapping the DNS 512 may be identified by CIOS Central 514.

At step 9, Worker 510, now that it is deployed in the VIBE 502, may be assigned by CIOS Regional 516 to the task of deploying DNS 512. Worker may execute a declarative infrastructure provisioner in the manner described above in connection with FIG. 6 to identify a set of operations that are needed to deploy DNS 512. These operations may be identified based at least in part on from comparing the flock config (the desired state), a corresponding portion of a SPAM, to a current state of the (currently non-existing) resources associated with DNS 512.

At step 10, the Deployment Orchestrator 518 may instruct Worker 510 to deploy DNS 512 in accordance with the operations identified at step 9. As depicted, Worker 510 proceeds with executing operations to deploy DNS 512 to ViBE 502 at step 11. At step 12, Worker 510 may notify Puffin Regional 508 (e.g., via a skills state transition) that DNS 512 is available in ViBE 502. Region Orchestrator 506 may subsequently identify that the resources associated with the flock configs corresponding to Puffin Regional 508, Worker 510, and DNS 512 are available any may proceed to bootstrapping any suitable number of additional resources to the VIBE 502.

After steps 1-12 are concluded, the process for building the VIBE 502 may be considered complete and the VIBE 502 may be considered built and ready for additional bootstrapping (e.g., the bootstrapping of various cloud services such as cloud services 2356 of FIG. 23). At any suitable time during steps 1-12, Puffin Regional 508 may receive and/or obtain alarm data from one or more alarm services (e.g., the alarm service(s) 422 of FIG. 4). In some embodiments, the alarm data may be processed by Puffin Regional 508. At any suitable time, Puffin Regional 508 may communicate the alarm data or data derived from the alarm data to Puffin Central 418 of FIG. 4. In some embodiments, Puffin Regional 508 (and/or Puffin Central 418) may communicate skill health information to Region Orchestrator 506 indicating corresponding health states associated with one or more skills. In some embodiments, Puffin Regional 508, Puffin Central 418, and/or Region Orchestrator 506 may be configured to execute operations that may pause (partially or fully) any suitable portion of the operations discussed above in connection with the method 500. In some embodiments, this may cause a regions state associated with the region within which method 500 is executed, to be updated to a state that indicates the build of the region is paused. In some embodiments, Puffin Regional 508, Puffin Central 418, and/or Region Orchestrator 506 may be configured to resume the operations of method 500 (and update the region state accordingly) based at least in part on user input, on subsequent alarm data indicating an update to a health state of one or more skills, on a skill health override value, or the like.

Figure 6:
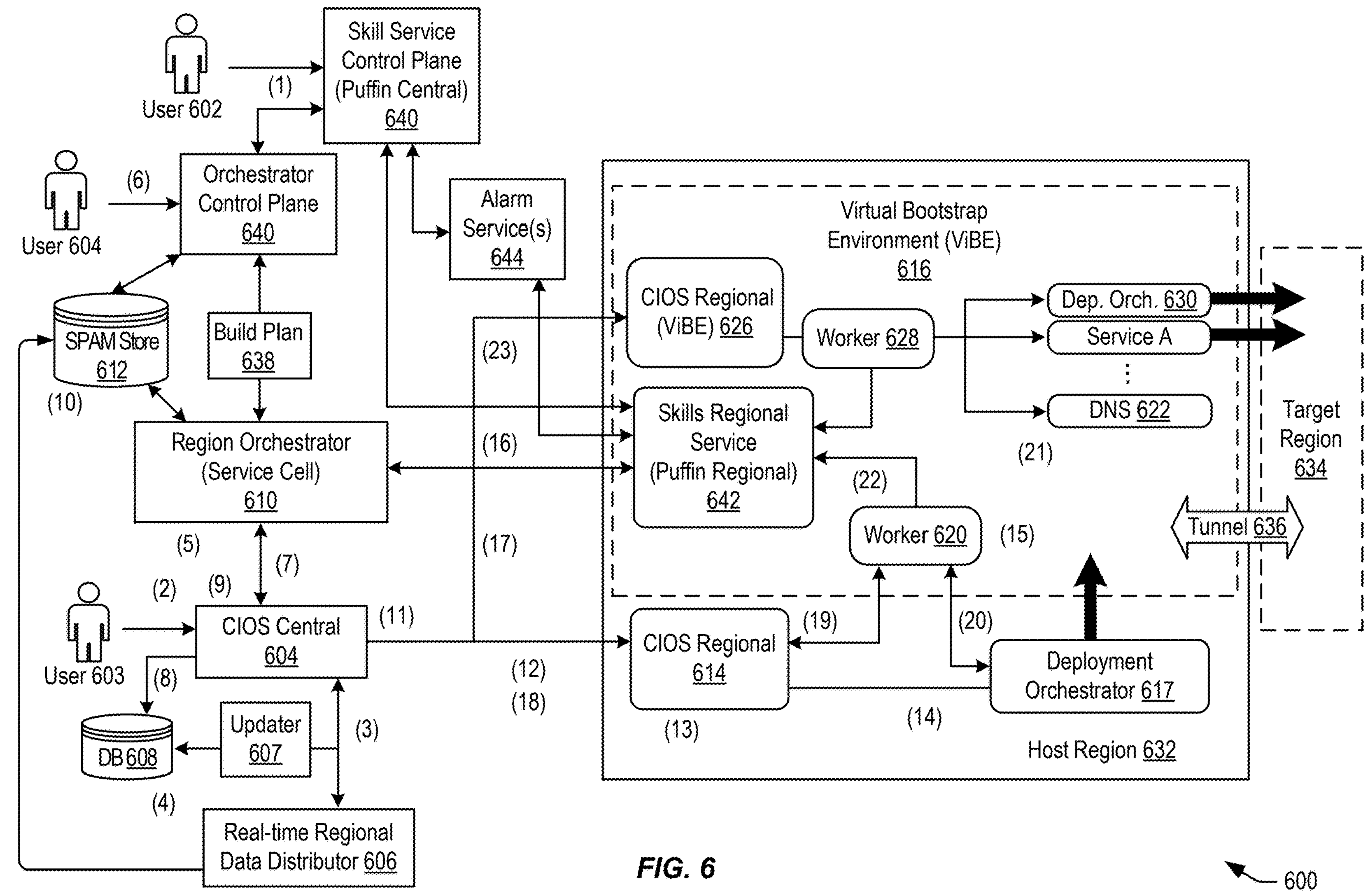
FIG. 6 is a block diagram for illustrating another environment and another method for bootstrapping services to a target region utilizing the ViBE, in accordance with at least one embodiment.

FIG. 6 is a block diagram for illustrating an environment and method 600 for bootstrapping services to a target region utilizing the ViBE, according to at least one embodiment.

The method 600 may begin at step 1, where user 602 (e.g., a service team member) may interact with any suitable number of user interfaces managed by Puffin Central 640 (e.g., Puffin Central 418 of FIG. 4). Puffin Central 640 may be configured to read service and/or skill metadata from predefined files or the user 602 may enter service metadata and/or skill metadata at one or more of the provided user interfaces. In some embodiments, Puffin Central 640 may store all service and skill metadata and serve as a centralized authority for the same. At any suitable time, any suitable user may view the service and/or skill metadata such as prior to and/or during performance of the region build.

At step 2, user 603 (the same or different user as user 602) may utilize any suitable user interface provided by CIOS Central 604 (an example of CIOS Central 408 and CIOS Central 514 of FIGS. 4 and 5, respectively) to modify region data. By way of example, user 603 may create a new region to which a number of services are to be bootstrapped.

At step 3, CIOS Central 604 may execute operations to send the change to RRDD 606 (e.g., an example of RRDD 404 of FIG. 4). At step 4, RRDD 606 may store the received region data in database 608, a data store configured to store region data including any suitable identifier, attribute, state, etc. of a region, AD, realm, ET, or the like. In some embodiments, updater 607 may be utilized to store region data in database 608 or any suitable data store from which such updates may be accessible (e.g., to service teams). In some embodiments, updater 607 may be configured to notify (e.g., via any suitable electronic notification) of updates made to database 608.

At step 5, Region Orchestrator 610 (an example of the Region Orchestrator 406 and/or 506 of FIGS. 4 and 5, respectively), operating in a given service cell (e.g., one of service cell(s) 409 of FIG. 4), may detect the change in region data. In some embodiments, Region Orchestrator 610 may be configured to poll RRDD 606 for changes in region data. In some embodiments, RRDD 606 may be configured to publish or otherwise notify Region Orchestrator 610 of region data changes.

At step 6, user 609 (the same or a different user as users 602 and/or 603) may utilize any suitable user interface to select a SPAM set (also referred to as a "template" herein) to identify a set of one or more SPAMs. The SPAMs corresponding to the selected SPAM set may be obtained from DB 612. In some embodiments, Orchestrator Control Plane 640 may identify any suitable number of SPAMs of the SPAM set corresponding to the infrastructure to be provisioned and artifacts to be deployed as part of a region build according to the SPAMs of the SPAM set. In some embodiments, each SPAM may identify versions corresponding to one or more flock configs and/or one or more artifacts that may be needed (or are needed) to build a single service. In embodiments in which one or more SPAMs are utilized, the SPAM(s) (or any suitable portion of the SPAM(s)) may be stored within SPAM store 612 and utilized to identify the particular flock config and/or artifact versions to be utilized for building the region. In some embodiments, the flock configs and/or artifact versions of a SPAM set may be included in the corresponding SPAM(s) and stored within SPAM store 612.

In some embodiments, any suitable manifest items may be derived from any suitable number of SPAMs and the Orchestrator Control Plane 640 may be configured to verify compliance of a flock's behavior (e.g., the build/orchestration operations identified within a flock config) complies with the process defined by a corresponding SPAM. The Orchestrator Control Plane 640 may be configured to ingest SPAMs which provide the information that may be required (or in some cases, which is required) to build an up-front plan of work and to introduce better guardrails than those available in previous implementations. By way of example, the Orchestrator Control Plane 640 generate build plan 638 based at least in part on the SPAM(s) of the SPAM set and may enforce the invariant that all SPAMs within the set are mutually compatible and composable together to form a viable build plan of releases required to build the service(s) of a region to be built. In some embodiments, a SPAM set may be used within a given regional context to improve service build progress tracking. operations composed from a SPAM set may be validated before they are applied and rejected if they are invalid. This provides an improvement over previous implementations which utilize version set item operations which were unconditionally applied. The utilization of SPAMs may enable the Orchestrator Control Plane 640 to build a deterministic plan of work prior to building a region, to block updates that would jeopardize or break an ongoing or future build, to improve the tracking of process of a service build, to detect deviations of flock behavior from the SPAM's specification, and to alert operators of deviations and status. Orchestrator Control Plane 640 may provide Build Plan 638 to Region Orchestrator 610 or Region Orchestrator 610 may otherwise obtain Build Plan 638 (e.g., from a storage location accessible to the Region Orchestrator 610).

At step 7, Region Orchestrator 610 may request CIOS Central 604 to recompile each of the flock configs associated with the SPAM set) with the current region data. In some embodiments, the request may indicate a version for each flock config and/or artifact.

At step 8, CIOS Central 604 may obtain current region data from the DB 608 (e.g., directly, or via Real-time Regional Data Distributor 606) and retrieve any suitable flock config and artifact in accordance with the versions requested by Region Orchestrator 610.

At step 9, CIOS Central 604 may recompile the obtained flock configs with the region data obtained at step 8 to inject those flock configs of the SPAM set with current region data. CIOS Central 604 may return the recompiled flock configs to Region Orchestrator 610 or the recompiled flock configs may be stored within SPAM store 612. In some embodiments, CIOS Central 604 may simply indicate compilation is done, and Region Orchestrator 610 may access the recompiled flock configs via RRDD 606.

In some embodiments, Build Plan 638 may be a region-level plan that includes every release that may be needed (or that is needed) for every service associated with a SPAM of the SPAM set to be bootstrapped within the region/data center. In some embodiments, the region build plan may be represented by a graph (e.g., a directed acyclic graph) that includes "tracks" and "steps." A "track" refers to a single thread of execution of the Build Plan 638 that may include any suitable number of steps. In some embodiments, multiple tracks may execute concurrently. A "track step" or "step," for brevity, refers to a node of the Build Plan 638 and may correspond to a single track. In some embodiments, a step may include an assertions about state (e.g., an installation of or health of a skill), an execution of an infrastructure or application release, a control flow operation for handling concurrency, or the like. In some embodiments, a track step is an atomic unit of execution of the Build Plan 638. Any suitable portion of Build Plan 638 may be presented via one or more user interfaces (e.g., one or more interfaces provided by any suitable component of CIOS 402 of FIG. 4, including Orchestrator Control Plane, CIOS Central 604, or the like).

One or more "steps" of the Build Plan 638 may correspond to building the VIBE 616 (or individual services within the ViBE such as Puffin Regional 642 and/or worker 620), another node may correspond to bootstrapping DNS 622. The steps 11-16 may correspond to deploying (via deployment orchestrator 617, an example of the deployment orchestrator 518 of FIG. 5) the resources and/or artifacts identified from a SPAM corresponding to building the VIBE 616 (e.g., an example of ViBE 416 and 502 of FIGS. 4, and 5, respectively). That is, steps 11-16 of FIG. 6 generally correspond to steps 1-6 of FIG. 5. Once notified a skill has been installed (e.g., indicating that Worker 620 and/or Puffin Regional 642, corresponding to Worker 510 and Puffin Regional 509 of FIG. 5, respectively, are deployed/available) the Region Orchestrator 610 may recommence traversal of the Build Plan 638 to identify which operations/releases to be executed next.

Region Orchestrator 610 may continue traversing the Build Plan 638 to identify that one or more releases corresponding to deploying DNS 622 are to be executed. Steps 17-22 may be executed to deploy DNS 622 (an example of the DNS 512 of FIG. 5). These operations may generally correspond to steps 7-12 of FIG. 5.

At step 22, a skill state may be updated to indicate that DNS 622 is available. In some embodiments, CIOS Regional 614 and/or Deployment Orchestrator 617 may initially communicate the installation of the skill (e.g., to Puffin Regional 642). Upon detecting the updated skill state (e.g., via data provided by Puffin Regional 642), Region Orchestrator 610 may recommence traversal of the Build Plan 638. The Region Orchestrator 610 may identify that any suitable portion of an instance of CIOS Regional (e.g., an example of CIOS Regional 614) is to be deployed to the VIBE 616. In some embodiments, steps 17-22 may be substantially repeated with respect to deploying CIOS Regional (ViBE) 626 (an instance of CIOS Regional 614, CIOS Regional 410 of FIG. 4) and Worker 628 to the ViBE 616. One or more skill states may be updated to indicate that that CIOS Regional (ViBE) 626 and worker 628 are available.

Upon detecting the CIOS Regional (ViBE) 626 is available, Region Orchestrator 610 may recommence traversal of the Build Plan 638. On this traversal, the Region Orchestrator 610 may identify that a deployment orchestrator (e.g., Deployment Orchestrator 630, an example of the Deployment Orchestrator 617) is to be deployed to the VIBE 616. In some embodiments, steps 17-22 may be substantially repeated with respect to deploying Deployment Orchestrator 630. A skill state indicating the deployment of the Deployment Orchestrator 630 is complete may be transmitted to the Puffin Regional 642, indicating that Deployment Orchestrator 630 is available.

After Deployment Orchestrator 630 is deployed, ViBE 616 may be considered available for processing subsequent requests. Upon detecting Deployment Orchestrator 630 is available, Region Orchestrator 610 may instruct subsequent bootstrapping requests to be routed to ViBE components rather than utilizing host region components (components of host region 632). Thus, Region Orchestrator 610 can continue traversing the Build Plan 638, at each node instructing release execution to the VIBE 616 via CIOS Central 604. CIOS Central 604 may transmit release requests CIOS Regional (ViBE) 626 to effectuate release execution as instructed by Region Orchestrator 610.

At any suitable point during this process, Target Region 634 may become available. Indication that the Target Region is available may be identifiable from region data for the Target Region 634 being provided by the user 603 (e.g., as an update to the region data). The availability of Target Region 634 may depend on establishing a network connection between the Target Region 634 and external networks (e.g., the Internet). The network connection may be supported over a public network (e.g., the Internet), but use software security tools (e.g., IPSec) to provide one or more encrypted tunnels (e.g., IPSec tunnels such as tunnel 636) from the ViBE 616 to Target Region 634. As used herein, "IPSec" refers to a protocol suite for authenticating and encrypting network traffic over a network that uses Internet Protocol (IP) and can include one or more available implementations of the protocol suite (e.g., Openswan, Libreswan, strongSwan, etc.). The network may connect the VIBE 616 to the service enclave of the Target Region 634.

Prior to establishing the IPSec tunnels, the initial network connection to the Target Region 634 may be on a connection (e.g., an out-of-band VPN tunnel) sufficient to allow bootstrapping of networking services until an IPSec gateway may be deployed on an asset (e.g., bare-metal asset) in the Target Region 634. To bootstrap the Target Region's network resources, Deployment Orchestrator 630 can deploy the IPSec gateway at the asset within Target Region 634. The Deployment Orchestrator 630 may then deploy VPN hosts at the Target Region 634 configured to terminate IPSec tunnels from the VIBE 616. Once services (e.g., Deployment Orchestrator 630, Service A, etc.) in the VIBE 616 can establish an IPSec connection with the VPN hosts in the Target Region 634, bootstrapping operations from the VIBE 616 to the Target Region 634 may begin.

In some embodiments, the bootstrapping operations may begin with services in the ViBE 616 provisioning resources in the Target Region 634 to support hosting instances of core services as they are deployed from the VIBE 616. For example, a host provisioning service may provision hypervisors on infrastructure (e.g., bare-metal hosts) in the Target Region 634 to allocate computing resources for VMs. When the host provisioning service completes allocation of physical resources in the Target Region 634, the host provisioning service may transit data (e.g., a skills update) that indicates that the physical resources in the Target Region 634 have been allocated. The data may be transmitted to Puffin Regional 642 via CIOS Regional (ViBE) 626 (e.g., by Worker 628).

With the hardware allocation of the Target Region 634 established and corresponding skills are updated with Puffin Regional 642, CIOS Regional (ViBE) 626 can orchestrate the deployment of instances of core services from the ViBE 616 to the Target Region 634. This deployment may be similar to the processes described above for building the ViBE 616, but using components of the ViBE (e.g., CIOS Regional (ViBE) 626, Worker 628, Deployment Orchestrator 630) instead of components of the Host Region 632 service enclave (e.g., CIOS Regional 614 and Deployment Orchestrator 617). The deployment operations may generally correspond to steps 17-22 described above.

As a service is deployed from the VIBE 616 to the Target Region 634, the DNS record associated with that service may correspond to the instance of the service in the VIBE 616. The DNS record associated with the service may be updated at any suitable time to complete deployment of the service to the Target Region 634. Said another way, the instance of the service in the ViBE 616 may continue to receive traffic (e.g., requests) until the DNS record is updated. A service may deploy partially into the Target Region 634 and publish information indicating the availability of a skill (e.g., to Puffin Regional 642) indicating that the service is at least partially deployed. For example, a service running in the ViBE 616 may be deployed into the Target Region 634 with a corresponding compute instance, load balancer, and associated applications and other software, but may wait for database data to migrate to the Target Region 634 before being completely deployed. The DNS record (e.g., managed by DNS 622) may still be associated with the service in the VIBE 616. Once data migration for the service is complete, the DNS record may be updated to point to the operational service deployed in the Target Region 634. The deployed service in the Target Region 634 may then receive traffic (e.g., requests) for the service, while the instance of the service in the ViBE 616 may no longer receive traffic for the service.

At any suitable time during method 600, Puffin Regional 642 may receive and/or obtain alarm data from one or more alarm services (e.g., the alarm service(s) 644, an example of the alarm service(s) 422 of FIG. 4). In some embodiments, the alarm data may be processed by Puffin Regional 642 (or Puffin Regional 642 may communicate the alarm data or data derived from the alarm data to Puffin Central 640). In some embodiments, Puffin Regional 642 and/or Puffin Central 640 may communicate skill health information to Region Orchestrator 610 indicating corresponding health states associated with one or more skills. In some embodiments, Puffin Regional 642, Puffin Central 640, and/or Region Orchestrator 610 may be configured to execute operations that pause or otherwise halt any suitable portion of the operations discussed above in connection with the method 600. In some embodiments, Puffin Regional 642, Puffin Central 640, and/or Region Orchestrator 610 may be configured to resume and/or execute any suitable portion of the operations of method 600 (e.g., based at least in part on user input, subsequent alarm data indicating an update to a health state associated with one or more skills, based at least in part on a skill health override value, or the like).

Figure 7:
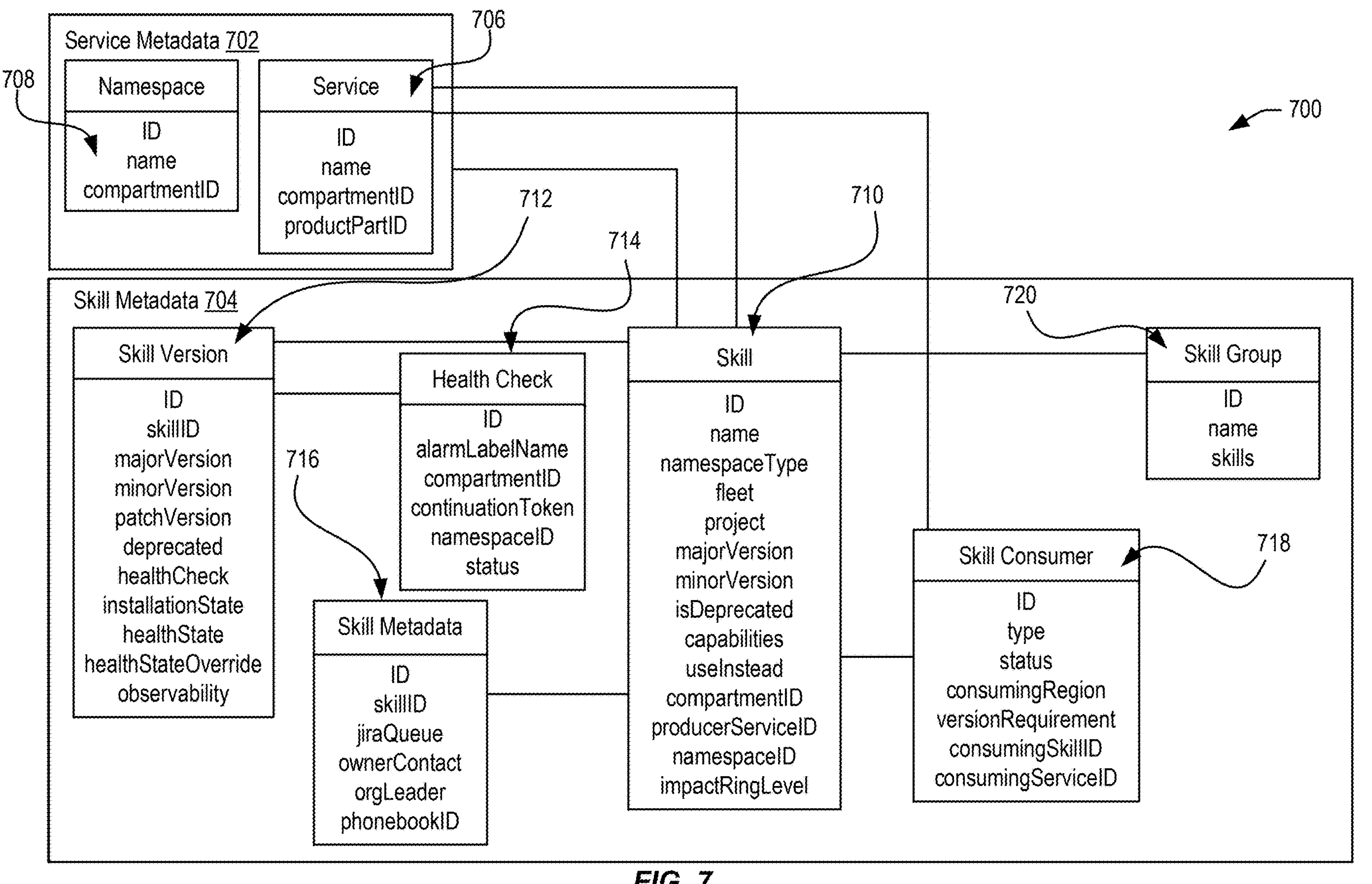
FIG. 7 is a block diagram depicting a data model representing various metadata related to a skill, in accordance with at least one embodiment.

FIG. 7 is a block diagram depicting a data model 700 representing metadata related to a skill, in accordance with at least one embodiment. Each of the data structures depicted in FIG. 7 may include an ID (e.g., an identifier) that uniquely identifies the data structure. This ID may be used to refer to a particular instance of a particular data structure.

In some embodiments, service metadata 702 may include any suitable data corresponding to a service. Service metadata 702 may include any suitable attribute and corresponding value of a service, while skill metadata 704 may similarly include any suitable attribute and corresponding value of a skill. An association between service metadata 702 and skill metadata 704 may indicate a relationship between a service and a skill (e.g., that the service is expected to publish the skill during build or run time). As depicted in FIG. 7, service metadata 702 may be stored in multiple data structures (e.g., namespace data structure 708 and service data structure 706), although any suitable number or type of data structures may be utilized. The service metadata may include, but is not limited to, and suitable combination of ID, a service name (corresponding to a name of the service), a compartment ID (corresponding to an identifier for a compartment to which the service is to be deployed), a product part ID, a namespace ID (an identifier of a namespace associated with the service), a namespace name (a name associated with the namespace associated with the service), and/or a compartment ID corresponding to the namespace. In some embodiments, service metadata 702 may be curated (read from memory, uploaded to Puffin Central 118 of FIG. 1, Puffin Central 418 of FIG. 4, or the like). In some embodiments, service metadata 702 may be obtained by Puffin Central 118 or Puffin Central 418 from another system or, generally, using a process that does not include user input of that information through any of the user interfaces provided by Puffin Central.

Skill metadata 704 may include any suitable number of data structures (e.g., data structures 710-720). In some embodiments, skill data structure 710 may include attributes and values corresponding to any suitable combination of a skill ID, a skill name, a skill fleet, a major version, an isDeprecated indicator, one or more capabilities (e.g., a set of capability identifiers), a uscInstead indicator, a compartment ID, a producer ID, a namespace ID, and a recovery ring level. In some embodiments, the values stored for compartment ID, producer ID, and/or namespace ID in the skill data structure 710 may match the compartment ID, service name, or namespace name of service metadata 702, respectively. A match between one or more of the values of these attributes may be used as an association between skill metadata 704 and service metadata 702 (indicating that the corresponding service is expected to publish the skill at some point).

Skill version data structure 712 may be associated with skill data structure 710 based at least in part on matching values of skill ID of skill version data structure 712 and ID of skill data structure 710. Skill version data structure 712 may include attributes and values corresponding to any suitable combination of an ID (for a skill version), a skill ID (e.g., a unique identifier of the skill), a major version and/or a minor version that individually or collectively identify a particular implementation of the skill, a patch version (e.g., a version identifier that identifies a skill to be used to correct a previously erroneous skill version), a deprecated indicator (indicating whether the skill is deprecated or not), a health check attribute (that references one or more instances of alarm data of one or more instances of health check data structure 714), an installation state (indicating a state of installation such as declared, selected, installing, installed, embargoed, retired, uninstalling), a health state (e.g., indicating the health of the skill such as unknown, healthy, unhealthy, etc.), and an observability attribute. The observability attribute may be used to store any suitable data identifying operations or datapoints required to gather telemetry, alarm, and/or log data for the skill version. Skill version data structure 712 may be associated with health check data structure 714 which may be configured to maintain any suitable number of alarm labels that is/are associated with the skill. By way of example, the healthCheck attribute of skill version data structure 712 may reference any suitable number of health check data structures corresponding to one or more instances of health check data structure 714.

In some embodiments, the health check data structure 714 may include any suitable combination of an alarm identifier (alarm ID, indicating a unique identifier for the alarm), an alarm label name (a name of the alarm), a compartment identifier (compartment ID, indicating a compartment to which the alarm is scoped), a continuation token (a token with which alarm transition history may be obtained), namespace identifier (namespace ID, indicating a particular namespace to which the alarm is scoped), and a status value (indicating a health status corresponding to the alarm). Alarm data corresponding to multiple alarms may be maintained in the health check data structure 714. By way of example, alarm ID may include a list of multiple alarm IDs corresponding to a list of alarm label names stored within the alarm label name attribute. The compartment ID attribute may also be a list of compartment IDs corresponding to the alarms and labels of the alarm ID and alarm label name ID attributes of the health check data structure 714. In some embodiments, multiple sets of attributes alarmID, alarmLabelName, compartmentID, continuationToken, and status may be stored, with each set of attributes corresponding to a single alarm.

In some embodiments, health check data structure 714 may store data corresponding to one or more alarm service(s) (e.g., the alarm service(s) 344 or 644 of FIGS. 3 and 6, the alarm service(s) 122 or 422 of FIGS. 1 and 4). By way of example, the namespace identifier of health check data structure may store a namespace corresponding to a skill (e.g., corresponding to an instance of skill data structure 710). In some embodiments, an association between a skill and an alarm may be maintained based at least in part on storing the same namespace identifier within the namespace ID attribute of an instance of the health check data structure 714 and the namespace ID attribute of an instance of the skill data structure 710. In some embodiments, the status attribute may store a value indicating the health of a skill and/or a status of an alarm (e.g., an alarm identified by alarmID, an alarm identified by namespaceID, etc.). In embodiments, in which status from multiple alarm services are utilized, multiple status attributes may be employed to maintain the status of each corresponding alarm (e.g., one status for an alarmID, another for a namespaceID, etc.).

Skill data structure 710 may be associated with skill metadata data structure 716. Skill metadata data structure 716 may include attributes and values for any suitable combination of an ID (for an instance of the skill metadata data structure 716), a Jira queue, an owner contact, an org leader, and a phonebook ID. A phonebook ID may be an identifier corresponding to a separate system that is configured to store contact data. Skill metadata data structure 716 may be used to store any suitable contact data (e.g., name, email, address, phone number, etc.) for an entity (e.g., a service team member) that is associated with the skill and the service with which the skill is associated.

Skill data structure 710 may be associated with skill consumer data structure 718. Skill consumer data structure 718 may include attributes and values for any suitable combination of an ID (for the skill consumer), a type, a status, a consuming region, a version requirement, a consuming skill ID, a consuming service ID. Skill consumer data structure 718 may be configured to store any suitable information on services and/or skills which depend on the skill defined by skill metadata 704.

Skill data structure 710 may be associated with skill group data structure 720. Skill group data structure may include attributes and values for any suitable combination of an ID (for the skill group), a skill group name, and a set of one or more skill IDs associated with the skill group.

Each of the data structures 706-720 may be stored in one or more data stores and a data structure may be identified and obtained (e.g., via a lookup and/or query operation) based at least in part on a value stored in another data structure through the associations discussed above. By way of example, all skills associated with a service may be identified through a query of the data store(s) for all skill data structures that are associated with a producer ID matching the ID from service data structure 706 of service metadata 702.

Although a number and particular combination of data structures are presented in FIG. 7, any suitable number or type of attributes and/or values and/or data structures may be utilized. In some embodiments, data of any data structure depicted in FIG. 7 may be separated into multiple data structures or combined and stored in fewer data structures than those depicted in FIG. 7. The associations indicated between those data structures may be similar to those shown in FIG. 7, or the associations may differ. As a non-limiting example, the data depicted with data structures 710-720 may be similarly stored in more or fewer data structures. By way of example, the data depicted within data structures 710-720 may be provided in a single data structure in some embodiments.

Each data structure of FIG. 7 may be associated with other data structures of FIG. 7 based at least in part on referencing an identifier of one or more other data structures. By way of example, an instance of skill version data structure 712 may be associated with a particular instance of skill data structure 710 based at least in part on having a value for the skillID attribute of the skill version data structure 712 that matches the value of the ID attribute of the particular instance of the skill data structure 710. As another example, a skill consumer data structure 718 may be associated with a skill based on referencing the ID of the skill data structure 710 within its consumingSkillID attribute. As another example, an instance of skill group data structure 720 may be associated with one or more instances of the skill data structure 710 based on referencing the IDs of those skills with its skills attribute. As yet another example, skill version data structure 712 may reference one or more instances of health check data structure 714 based at least in part on references the IDs of those health check data structures within its healthCheck attribute. An instance of the skill data structure 710 may be associated with a particular service based at least in part on referencing the ID of the service data structure 706 corresponding to the service via its producerServiceID attribute.

Any suitable number of instances of skill metadata 704 (corresponding to individual skills) may be associated with a single instance of service metadata 702 and may be used to represent a process of deploying the service in which the order of deployment tasks is represented via the instances of skill metadata 704. Each skill corresponding to an instance of skill metadata 404 for a service may be tracked, updated, or otherwise analyzed to present information regarding the deployment process for the service, to drive deployment of the service, to validate a build plan or the Build Dependency Graph 338 of FIG. 3, or the like.

Figure 8:
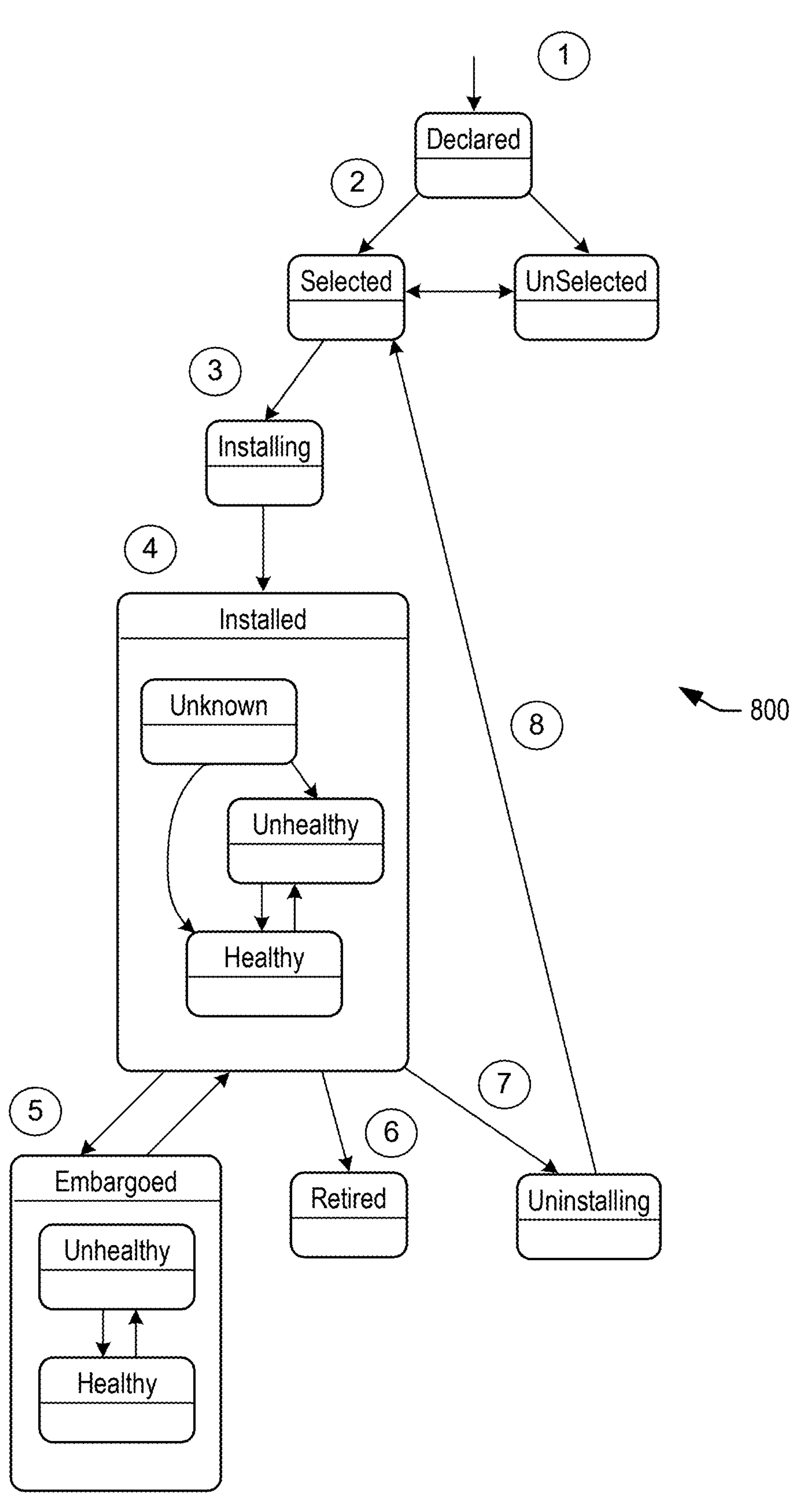
FIG. 8 is a block diagram depicting an example lifecycle for a skill, in accordance with at least one embodiment.

FIG. 8 is a block diagram depicting an example lifecycle 800 for a skill, in accordance with at least one embodiment. Lifecycle 800 may include any suitable number of states. As depicted, lifecycle 800 includes states such as declared, selected, unselected, installing, installed, embargoed, retired, and uninstalling, although other combinations of lifecycle states are contemplated. A lifecycle state may correspond to the installationState attribute of the skill data structure 710 of FIG. 7. In some embodiments, a lifecycle state may be associated with any suitable number of substates. Each of these substates may correspond to the healthState of skill version data structure 712 of FIG. 7. As depicted in FIG. 8, a skill that is associated with a lifecycle state of "installed" may be associated with one of three substates (e.g., "unknown," "unhealthy," and "healthy"). Likewise, a skill associated with an "embargoed" state may be associated with a "healthy" or and "unhealthy" substate. Descriptions for the conditions indicated by each state are provided below.

| State | Health Monitored | Description |
|---|---|---|
| Declared | | A skill version resource (e.g., skill version data structure 712 of FIG. 7) has been created by the Puffin Service and is known to the system (e.g., stored in a database and accessible by any suitable component of CIOS 102 of FIG. 1) |
| Selected | | The skill version resource is selected (e.g., by Orchestrator 106 of FIG. 1) for installation into the target region |
| Unselected | | The skill version resource is unselected (e.g., by Orchestrator 106 of FIG. 1) to ensure the skill version is not (or never) installed in the target region |
| Installing | | Installation of the Service producing the associated Skill is currently underway in the target region. |
| Installed | Y | Installation of the Service producing the associated Skill has completed successfully. Puffin begins/continues periodic health monitoring of the Skill. |
| Uninstalling | | Uninstallation of the Service producing the associated Skill is currently underway in the target region. |

-continued

| State | Health Monitored | Description |
|---|---|---|
| Retired | | The skill version is installed in the target region but no longer provides any meaningful value to any consumers. This state may be utilized by ephemeral Skills in the context and utility of region build. |
| Embargoed | Y | Installation of the Service producing the associated Skill has completed successfully. Puffin begins/continues periodic health monitoring of the skill but the skill version should be treated as Installed only by Skill dependencies of the same producing Service. |

In some embodiments, at step 1, upon selecting the option publish a skill an instance of skill version data structure 712 of FIG. 7 corresponding to the skill may be created and updated to indicate an installation state of "declared." At step 2, the Orchestrator 106 may select the skill for installation within the target region (e.g., target region 114) and transmit data indicating the selection (or a state transition to "selected"). Upon receipt of this data, the Puffin Service may update the skill version data structure 712 to "selected." At step 3, the Orchestrator 106 of FIG. 1 may begin deploying a resource of the service producing the associated skill and may transmit a new indication that the installation state of the skill is to be set to "installing." Upon receipt, the Puffin Service may update the skill version data structure 712 to "installing." At step 7, the installation state of the skill may be updated to "installed" when the installation of the Service producing the associated skill has been successfully completed. Generally, any of the state transitions described herein may be initiated by the Orchestrator 106 (on receiving indications from CIOS Regional or CIOS Central that one or more releases have been successfully executed). Receipt of any suitable indication of a state transition occurring may cause the Puffin Service to update the installation state of the skill version data structure 712. While the skill is associated with an "installed" state, the Puffin Service may monitor the health of the skill.

In some embodiments, monitoring the health of a skill may include monitoring for indications that one or more alarms associated with the skill (e.g., alarms indicated with the alarmLabelName attribute of health check data structure 714 of FIG. 7) have been triggered (e.g., by an alarm service such as a telemetry service and/or a sentinel service, each an example of one of the services of cloud services 2356 of FIG. 23). In some embodiments, if an alarm service (e.g., a telemetry service) configured to provide these alarms is unavailable, a substate corresponding to the "healthState" attribute of skill version data structure 712 may be updated to indicate an "unknown" health state of an installed skill. If no alarm has been triggered for at least a threshold period of time, the healthState attribute of the skill version may be set to a value to indicate a "healthy" state of the installed skill. Receipt of an indication that an alarm that is associated with the skill has been triggered may cause the Puffin Service to update the healthState attribute of the skill version to an "unhealthy" state for the installed skill.

At step 5, the installation state may be updated to an "embargoed" state (e.g., by the Orchestrator, the Puffin Service, and/or based on user input) to indicate that health monitoring should continue but that only skills of the same producing service should treat the embargoed skill as being installed. In some embodiments, the installation state of the skill may revert to "installed."

In some embodiments, a skill version may be retired (e.g., via user input) at step 6. While in the retired state, the skill version may not (or cannot) be utilized by other skills and/or in any build or run. In some embodiments, the skill version's installation state may not be modified once the skill has transitioned to the retired state.

In some embodiments, a skill version's installation state may transition from an "installed" state" to an "uninstalling" state based at least in part on operations performed by the orchestrator and/or by user input. In some embodiments, the Orchestrator 106 may determine service deployments are to be reversed. In these situations, the Orchestrator 106 may "unwind" installation of one or more services. During these operations, when the service is being uninstalled at step 7, the skill version associated may be updated to indicate a state of "uninstalling." When the service associated with the skill version has been successfully uninstalled, the skill version's installation state may be updated to "selected" at step 8.

A number of transitions between the various states and substates are contemplated. The lifecycle states and transitions depicted in FIG. 8 are illustrative and are not intended to limit the scope of the disclosure.

Figure 9:
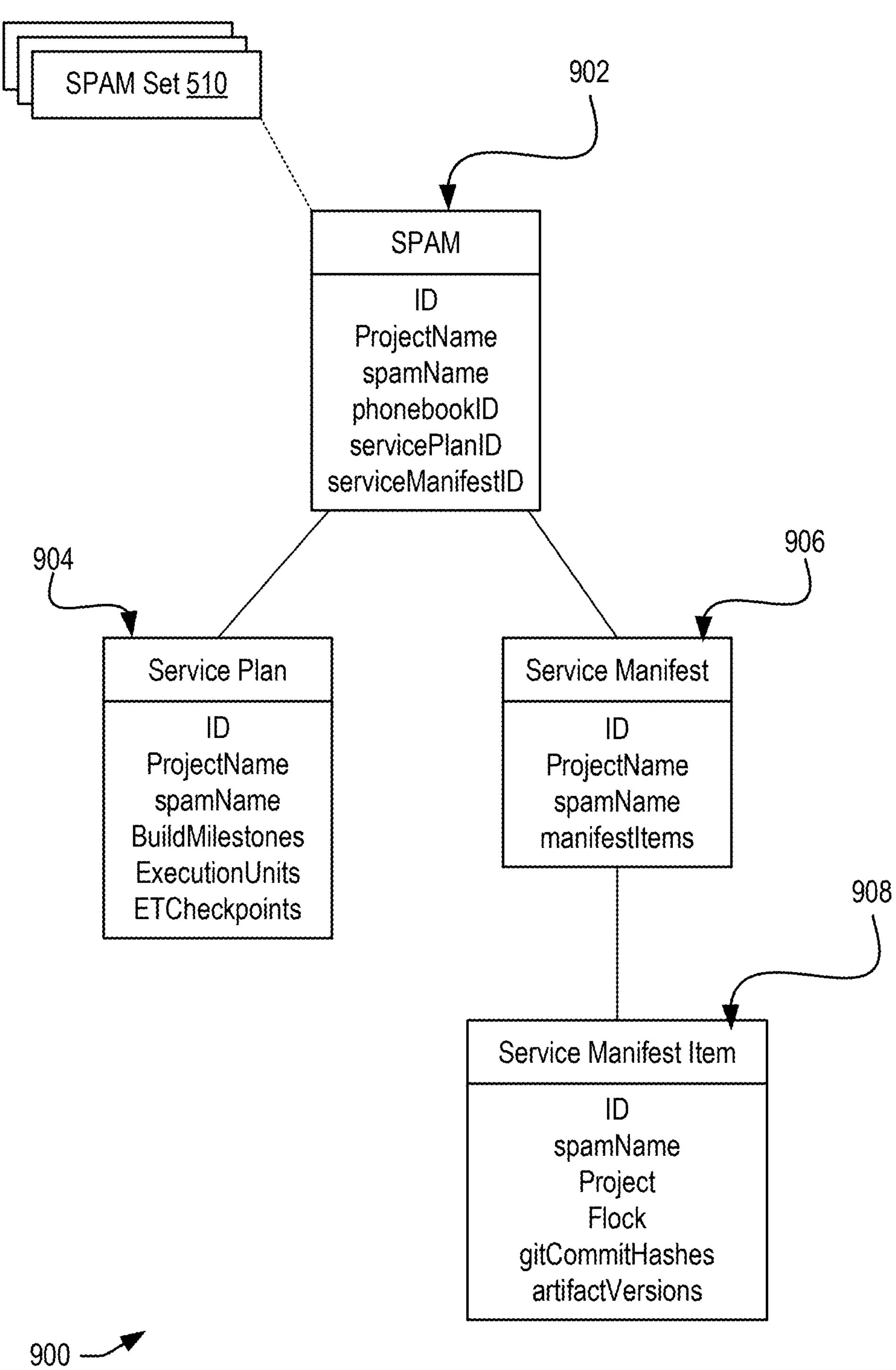
FIG. 9 is a block diagram depicting a data model representing various metadata associated with a SPAM, in accordance with at least one embodiment.

FIG. 9 is a block diagram depicting a data model 900 representing various metadata associated with a SPAM (e.g., a service plan and manifest), in accordance with at least one embodiment. Each of the data structures 902-908 may any suitable number of attributes (pictured) with corresponding values. These data structures may be identified within a common file or any suitable number of files. The SPAM may be maintained within the data structures depicted in FIG. 9 or different data structures. The data structures of FIG. 9 may be combined or separated in any suitable manner to maintain metadata corresponding to the SPAM.

A SPAM may be represented by a combination of the data structures (e.g., data structures 902-908) depicted in FIG. 9. Each of those data structures may include an ID (e.g., an identifier) with a corresponding value that uniquely identifies the data structure. This ID may be used to refer to a particular instance of a particular data structure. Each of the data structures 902-908 may include an attribute corresponding to a "spamName" that may be used to maintain an association between the data structures 902-908 (e.g., to indicate each of the data structures 902-908 correspond to the same SPAM). Any suitable number of SPAMs may be combined and collectively referred to as a SPAM set, an example of which incudes SPAM set 910.

In some embodiments, SPAM data structure 902 may include any suitable data corresponding to a SPAM. Any suitable portion of SPAM data structure 902 may be included in service plan data structure 904 and/or service manifest 906. As depicted in FIG. 9, SPAM data structure 902 includes a phonebookID attribute. A corresponding value for this attribute may identify a service and/or contact that is identified as an owner of the SPAM. In some embodiments, the value corresponding to the attribute "phonebookID" may be an identifier corresponding to a separate system or database configured to maintain contact information for service teams. The value for phonebookID may be used as a lookup value to retrieve corresponding contact information (e.g., an email, a service team name, a phone number, or the like) for a service that owns the SPAM corresponding to SPAM data structure 902. SPAM data structure 902 may include corresponding IDs identifying particular instances of a service plan data structure (e.g., service plan data structure 904) and a service manifest (e.g., service manifest 906) via attributes "servicePlanID" and "serviceManifestID," respectively. Thus, in some embodiments, SPAM data structure 902 maintains a mapping between a service plan (represented by service plan data structure 904) and a manifest (represented by service manifest data structure 906).

The service plan data structure 904 may represent a service plan and the entities included in a service plan. Service plan data structure 904 may include a "buildMilestones" attribute with a corresponding value that includes an ordered list of build milestone identifiers (e.g., names, alphanumeric strings, etc.). The "buildMilestones" attribute may identify, include, or otherwise correspond to the build milestones entity 1100A of FIG. 11. Service plan data structure 902 may include an "executionUnits" attribute that includes a list of one or more execution unit entities (e.g., execution unit entity 1200 of FIG. 12). Each execution unit may be used to describe how a service transitions from one build milestone to the next. An execution unit may describe a directed acyclic graph of releases that need to be performed. The definition of this graph centralizes the definition of how releases (e.g., flock/phase/change Type (e.g., Infra or App) interact. The order of execution units may be driven by the order of build milestones defined in a corresponding build milestones entity.

Service plan data structure 902 may include an "ETCheckpoints" attribute that includes a list of one or more ET checkpoints identified from a flock config (e.g., flock config entity 1400 of FIG. 14). Each ET checkpoint may correspond to a release at a particular execution target.

Service plan data structure 902 may include a flock attribute that indicates one or more flock config entities (e.g., flock config entity 1400 of FIG. 14). Each flock config entity may be used to identify the applicability of a release to one or more execution targets, one or more execution target checkpoints, one or more phases, and/or one or more projects.

Figure 10:
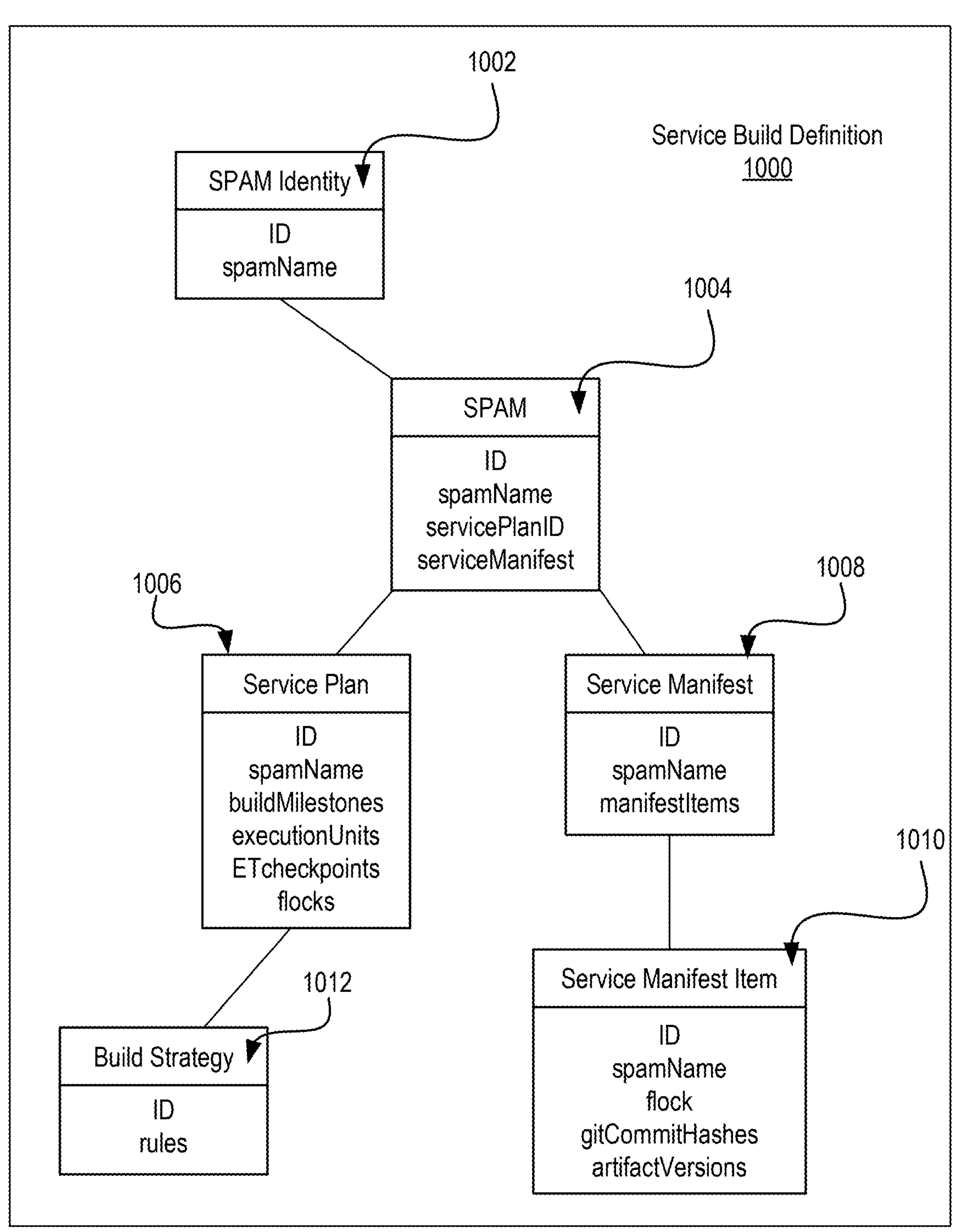
FIG. 10 is a block diagram depicting a data model representing various metadata associated with Service Build Definition, in accordance with at least one embodiment.

FIG. 10 is a block diagram depicting a data model representing various metadata associated with Service Build Definition 1000, in accordance with at least one embodiment. Service Build Definition 1000 may include any suitable portion of a service plan and manifest (SPAM). The data structures 1002-1010 may include any suitable number of attributes (pictured) with corresponding values and may collectively represent a single SPAM. These data structures may be identified within a common file or any suitable number of files. A SPAM may be maintained within the data structures 1002-1010 as depicted in FIG. 10 or with different data structures (e.g., the data structures of FIG. 9). The data structures 1010-1012 of FIG. 10 may be combined or separated in any suitable manner to maintain metadata corresponding to the SPAM.

As depicted in FIG. 10, a SPAM may be represented by a combination of the data structures (e.g., data structures 1002-1010) depicted in FIG. 5. Each of those data structures may include an ID (e.g., an identifier) with a corresponding value that uniquely identifies that data structure. This ID may be used to refer to a particular instance of a particular data structure. Each of the data structures v may include an attribute corresponding to a "spamName" (or another suitable identifier) that may be used to maintain an association between the data structures 1002-1010 (e.g., to indicate each of the data structures 1002-1010 correspond to the same SPAM).

In some embodiments, SPAM data structure 1004 may include any suitable data corresponding to a SPAM. Any suitable portion of SPAM data structure 1004 may be included in service plan data structure 406 and/or service manifest 408. SPAM data structure 1002 may include corresponding IDs identifying particular instances of a service plan data structure (e.g., service plan data structure 1006) and a service manifest (e.g., service manifest data structure 1008) via attributes "servicePlanID" and "serviceManifest," respectively. Thus, in some embodiments, SPAM data structure 1004 maintains a mapping between a service plan (represented by service plan data structure 1006) and a manifest (represented by service manifest data structure 1006).

The service plan data structure 1006 may represent a service plan and the entities included in a service plan. Service plan data structure 1006 may identify one or more build milestones via the attribute "buildMilestones" that may be associated with one or more values that indicate an ordered list of build milestone identifiers (e.g., names, alphanumeric strings, etc.). The "buildMilestones" attribute value may identify, include, and/or otherwise correspond to the build milestones entity 1100B of FIG. 11.

In some embodiments, Service Build Definition 1000 may include one or more build strategies identified within build strategy data structure 1012. As depicted, build strategy data structure 1012 may include an attribute "rules," the value of which may identify any suitable number of build strategies. A "build strategy" refers to an enforced description of how builds occur. A build strategy may include one or more agreements among/between teams for how their services co-operate during cycle-breaking in build, or by the Architects and Region Build managers to ensure an overall strategy is achieved. For example, a build strategy can be used to gate which services build in host region vibe, or for how two services progress through co-dependent steps (each reaching a Milestone in their own SPAM before returning control to the other). These build strategies may be reviewed by Architects before being implemented in the system and may be used in validation checks to ensure changes do not introduce regressions.

In some embodiments, a build strategy may specify pre-conditions which may have functionalities/skills required and post-conditions to ensure/validate that those functionalities were implemented. Each rule in a build strategy may represent a desired/required unit of execution which may be expected (or required) to either be implemented by a SPAM's execution unit or may be (or in some cases must be) a nested build strategy with further details of execution. Each rule in a build strategy may specify a name or other suitable identifier (e.g., a name corresponding to a build stage or specified state) and a description, along with pre- and post-conditions. Rules may be represented by a directed graph. A build strategy may specify both rules and an expected execution order and (if applicable) parallelism. The implementation of a rule may result in changes to a set of installed functionalities/skills. "Internal steps," which refers to steps which produce no changes, may be modeled as part of a workflow implementing a rule.

A build strategy may be used to describe pre- and post-conditions that specify the conditions for a given node to be executed in terms of functionalities/skills that must be installed (and healthy, if applicable) ahead of the node and what is expected to be true after the node is executed (in terms of functionalities/skills installed or uninstalled, and their associated runtime dependencies). Build strategies may be specified at multiple levels of abstraction-a node in a build strategy may be implemented by a nested build strategy or by an execution unit directly.

The service plan represented by service plan data structure 1006 may include an Execution Unit attribute. As depicted, the service plan data structure 1006 includes an "ExecutionUnits" attribute with a corresponding value that indicates one or more execution unit entities (e.g., execution unit entity 1300 of FIG. 13). Each execution unit may be used to describe how a service transitions from one build milestone to the next. An execution unit may describe a directed acyclic graph of releases that need to be performed. The definition of this graph centralizes the definition of how releases (e.g., flock/phase/change Type (e.g., Infra or App) interact. The order of execution units may be driven by the order of build milestones defined in a corresponding build milestones entity.

The service manifest item 1010 may include a flock attribute that indicates one or more flock config entities (e.g., flock config entity 1500 of FIG. 15). Each flock config entity may be used to identify the applicability of a release to one or more execution targets, one or more execution target checkpoints, one or more phases, and/or one or more projects.

FIG. 11 is a block diagram depicting two example build milestone entities (build milestone entity 1100A and (build milestone entity 1100B) that may be included in an example service plan and manifest, in accordance with at least one embodiment.

Build milestones entity 1100A may identify any suitable number of build milestones corresponding to a service build. As depicted in FIG. 11, build milestones entity 1100A identifies four build milestones corresponding to code segments 1102-1108.

Code segment 1102 identifies a build milestone entitled "absent," a corresponding description, and a list of capability publications indicating the capabilities that should (and in some instances, must) be published prior to transitioning to this build milestone (also referred to as "capability dependencies" or the capabilities on which this build milestone depends). The list of capability publications, in this instance, is empty, indicating that no capability publications are expected prior transitioning to the build milestone "absent."

Code segment 1104 identifies a build milestone entitled "service-partial," a corresponding description, and a list of capability publications indicating the capabilities that should (and in some instances, must) be published prior to transitioning to this build milestone. The list of capability publications, in this instance, includes "serviceA_namespace", indicating that publication of the "serviceA_namespace" capability is expected/required before to transitioning to the build milestone "service-partial" may occur.

Code segment 1106 identifies a build milestone entitled "service-available," a corresponding description, and a list of capability publications indicating the capabilities that should (and in some instances, must) be published prior to transitioning to this build milestone. The list of capability publications, in this instance, includes "serviceA_backend," indicating that publication of the "serviceA_backend" capability is expected/required before transitioning to the build milestone "service-available" may occur.

Code segment 1108 identifies a build milestone entitled "complete," a corresponding description, and a list of capability publications indicating the capabilities that should (and in some instances, must) be published prior to transitioning to this build milestone. The list of capability publications, in this instance, is empty indicating that no capability publications are expected prior to transitioning to the build milestone "complete" may occur.

In some embodiments, each build milestone specifies the capabilities publications that the service should have published before reaching a particular build milestone. A set of build milestones may indicate a high-level overview of a process for building a service and may be utilized/consumed by external consumers (e.g., other services that depend on the service to which the build milestones relate). Build milestones may be defined and utilized to express portions of functionality are available for the service. This may allow other service builds to proceed when the functionality on which the other service depends is available, rather than waiting for the service in question to become fully available. Build milestones may be used for coordination between services. When building a service does not involve coordination with other services, the service plan for that service may include no build milestones or a number of default build milestones (e.g., "absent" and "complete"). In some embodiments, the build milestones defined in every service plan to be used for a region build may be used to generate a high-level graph and/or sequencing diagram. This may provide service teams a graph view of simplified complexity with which the region build process may be more easily understood and synthesized. As a non-limiting example, a graph/diagram generated using the build milestones for each corresponding service may include a reduced number of nodes (e.g., 3 per service, 4 per service, depending on the service's build milestone implementation) from the Build Dependency Graph 338 or 638 of FIG. 3 or 6 that may include dozens of nodes (representing capabilities) per service.

Build milestones entity 1100B may identify any suitable number of build milestones corresponding to a service build. As depicted in FIG. 11, build milestones entity 1100B identifies four build milestones corresponding to code segments 1110-1116. Each build milestone may include any suitable number of unique identifiers (e.g., ID, Name, etc.) with which the build milestone may be uniquely identified. Build milestones may be individually associated with one or more skills that are to be installed as part of the executing the releases of the build milestone. These skills may be published (e.g., data transmitted to transition the skill to a state of "INSTALLED") upon transitioning, or prior to transitioning to a given build milestone.

Code segment 1110 identifies a build milestone entitled "absent," a corresponding ID (e.g., "service_absent"), a corresponding description, and a list of skills corresponding to functionalities/skills that are to be published as being installed upon transitioning to this build milestone. The list of functionalities, in this instance, is empty, indicating that no skills are expected to be published prior to transitioning to the build milestone "absent."

Code segment 1112 identifies a build milestone entitled "service-partial," a corresponding to ID (e.g., "service_partially_available"), a corresponding description, and a list of skills corresponding to functionalities/skills that are expected to be published upon transitioning to this build milestone (also referred to as "functionalities" or the skills on which this build milestone depends). The list of functionalities, in this instance, includes "/INTERNAL/serviceA_partial," indicating that a skill "serviceA_partial" corresponding to a portion of service functionality is expected/required to be published (e.g., transitioned to a state of INSTALLED) upon transitioning to the build milestone "service_partially_available." In some embodiments, "/INTERNAL/" specifies that the skill "serviceA_partial" is a skill on which the service being built (e.g., "service A") internally depends. Internal skills may be considered those on which only the service corresponding to these build milestones, and no external services, depend.

Code segment 1114 identifies a build milestone entitled "service-available," a corresponding to ID (e.g., "service_fully_available"), a corresponding description, and a list of skills corresponding to functionalities/skills that are expected to be published (e.g., transitioned to a state of INSTALLED) prior to transitioning to this build milestone. The list of functionalities, in this instance, includes "/INTERNAL/serviceA_backend," indicating that a skill "serviceA_backend" corresponding to a portion of service functionality is expected/required to be published (e.g., transitioned to a state of "INSTALLED") upon transitioning to the build milestone "serviceA_fully_available." In some embodiments, "/INTERNAL/" specifies that the skill "serviceA_backend" is a skill on which the service being built (e.g., "service A") internally depends.

Code segment 1116 identifies a build milestone entitled "complete," a corresponding to ID (e.g., "service_complete"), a list of skills corresponding to functionalities/skills that are expected to be published prior to transitioning to this build milestone. The list of functionalities, in this instance, includes "/PUBLIC/serviceA_complete," indicating that a skill "serviceA_complete" corresponding to a portion of service functionality is expected/required to be published (e.g., transitioned to a state of "INSTALLED") upon transitioning to the build milestone "serviceA_complete." In some embodiments, "/PUBLIC/" specifies that the skill "serviceA_complete" is a skill on which at least one other external service (a service other than service A of this example) depends.

In some embodiments, each build milestone specifies the functionalities/skills that are expected (and in some cases, required) to be published upon transitioning to the given build milestone. These functionalities/skills, as seen in FIG. 6, may be expressed as internal and/or public skills. The designator "INTERNAL" and "PUBLIC" depicted in FIG. 6 may correspond to respective namespaces. Any suitable functionality/skill may be associated with a corresponding namespace. Any suitable number of namespaces may be utilized. A set of build milestones (e.g., build milestones corresponding to code segments 602-608) may be used to indicate a high-level overview of a process for building a service and may be utilized/consumed by external consumers (e.g., other services that depend on the service to which the build milestones relate). Build milestones may be defined and utilized to express portions of functionality are available for the service. This may allow other service builds to proceed when the functionality on which the other service depends is available (expressed as expected installed skills), rather than waiting for the service in question to become fully available. Build milestones may be used for coordination between services. When building a service does not involve coordination with other services, the service plan for that service may include no build milestones or a number of default build milestones (e.g., "absent" and "complete"). In some embodiments, the build milestones defined in every service plan to be used for a region build may be used to generate a high-level graph and/or sequencing diagram. This may provide service teams a graph view of simplified complexity with which the region build process may be more easily understood and synthesized. As a non-limiting example, a graph/diagram generated using the build milestones for each corresponding service may include a reduced number of nodes (e.g., 3 per service, 4 per service, depending on the service's build milestone implementation) from the Build Plan 338 or 638 of FIG. 3 or 6 that may include dozens of nodes (representing capabilities) per service.

Figure 12:
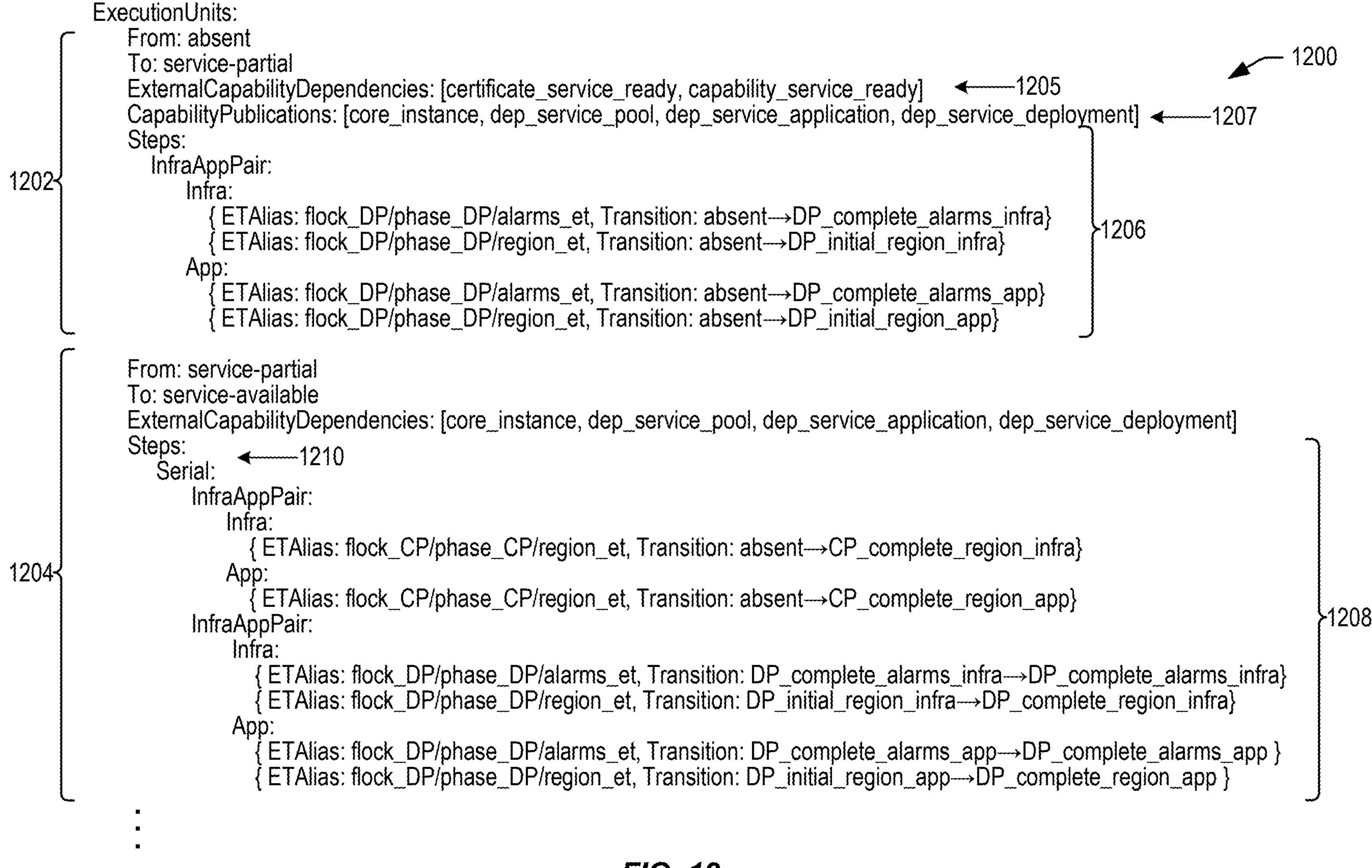
FIG. 12 depicts an example execution unit entity of an example service plan, in accordance with at least one embodiment.

FIG. 12 depicts an example execution unit entity 1200 of an example service plan, in accordance with at least one embodiment. Execution unit entity 1200 may identify any suitable number of execution units (e.g., one for each transition between ordered pairs of build milestones identified by a corresponding build milestone entity such as build milestone entity 1100A or 1100B of FIG. 11). FIG. 12 depicts two such transitions (e.g., a transition between build milestones "absent" and "service-partial" and another transition between build milestones "service-partial" to "service-available"). Another execution unit may be defined for a transition between build milestones "service-available" and "complete," but is not depicted in FIG. 12 for brevity. As the build milestones are defined as having a sequential order, so too are the execution units due to their association to the ordered build milestones.

As depicted in FIG. 12, execution unit entity 1200 includes execution unit 1202 and execution unit 1204. Execution unit 1202 may correspond to the transition between build milestones "absent" and "service-partial." Execution unit 1204 may correspond to the transition between build milestones "service-partial" and "service-available." Additional execution units may be included in execution unit entity 1200 but not depicted in FIG. 12.

Each execution unit may include one or more external capability dependencies. By way of example, execution unit 1202 specifies external capability dependencies on a set of external capability dependencies as depicted at 1205. These external capability dependencies may include one or more capabilities that should (or in some instances, must) be published prior to transitioning from one build milestone (e.g., the "absent" build milestone) to another (e.g., the "service-partial" build milestone). The set of external capability dependencies may be the union of external capabilities requirements for all releases defined in the step section of the corresponding execution unit. As depicted in FIG. 12, the external capability dependencies are indicated as including capabilities "certificate_service_ready" and "capability_service_ready." Any suitable number of external capability dependencies may be specified. In some embodiments, an execution step may include no external capability dependencies.

Each execution unit may indicate one or more capabilities that are expected to be published when execution of the releases corresponding to the execution unit have been completed. By way of example, execution unit 1202 specifies a set of capability publications at 1207 indicating a superset of all capabilities that are expected to have been published once execution of the releases indicated in step section 1206 have been completed. The capability publications may be additionally or alternatively defined as being associated with the build milestone to which the execution relates.

Each execution unit may include any suitable number of steps (or groups of steps) that, when executed, move the service from one build milestone to another. By way of example, execution unit 1202 specifies step section 1206 which includes an InfraAppPair step type. An InfraAppPair step specifies one or more infrastructure releases expressed using an ET alias (e.g., ET: Alias flock_DP/phase_DP/alarms_et) and flock/phase execution target (ET) transition (e.g., Transition: absent→DP_complete_alarms_infra). Each release reference may denote, for each ET alias, the ET checkpoint transition being made with the release. In some embodiments, the Orchestrator (e.g., Orchestrator 106 of FIG. 1) may be configured to enforce that infrastructure releases defined in an InfraAppPair step are executed prior to releases defined in a corresponding App section of the same InfraAppPair step. In the example provided in FIG. 12, the releases corresponding to transitions absent→DP_complete_alarms_infra and absent→DP_initial_region_infra may be executed prior to the application releases corresponding to absent→DP_complete_alarms_app and absent→DP_initial_region_app, as specified in step section 1206. In some embodiments, the Orchestrator may create a directed acyclic graph or another suitable ordered execution plan that orders the infrastructure releases before the application releases defined in an InfraAppPair step type. In some embodiments, execution targets of different phases may not be included in the same InfraAppPair step and/or ET ordering is required to reflect the order defined in a corresponding flock config if an ordered is imposed in that flock config.

Other step types may be utilized. For example, a parallel step type may be used if region build phases have no dependencies between one another and may be executed in parallel (e.g., substantially simultaneously, concurrently, and/or overlapping execution) should their external dependencies be resolved at substantially the same time. A serial step type may be used if two distinct phases (e.g., with distinct names) have a direct dependency between one another (e.g., the corresponding releases of which are expected to be executed serially).

All of the expected publications of a build milestone (e.g., the build milestone that is transitioned to) may be published when all of the releases of a corresponding execution unit that caused the transition are complete. By way of example, the capability "serviceA_namespace" may be published upon transitioning to build milestone "service-partial" as indicated in Code segment 1104 of FIG. 11.

As another example, execution unit 1204 includes step section 1208 which includes multiple InfraAppPair step types, each of which includes one or more infrastructure releases and application releases. These InfraAppPair steps may be grouped and ordered using a serial step type as indicated at 1210.

FIG. 13 depicts another example execution unit entity 1300 of an example service plan, in accordance with at least one embodiment. Execution unit entity 1300 may identify any suitable number of execution units (e.g., one for each transition between ordered pairs of build milestones identified by a corresponding build milestone entity such as build milestone entity 1100B of FIG. 11). FIG. 13 depicts two such transitions (e.g., a transition between build milestones "absent" and "service-partial" and another transition between build milestones "service-partial" to "service-available"). Although names are depicted as being used and corresponding to FIG. 6, IDs may be similarly used. Another execution unit may be defined for a transition between build milestones "service-available" and "complete," but is not depicted in FIG. 13 for brevity. As the build milestones are defined as having a sequential order, so too are the execution units due to their association to the ordered build milestones.

As depicted in FIG. 13, execution unit entity 1300 includes execution unit 1302 and execution unit 1304. Execution unit 1302 may correspond to the transition between build milestones "absent" and "service-partial." Execution unit 1304 may correspond to the transition between build milestones "service-partial" and "service-available." Additional execution units may be included in execution unit entity 1300 but not depicted in FIG. 13.

Each execution unit may include one or more automated dependencies. By way of example, execution unit 1302 specifies dependencies on a set of public skills (e.g., skills that are installed by a separate service) as depicted at 1305. These automated dependencies (also referred to as "external dependencies" may include one or more skills that should (or in some instances, must) be installed (e.g., in a state of "INSTALLED") prior to executing a transition from one build milestone (e.g., the "absent" build milestone) to another (e.g., the "service-partial" build milestone). The set of automated dependencies may be the union of external skill requirements for all releases defined in the step section of the corresponding execution unit. As depicted in FIG. 13, the automated dependencies are indicated as including public skills corresponding to "/PUBLIC/functions" and "/PUBLIC/OCI_Logging." The "PUBLIC" designation may correspond to a public namespace with which the two depicted skills are associated. Any suitable number of automated dependencies may be specified. Although public skills are depicted, it should be appreciated that any suitable combination of skills corresponding to any suitable number of namespaces (e.g., PUBLIC, INTERNAL, etc.) may be utilized. In some embodiments, an execution step may include no automated dependencies.

As another example, execution unit 1304 specifies a set of public skills at 1307. Although not depicted, in some embodiments, the automated dependencies at 1307 may include a superset of all skills that are expected (and in some cases, requited) to be installed prior to a transition from one build milestone (e.g., the "service_partial" build milestone) to another (e.g., the "service-available" build milestone).

Each execution unit may include any suitable number of steps (or groups of steps) that, when executed, move the service from one build milestone to another. By way of example, execution unit 1302 specifies step section 1306 which includes two flock invocations (e.g., to releases corresponding to an infrastructure release and an application release). The ID, a name for the flock config to be utilized (specified by the attribute "FlockConfig"), a change type (e.g., INFRA, APP, etc.), and one or more c may be specified for each flock invocation of step section 1306. In some embodiments, a step type may be used to indicate the order of execution of the flock invocation identified within section 1306. In section 1306, a serial step type is indicated at 1308. A serial step type may be used to indicate that the nested flock invocations are to be performed serially in the order listed within section 1306.

Other step types may be utilized. For example, a parallel step type may be used if flock invocations may be executed in parallel (e.g., substantially simultaneously, concurrently, and/or overlapping execution). A serial step type may be used if two flock invocations (e.g., with distinct names) have a direct dependency between one another (e.g., the corresponding releases of which are expected to be executed serially). Execution of a release may cause one or more skill states corresponding to one or more skills to be published.

All of the expected skill publications (indications that corresponding skills were installed) associated with a build milestone (e.g., the build milestone that is being transitioned to) may be published when all of the releases of a corresponding execution unit that caused the transition are complete. By way of example, the skill "/INTERNAL/serviceA_partial" may be published upon transitioning to build milestone "service-partial" as indicated in Code segment 604 of FIG. 6. This transition may be completed upon successful release execution corresponding to the two flock invocations of section 1306.

As another example, execution unit 1304 defines a transition from build milestone "service-partial" to build milestone "service-available." As depicted, execution unit 1304 includes step section 1308 which includes multiple flock invocations (e.g., corresponding to two infrastructure releases) which may be executed concurrently as indicated by the designator "Parallel" depicted at 1310. The execution of the flock invocations (e.g., releases) specified in section 1308 may depend on skills "/PUBLIC/serviceB_complete" and " " PUBLIC/serviceC_complete) being published (e.g., being associated with a state of "INSTALLED"). Each flock invocation may be associated with one or more build flags which are to be posted upon successful execution of the release corresponding to a given flock invocation.

FIG. 14 depicts an example flock config entity 1400 of an example service plan, in accordance with at least one embodiment. The flock config entity 1400 may be used to specify the generalized configuration of the releases expressed in the execution unit entity 1200 of FIG. 12. The specifications for all the execution units included in the installation process may be indicated here. Flock config entity 1400 may indicate any suitable number of projects (e.g., a project "sample-project," identified at 1402) and any suitable number of flocks for each project (e.g., a flock "service-dp," identified at 1404). Any suitable number of phases may be defined for each flock within phase section 1406. Similarly, any suitable number of execution targets may be defined for each phase within execution target section 1408. Each execution target section may include any suitable number of execution target (ET) checkpoints defined within checkpoints section 1410. In some embodiments, the service plan including flock config entity 1400 may be validated to ensure that all references included in the service plan reference valid components (e.g., components managed by CIOS 102 of FIG. 1).

Checkpoints section 1410 may define any suitable number of checkpoints. These checkpoints may be grouped by type (e.g., "Infra" indicating an infrastructure change type, "App" indicating an application change type), as depicted, or each checkpoint may indicate a corresponding change type. In some embodiments, the order by which the checkpoints are provided within checkpoints section 1410 may define an order by which the checkpoints are executed. In some embodiments, when the checkpoints indicate a corresponding change type, infrastructure change related releases may be ordered ahead of any application change related releases, even when an application change related release is listed within checkpoints section 1410 in a position ahead of an infrastructure release. Each checkpoint may indicate a corresponding flock configuration file as depicted at 1412, external and/or internal capability dependencies as depicted at 1414, and capability publications as depicted at 1416 for each release. Providing these mappings within the flock config entity 1400 enables the execution unit entity 1200 of FIG. 12 to be simplified. The flock config entity 1400 may be used to map execution unit steps that refer to an ET checkpoint of flock config entity 1400 to CIOS managed components (e.g., flock config files) that define the releases. Providing this mapping within flock config entity 1400 simplifies the execution unit entity 1200 of FIG. 12.

One of the challenges of previous build implementations is understanding what progress should happen each time a release is executed against a particular phase and change type of a flock, particularly when the phase has optional capability dependencies. For each release that the Orchestrator (e.g., Orchestrator 106 of FIG. 1) initiated in previous implementations, it was not apparent which optional capability dependencies were needed and which capabilities should be published through the release execution. The ET checkpoints defined in flock config entity 1400 may resolve this ambiguity by stating clear expectations of the capability dependencies and capability publications for each release of an execution target.

FIG. 15 depicts another example flock config entity 1500 of an example service plan and manifest (SPAM), in accordance with at least one embodiment. The flock config entity 1500 may be used to specify the particular flock configs corresponding to the releases expressed in the execution units entity 1300 of FIG. 13. A given flock config section (e.g., section 1502) of flock config entity 1500 may indicate any suitable ID, project, flock (e.g., a flock name), phase, execution target (ET), a hash value (e.g., a gitCommitHash uniquely identifying a hash of the flock config, and one or more build flags to be posted upon successfully completing the release corresponding to a flock config corresponding to the section.

By way of example, section 1502 may specify details corresponding to one flock config. For example, section 1502 may specify a flock ID of "partial_service_infra," a project "ServiceA," a flock name "partial_service_infra," a phase "$ {Realm} production_service_tenancy," where "$ {Realm} is an injectable variable that is injected with current region data when recompiled in the manner described above in connection with FIG. 3. Section 1502 may further specify an ET "$ {Realm} production_service_tenancy," a Git commit hash of the flock config, and one or more build flags. As depicted in FIG. 15, flock config "partial_service_infra" is associated with one build flag "serviceA_tenancy" which is associated with an infrastructure type as depicted at 1504.

Any suitable number of phases may be defined for each flock within its corresponding section. Similarly, any suitable number of execution targets may be defined for each phase. Each execution target may be associated with any suitable number of execution target (ET) checkpoints defined within a given SPAM. Infrastructure checkpoints (e.g., checkpoints related to an infrastructure change) may be grouped and provided within a given section, not depicted). Similarly, application checkpoints (e.g., checkpoints related to an application change) may be grouped and provided within application checkpoint section (not depicted). In some embodiments, the SPAM including flock config entity 1500 may be validated to ensure that all references included in the SPAM reference valid components (e.g., components such as flock configs that are managed by CIOS 102 of FIG. 1).

As another example, section 1506 may specify details corresponding to another flock config. For example, section 1506 may specify a flock ID of "full_service_infra1," a project "ServiceA," a flock name "full_service_infra1," a phase "$ {Realm} production_service_tenancy" where "$ {Realm}" is an injectable variable that is injected with current region data when recompiled in the manner described above in connection with FIG. 3. Section 1506 may further specify an ET "$ {Realm} production_service_tenancy," a Git commit hash of the flock config, and one or more build flags. As depicted in FIG. 15, flock config "full_service_infra1" is associated with two build flags (e.g., "serviceA_region" and "serviceA_registration") which are associated with an infrastructure type as depicted at 1510.

One of the challenges of previous build implementations is understanding what progress should happen each time a release is executed against a particular phase and change type of a flock, particularly when the phase has optional capability dependencies. For each release that the Region Orchestrator (e.g., Region Orchestrator 406 of FIG. 4) initiated in previous implementations, it was not apparent which optional capability dependencies were needed and which capabilities should be published through the release execution. The entities of FIG. 6-8 resolve this ambiguity by stating clear expectations of the capability dependencies and capability publications for each release of an execution target.

Figure 16:
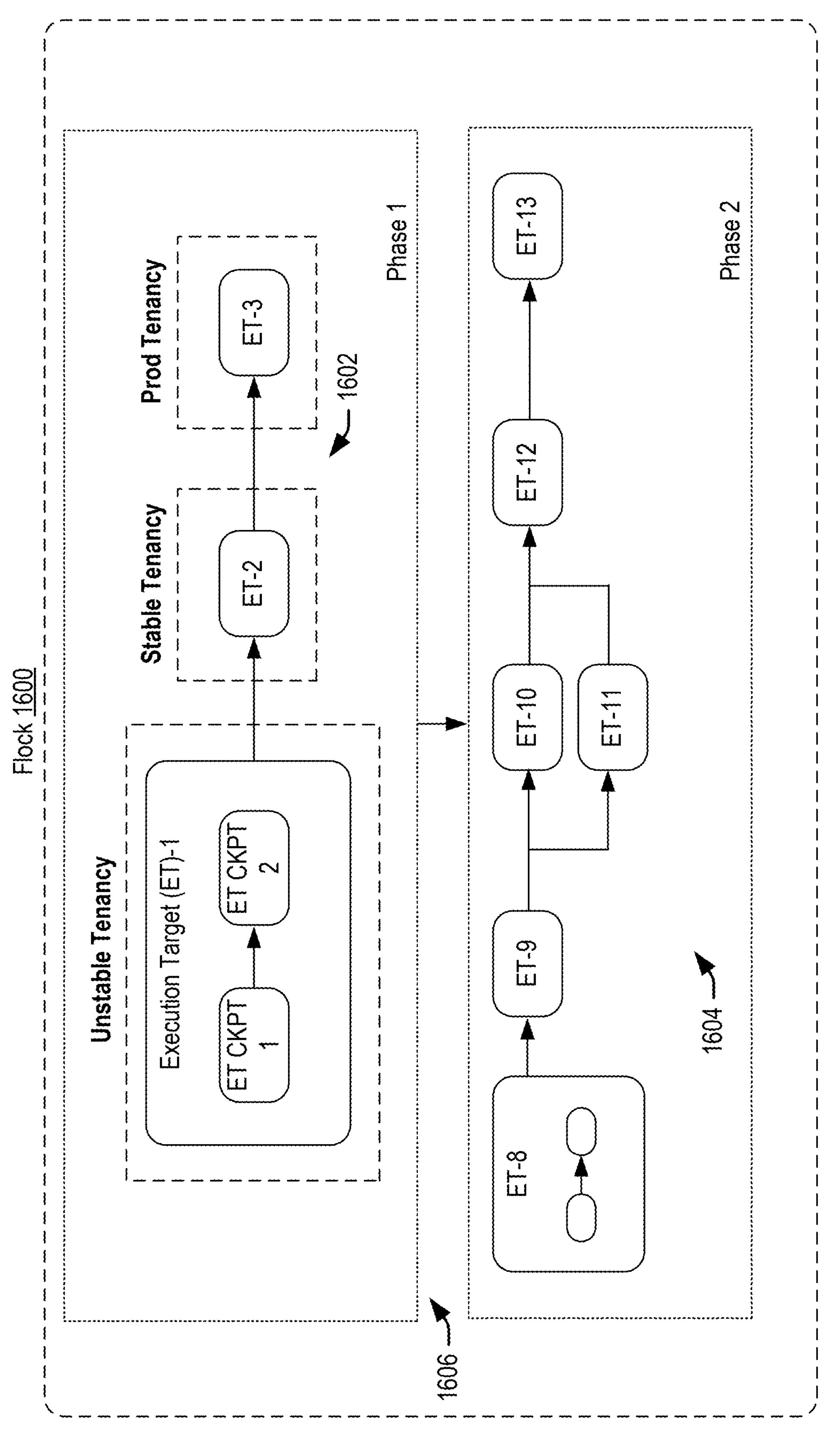
FIG. 16 is a block diagram depicting a relationship between a flock, a number of phases, a corresponding number of execution targets for each phase, and one or more execution target checkpoints of an execution target, according to at least one embodiment.

FIG. 16 is a block diagram depicting a relationship between a flock 1600, a number of phases, a corresponding number of execution targets for each phase, and one or more execution target checkpoints of an execution target, according to at least one embodiment. A flock (e.g., the resources of a service) may be provisioned and deployed to multiple execution targets. Each execution target with FIG. 16 is intended to depict a different location and/or set of devices at which the flock 1600 (e.g., resources corresponding to a service) is to be bootstrapped. By way of example, each execution target of FIG. 16 may depict a different data center or set of devices. For any given data center build (an example of which may be a "region build," referring to a data center build corresponding to a particular region context), a flock's resources (e.g., resources corresponding to a service) may be bootstrapped to any suitable number of execution targets. In some embodiments, bootstrapping operations for a set of execution targets may be associated with a "phase" and potentially multiple phases may be defined. Any suitable phase may be associated with a set of one or more execution targets. In some embodiments, an order by which bootstrapping operations are performed for set of execution targets (e.g., ET-1-ET-3, collectively referred to as "execution targets 1602") may be defined and associated with a phase (e.g., phase 1), while another set of execution targets (e.g., ET-8-ET-13, collectively referred to as "execution targets 1604") may be defined and associated with another phase (e.g., phase 2). In some embodiments, there may be a designated order by which phases are to be executed. One phase (e.g., phase 2) may be dependent on completion of the operations associated with another phase (e.g., phase 1). Similarly, one execution target (e.g., ET-2) may be dependent on operations corresponding to one or more other execution targets (e.g., ET-1) being completed. In some embodiments, a data structure (e.g., phase data structure 1606) may be generated by CIOS 102 or 302 of FIGS. 1 and 3 to identify a set of phases (e.g., one or more) with which bootstrapping a given service across multiple execution targets is to be executed, where each phase is associated with one or more execution targets. Any suitable number of data structures (e.g., one or more directed acyclic graphs, linked lists, or the like) may be generated for identifying a set of execution targets (e.g., execution targets 1602) and an order by which bootstrapping the service across those set of execution targets is to be executed.

An execution target may be associated with a tenancy and region (e.g., unstable-tenancy/region1, stable-tenancy/region2, prod-tenancy/region3) as depicted in FIG. 16. In some embodiments, CIOS 102 or 302 of FIGS. 1 and 3) may allow flocks to be modeled using many tenancies within a realm and many regions within a tenancy. However, CIOS 102/302 may disallow using the same region twice within a tenancy (although the same region may be utilized twice within a realm—in different tenancies). Although not depicted in FIG. 1, each of ET-8-ET13 may be associated with a corresponding tenancy and region.

Each execution target (e.g., ET-1) may be associated with one or more execution target (ET) checkpoints (e.g., ETCKPT-1 and ETCKPT-2). Phases (e.g., phase 1, phase 2, etc.), execution targets (e.g., ET-1-ET-13), execution target checkpoints may be defined and/or specified within flock config entity 1400 and/or 1500 of FIGS. 14 and 15. ET checkpoints may be associated with a corresponding set of releases. ET checkpoints may be ordered (e.g., within an ordered list, or nested lists (e.g., Infra and App ordered lists), as depicted in FIG. 14) and each may represent a unit of progress of the execution target during build.

In some embodiments, Orchestrator 310 and 610 of FIGS. 3 and 6 may maintain any suitable number of data structures (e.g., Build Dependency Graph 338 and 638 of FIGS. 3 and 6, linked lists, directed acyclic graph(s), objects, or the like) for maintaining dependencies between flocks, phases, execution targets, execution target checkpoints, releases, and/or the like. Similarly, Orchestrator, Orchestrator 310 and 610 of FIGS. 3 and 6 may generate data structures for maintaining dependencies between build milestones, execution targets, execution target checkpoints, and/or releases.

Figure 17:
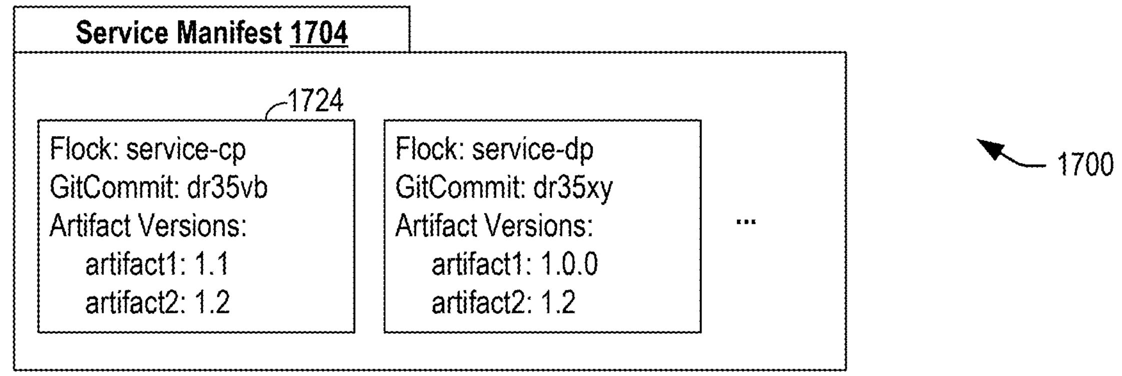
FIG. 17 is a block diagram depicting relationships between portions of a service plan and manifest, in accordance with at least one embodiment.

FIG. 17 is a block diagram 1700 depicting relationships between portions of a service plan (e.g., service plan 1702, an example service plan corresponding to service plan data structure 904 of FIG. 9, service plan 1006 of FIG. 10, etc.) and manifest (e.g., manifest 1704, an example of service manifest corresponding to service manifest 906 of FIG. 9, service manifest 1008 of FIG. 10, etc.), in accordance with at least one embodiment.

The service plan 1702 may include any suitable combination of the build milestones entity 1100A or 1100B of FIG. 11, the execution unit entity 1200 or 1300 of FIG. 12, and/or the flock config entity 1400 or 1500 of FIGS. 14 and 15. In some embodiments, the service plan 1702 indicates a service build implementation at different levels of granularity. The highest level of granularity indicates the build milestones (e.g., build milestones 1706-1712, defined with a corresponding build milestone entity similar to build milestone entity 1100A or 1100B). The service plan 1702 may be used specify a service build to a sequence of build milestones that the service progresses through during its build. Each milestone may represent an interaction that occurs between a given service and other services (e.g., publishing a capability that unblocks other services from building, and/or consuming a new capability published by another service). These build milestones may be used to understand a high-level picture of how that service builds and the inter-service coordination required for that service without having to understand all the services' flocks and their service-internal coordination.

Build milestones 1706-1712 may individually be associated with a set of external capabilities on which transitioning to the build milestone depends. These capabilities may include the expected published capabilities that are relevant for external services (e.g., service(s) 1714, including the other services of the region build). As a non-limiting example, build milestone 1706 may depend on capabilities/skill set 1716 (including one or more capabilities and/or skills) as defined in a corresponding execution unit transition specifying a transition to build milestone 1706. Build milestones 1706-1712 may be associated with the publication of capabilities and/or skills that are required to start/continue the installation of another service. By way of example build milestone 1708 may be associated with capabilities/skills set 1718, including one or more capabilities and/or skills that are expected to be published prior to transitioning to build milestone 1708. In some embodiments, capabilities/skills set 1718 may be published upon transitioning to build milestone 1708. In some embodiments, build milestones may be used to generate a high-level sequencing diagram that may be used to identify progress in a region build.

Each build milestone may be associated with a corresponding execution unit. By way of example, build milestone 1706 may be associated with execution unit 1720 (corresponding to an instance of execution unit entity 1200 or 1300 of FIGS. 12 and 13). Each execution unit, including execution unit 1720, may include any suitable number of releases such as release 1722, and an order by which these releases are to be executed. In some embodiments, release 1722 may correspond to an ET checkpoint associated with executing the release 1722 at a single execution target. In some embodiments, each release may be expressed within the execution unit as an execution target checkpoint transition as depicted in FIG. 12. The corresponding execution target checkpoint transition may indicate external and/or internal capabilities dependencies for the transition/release and may provide a mapping to a corresponding flock config identified in the service manifest 1704. By way of example, release 1722 may be ultimately mapped to a particular flock config using the service manifest item 1724. The service manifest item 1724 may be identified by an identifier provided in the execution target checkpoint referenced by the execution unit 1720 and corresponding to the release 1722.

Using the entities of the service plan, one or more acyclic graphs may be generated. As a non-limited example, a directed acyclic graph defining the service build may be generated. This DAG may be referred to as a "service DAG" and may include any suitable number of nodes representing a corresponding release and an order by which those releases are to be executed to build that service. The nodes themselves, or edges between nodes, may be associated with external and/or internal capability dependencies. In some embodiments, a graph, list, sequence diagram, or any suitable data structure may be generated for a service and/or for any suitable number of services of the region build using the build milestones corresponding to the service(s). This data structure may be referred to as a "milestone plan." As yet another example, the Build Dependency Graph 338 and 638 of FIGS. 3 and 6 may be generated using the service plan (e.g., as part of a SPAM set including service plans and manifests corresponding to one or more services). As described above in FIGS. 3 and 6, the Build Dependency Graph 338 and 638 may be used (e.g., by the Orchestrator 310 of FIG. 3, by Region Orchestrator 610 of FIG. 6) to drive region build operations (e.g., to execute a deterministic order of infrastructure and application releases for the region/data center).

In some embodiments, the service manifest 1704 may be utilized to specify the flock versions and artifact versions that will be used to create releases for the execution targets specified in the service plan 1702. The service manifest 1704 may be used to validate the service plan 1702 based at least in part on identifying that each release identified in the service plan 1702 is included within the service manifest 1704. In some embodiments, each service manifest item (e.g., service manifest item 1724) may be mapped to a version set item such that service manifests may be used to validate a version set used by CIOS 102 and/or CIOS 402 to perform a region build. As a non-limiting example, a SPAM set may be constructed all SPAMs corresponding to services that are to be bootstrapped within a region/data center. The manifests of the SPAM set may be used to validate a version set, should one be used, to ensure that all flock config files and artifacts referenced in the SPAM set are included in the version set to be used to build the region.

Orchestration tasks related to performing a data center (region) build, utilizing the service plans and/or data structures/models discussed herein, tracking capabilities and/or skills during a build, maintaining compatibility between capabilities and skills, and the like, are discussed in more detail U.S. Non-provisional application Ser. No. 18/661,401, filed May 10, 2024, entitled "Managing Data Center Orchestration using Service Plans and Manifests," and U.S. Non-provisional application Ser. No. 18/667,875, filed May 17, 2024, entitled "Techniques for Region Build Orchestration," the disclosures of which are incorporated by reference in their entirety for all purposes.

Techniques for Generating Service Plans

While the entities described in connection with FIGS. 11-15 may be defined manually to implement a service plan from which a directed acyclic graph (DAG) (e.g., Build Dependency Graph 338 of FIG. 3, Build Dependency Graph 638 of FIG. 6) may be derived, the opposite may also be true. Starting with a DAG, one or more execution units and/or build milestones may be derived for any suitable number of services. FIGS. 18-22 describe these aspects in more detail.

Figure 18:
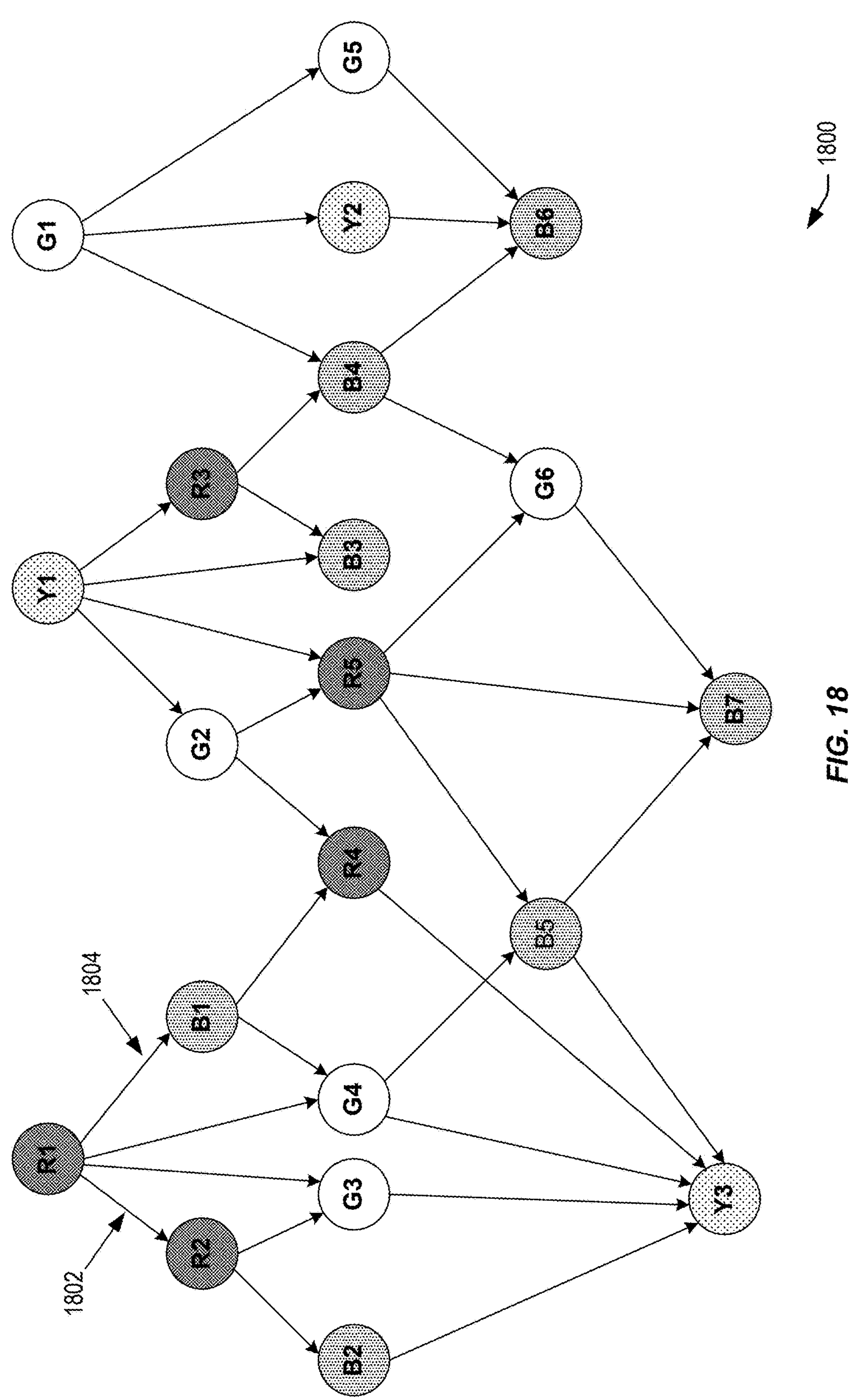
FIG. 18 is a block diagram depicting a directed acyclic graph, in accordance with at least one embodiment.

FIG. 18 is a block diagram depicting a directed acyclic graph (DAG) 1800, in accordance with at least one embodiment. DAG 1800 may be an example of the Build Dependency Graph 338 and/or 638 of FIGS. 3 and 6, respectively.

Each node (e.g., nodes R1-R5, B1-B7, G1-G6, and Y1-Y3, collectively referred to as "the release nodes of DAG 1800") may each correspond to a single release associated with a respective service. Each of the nodes R1-R5 may correspond to Service R, nodes B1-B7 may correspond to service B, nodes G1-G6 may correspond to Service G, and nodes Y1-Y3 may correspond to Service Y. Although four services are used in this example, it should be appreciated that any suitable number of services may be represented in the DAG 1800, each service having any suitable number of associated nodes that individually correspond to a release associated with bootstrapping that service (e.g., provisioning resources and/or deploying software/artifacts to those resources). Each node of DAG 1800 may be associated with a set of dependencies which need to be published prior to executing the release and a set of capabilities and/or skills that are expected to be published/produced upon completing the release.

Each edge of DAG 1800 may represent a one-way dependency. By way of example, edge 1802 is intended to represent a dependency of release R2 of Service R (represented by node R2) on one or more capabilities and/or skills of release R1 (represented by node R1, the parent node of node R2). Edges between nodes that are associated with a common service are intended to represent intra-service dependencies, while edges between nodes that are associated with different services represent inter-service dependencies. By way of example, edge 1802 may represent an intra-service dependency of service R and edge 1804 may represent an inter-service dependency between service R and service B. Each edge may be associated with the capabilities and/or skills that are published/produced by the preceding node.

In some embodiments, DAG 1800 may be manually defined (e.g., via one or more user interfaces managed by Puffin Central 118 of FIG. 1, Puffin Central 418 of FIG. 4, or the like). As another example, DAG 1800 may represent a Build Dependency Graph of a previously executed region build. In some embodiments, the nodes and dependencies of DAG 1800 may conform to a set of flock config entities (e.g., flock config entity 1300 and 1400 of FIGS. 13 and 14, respectively) and any suitable internal dependencies, external dependencies, or inter-service dependencies on one or more capabilities, skills, and/or build flags defined within those entities.

Figure 19:
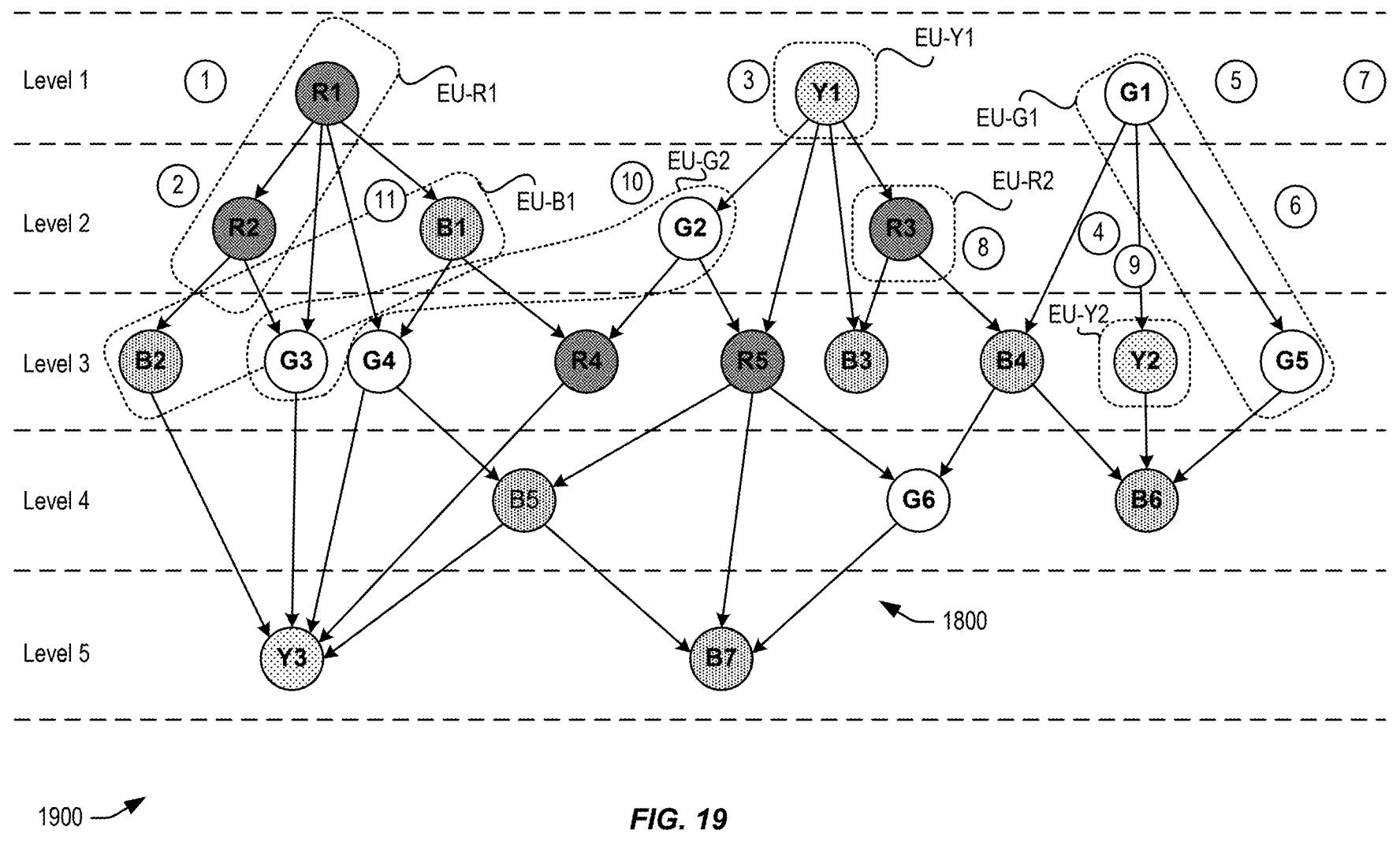

FIG. 19 is a block diagram depicting a method 1900 for deriving one or more build milestones (e.g., build milestones 1100A, build milestones 1100B, etc.) and one or more execution units (e.g., execution unit(s) 1202 and/or 1204 of FIG. 12, execution unit(s) 1302 and/or 1304 of FIG. 13, etc.) using the directed acyclic graph of FIG. 18, in accordance with at least one embodiment.

The DAG 1800 may initially include any suitable number of levels. Nodes positioned at level 1 of DAG 1800 may include a first release associated with a service. By way of example, node R1 represents a first release to be executed to bootstrap service R, node Y1 represents a first release to be executed to bootstrap service Y, node G1 represents a first release to be executed to bootstrap service G. Each of the nodes R1, Y1, and G1 may be associated with no dependencies on any other service. Level 1 includes no nodes for service B since the release represented by node B1 (e.g., the first release to be executed to bootstrap service B) has a dependency on the release represented by R1. In some embodiments, each node may be associated with any suitable metadata corresponding to a release (e.g., a name attribute/value, a flock config name, a release identifier, one or more external capability dependencies, one or more internal capability dependencies, one or more external skill dependencies, one or more internal skill dependencies, one or more build flags, one or more build flag dependencies, an ET checkpoint, an execution target name, an execution target phase, a project, a Git commit hash, or any suitable data depicted in FIGS. 14 and/or 15). In some embodiments, each edge may represent the any suitable combination of one or more external capability dependencies, one or more internal capability dependencies, one or more external skill dependencies, one or more internal skill dependencies, one or more build flag dependencies, etc.

In some embodiments, the method 1900 may be executed by any suitable number of processes. By way of example, a respective process for each service may be utilized to perform method 1900. In some embodiments, a single process may perform the operations of method 1900 that are associated with one service, or a single process may perform the operations of method 1900 with respect to multiple services. For illustrative purposes only, each of the services R, Y, G, and B, may be individually associated with a respective computing process (e.g., a computing process initiated from any suitable computing component, such as any suitable component of CIOS 102 or CIOS 402 of FIGS. 1 and 4, respectively. These processes may be referred to as "process R, "process Y," "process G," and "process B," each being associated with a corresponding service (e.g., service R, service Y, service G, and service B, respectively). In some embodiments, any suitable combination of the processes may execute serially or concurrently.

At step 1, process R may begin at level 1 of DAG 1800 to identify one or more nodes corresponding to service R. In some embodiments, process R may identify node R1. In some embodiments, if service R had two or more releases that could be performed in parallel and which individually had not internal/external/build flag dependencies, the process R may identify multiple nodes associated with service R at level 1.

At step 2, process R may identify any suitable nodes that are associated with service R which are children of node R1 (indicating that a release represented by the child node has an internal dependency on the release represented by R1). In the example depicted in FIG. 19, process R may identify node R2. Upon determining that there are no other nodes that are associated with service R and that are children of node R1, process R may group/associate nodes R1 and R2, and any suitable metadata corresponding to nodes R1 and R2, with a new node (e.g., node EU-R1) that represents the grouping. In some embodiments, R1 and R2 may be grouped such that EU-R1 maintains an order identified based on intra-dependencies between the two. For example, EU-R1 may be associated with data that indicates R2 is dependent on R1. An execution unit may be associated with a subset (e.g., some, all) of capabilities and/or skills that are published by the releases of the execution unit. An execution unit may be associated with a subset (e.g., some, all) of the dependencies of each of the releases associated with that execution unit. EU-R1 may be associated with a superset of capabilities and/or skills that are published by R1 and R2 and the dependencies of R1. Node EU-R1 may be associated with the node with the highest level of the group, in this case, level 1 corresponding to node R1 of DAG 1800. Node EU-R1 may correspond to node EU-R1 depicted in FIG. 20. Process R may then be paused.

At step 3, process Y may begin at level 1 of DAG 1800 to identify one or more nodes corresponding to service Y. In some embodiments, process Y may identify node Y1. In some embodiments, if service Y had two or more releases that could be performed in parallel and which individually had not internal/external/build flag dependencies, the process Y may identify multiple nodes associated with service Y at level 1.

At step 4, process Y may identify any suitable nodes that are associated with service Y which are children of node Y1 (indicating that a release represented by the child node has an internal dependency on the release represented by Y1). In the example depicted in FIG. 19, process Y may identify that there are no children of Y1 which are associated with service Y. Based at least in part on this determination, Y1 and its corresponding metadata may be associated with a new node, node EU-Y1, and process Y may be paused.

At step 5, process G may begin at level 1 of DAG 1800 to identify one or more nodes corresponding to service G. In some embodiments, process G may identify node G1. In some embodiments, if service G had two or more releases that could be performed in parallel and which individually had not internal/external/build flag dependencies, the process G may identify multiple nodes associated with service G at level 1.

At step 6, process G may identify any suitable nodes that are associated with service G which are children of node G1 (indicating that a release represented by the child node has an internal dependency on the release represented by G1). In the example depicted in FIG. 19, process G may identify node G5. In some embodiments, DAG 1800 may depict node G5 initially at level 2. Upon determining that there are no other nodes that are associated with service G and that are children of node G1, process G may group/associate nodes G1 and G5, and any suitable metadata corresponding to nodes G1 and G5, with a new node, node EU-G1, which represents the grouping. In some embodiments, G1 and G5 may be grouped such that EU-G1 maintains an order identified based on intra-dependencies between the two. For example, EU-G1 may be associated with data that indicates G5 is dependent on G1. In the example depicted, EU-G1 may be associated with a superset of capabilities and/or skills that are published by G1 and G5 and the dependencies of G1. Node EU-G1 may be associated with the node with the highest level of the group, in this case, level 1 corresponding to node G1 of DAG 1800. Node EU-G1 may correspond to node EU-G1 depicted in FIG. 20.

At step 7, process B may begin at level 1 of DAG 1800 to identify one or more nodes corresponding to service B. Finding no nodes associated with service B at level, process B may be paused.

The operations corresponding to steps 1-7 may be performed any suitable number of times until there are no more nodes left to evaluate in DAG 1800. Each process may be executed to identify nodes of a given level.

By way of example, at step 8, process R may resume to identify any suitable nodes associated with service R which are currently in level 2. Finding only node R3 on level 2, process R may associate node R3 and its metadata with a new node, node EU-R2 and process R may pause.

At step 9, process Y may resume to identify any suitable nodes associated with service Y which are currently in level 2. Finding only node Y2 on level 2, process Y may associate node Y2 and its metadata with a new node, node EU-Y2 and process Y may pause.

At step 10, process G may resume to identify any suitable nodes associated with service G which are currently in level 2. Finding nodes G3 and G2 at level 2, each of which depending only from one higher node (e.g., node EU-R1, and node EU-Y1, respectively), process G may associate nodes G2 and G3 and their corresponding metadata with a new node, node EU-G2, and process G may pause. An execution unit may be associated with a superset of capabilities and/or skills that are published by the releases of the execution unit. The execution unit may be associated with a subset (e.g., some, all) of the dependencies of each of the releases associated with that execution unit. In the example depicted, EU-G2 may be associated with a superset of capabilities and/or skills that are published by G2 and G3 and the dependencies of EU-G2 may be associated with the superset of the dependencies of G2 and G3.

At step 11, process B may resume to identify any suitable nodes associated with service B which are currently in level 2. Finding nodes B1 and B2 at level 2, each of which depending only from one higher level node (e.g., node EU-R1), process B may associate nodes B2 and B1 and their corresponding metadata with a new node, node EU-B1, and process B may pause.

Each process R, Y, G, and B may be executed at each level of DAG 1800 performing similar operations as discussed above in connection with steps 1-11 to group any nodes associated with the same service and of the same level/topological generation in a new node generated to represent the grouping. Any node generated to represent a grouping of the original nodes of DAG 1800 may be referred to as an execution unit node.

The method 1900 may be expressed by the following algorithm:

Let Topological Generation aka depth of a node $n_i$ be denoted by a function $d(n_i)$; For all i: $d(n_i)=\text{Max}\ \{d(n_j)$ for all j where $n_j$ is a parent of $n_i\}+1$;

In some embodiments, the clustering algorithm may cluster nodes based at least in part on the following criteria:

1. Each cluster will be assigned a topological generation (aka depth).
2. For each service, there may exist at most 1 cluster at a particular depth.
3. A cluster will contain only nodes belonging to the same service.

Let the Cluster Topological Generation aka cluster depth of a node $n_{i,k}$, belonging to a service $S_k$, denoted by a function $cd(n_{i,k})$;

For all nodes $n_{i,k}$ for all the services $S_k$ in the graph:

$cd(n_{i,k})=\text{Max}\ \{\text{Max}\ \{cd(n_{j,p})$ for all p NOT equal to k, and for all j where $n_{j,p}$ is a parent of $n_{i,k}\}+1$, Max $\{cd(n_{j,k})$ for all j where $n_{j,k}$ is a parent of $n_{i,k}\}\}$ The above formula can be solved recursively and may be bound to terminate for a directed acyclic graph.

Figure 20:
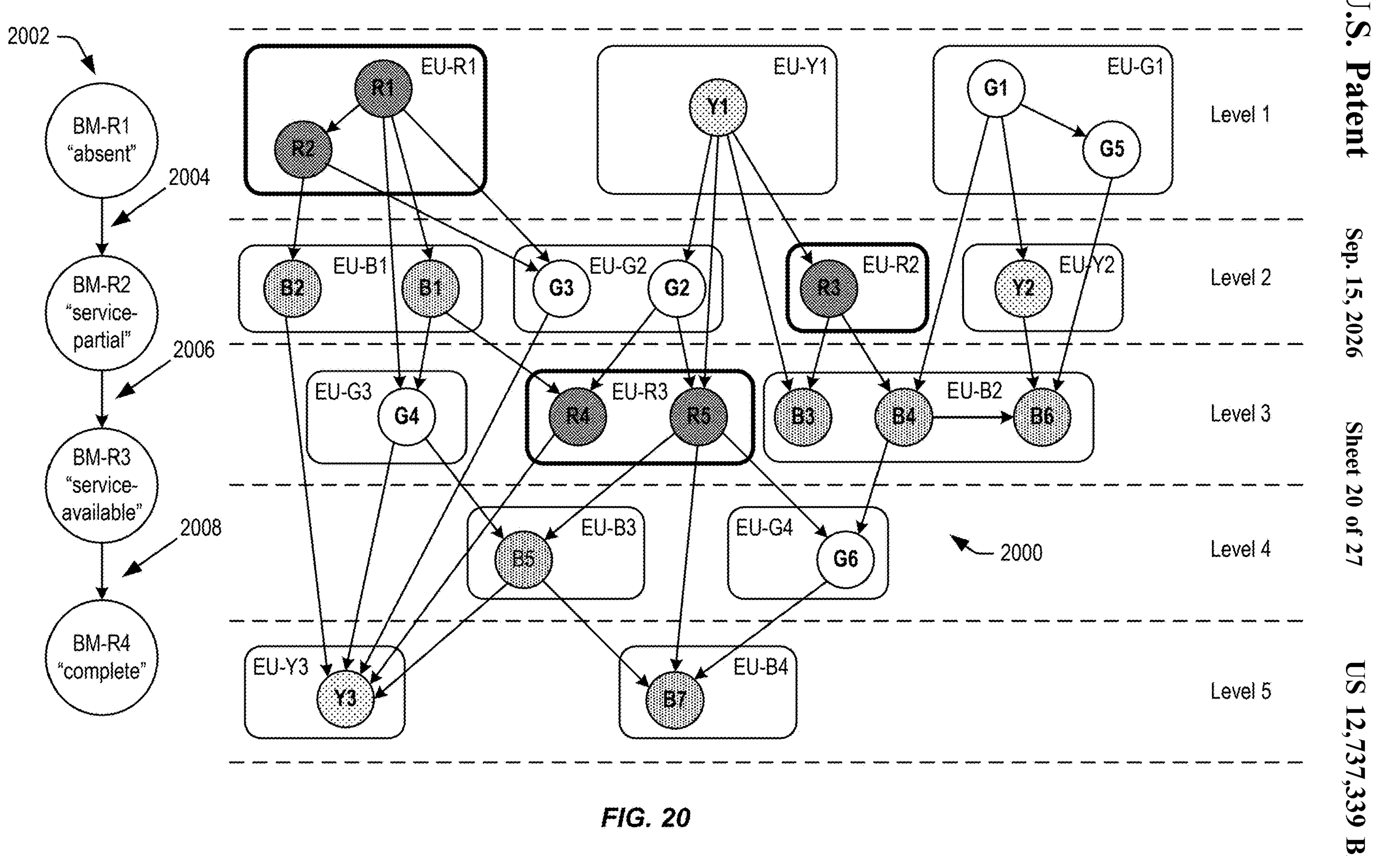
FIG. 20 is a block diagram depicting a resulting set of build milestones and execution units derived from the directed acyclic graph of FIG. 18 using the method of FIG. 19, in accordance with at least one embodiment.

FIG. 20 is a block diagram depicting an example DAG 2000 resulting from performing the method 1900, according to at least one embodiment. In some embodiments, DAG 2000 may be used to derive a set of build milestones and execution units for each service. Each execution unit node of DAG 2000 (e.g., EU-R1, EU-R2, EU-R3, EU-Y1, EU-Y2, EU-Y3, EU-G1, EU-G2, EU-G3, EU-G4, EU-B1, EU-B2, EU-B3, EU-B4 collectively referred to as "the EU nodes of DAG 20") may represent a single release or a grouping of releases such as the releases represented by release nodes of DAG 1800.

From the EU nodes of DAG 2000, a number of separate DAGs (e.g., DAG 2002) may be derived. Similar to the execution of the operations discussed in connection with FIG. 19, the operations described in connection with FIG. 20 for generating DAG 2002 may be performed for each service having one or more nodes represented in DAG 2000. If N represents a number of EU nodes corresponding to a single service, N+1 build milestones may be generated.

For example, DAG 2002 may be generated for service R. DAG 2002 may include four nodes based at least in part on determining that there are three EU nodes of DAG 2000. Each node in DAG 2002 may represent a build milestone. Each node of DAG 2002 may be referred to as "a build milestone node". A first build milestone node of DAG 2002 may be associated with an identifier "BM-R1," "absent," "1", "0" or any suitable identifier(s) representing a first build milestone associated with service R. A second build milestone node of DAG 2002 may be associated with an identifier "BM-R2," "service-partial," "2", "1" or any suitable identifier representing a second build milestone associated with service R. A third build milestone node node of DAG 2002 may be associated with an identifier "BM-R3," "service-available," "3", "2" or any suitable identifier representing a third build milestone associated with service R. A fourth build milestone node of DAG 2002 may be associated with an identifier "complete," "4", "3" or any suitable identifier representing a fourth build milestone associated with a service. In some embodiments, the fourth/last build milestone node may be associated with an identifier "complete." Edges may connect each pair of sequential build milestones. In some embodiments, build milestones may be similarly represented using a series of objects, a list, or the like. For example, edge 2004 may connect node BM-R1 and node BM-R2. Each build milestone node of DAG 2002 may be associated with any suitable additional metadata such as a description. The identifiers and/or other metadata for each node of DAG 2002 may be assigned according to a predefined scheme, protocol, or user input.

Each execution unit node of DAG 2000 may be associated with an edge of DAG 2002. By way of example, traversing DAG 2000 from level 1, a first execution unit node corresponding to service R (execution node EU-R1 of level 1) may be identified and any suitable metadata associated with the first execution unit node may be associated with edge 2004. Continuing to the next level (e.g., level 2), a second execution unit node corresponding to service R (e.g., execution node EU-R2 of level 2) may be identified and any suitable metadata associated with the second execution unit node may be associated with edge 2006. Continuing to the next level (e.g., level 3), a third execution unit node corresponding to service R (e.g., execution node EU-R3 of level 3) may be identified and any suitable metadata associated with the first execution unit node may be associated with edge 2008. Each build milestone node and/or an execution unit corresponding to an immediately proceeding edge may be associated with a superset of capabilities and/or skills that are published by the releases of the execution unit (e.g., identifying the capability publications of the execution unit as depicted in FIG. 12). If the build milestone node has a preceeding edge, the build milestone and/or the execution unit corresponding to preceeding edge may be associated with a superset of the capabilities and/or skills. Each build milestone node and/or an execution unit corresponding to an immediately proceeding edge) may be associated with a superset of capabilities and/or skills that are published by the releases of the execution unit corresponding to an immediately preceding edge (e.g., identifying the capability publications of the execution unit as depicted in FIG. 12) . . . . In some embodiments, dependencies associated with each build milestone that are associated with releases of the same service (e.g., service R) may be considered intra-service dependencies. Dependencies associated with each build milestone that are associated with a different service may be considered inter-service dependencies.

Moving downward in DAG 2002 to BM-R2, BM-R2 may be associated with a superset of the capabilities and/or skills (functionalities) that are expected to be published/installed upon completing releases corresponding to the execution unit associated with the preceding edge (e.g., edge 2004).

Moving downward to level 2 of DAG 2000, another execution node (e.g. execution node EU-R2) corresponding to service R may be identified. Any dependencies of the release (e.g., R3) on one or more capabilities and/or skills (e.g., capabilities and/or skills published by executing release Y1) may likewise be associated with BM-R2.

Moving downward in DAG 2002, edge 2006 may be associated with any suitable number of releases corresponding to the execution unit node EU-R2. By way of example, edge 2006 may be associated with a release corresponding to release node R3 (e.g., release node R3 of DAG 1800 of FIG. 18) and any suitable metadata corresponding to that release/node, based at least in part on the association of release node R3 and execution unit node EU-R2.

Moving downward in DAG 2002 to BM-R3, BM-R3 may be associated with a superset of the capabilities and/or skills that are expected to be published/installed upon completing release R3 corresponding to the execution unit associated with the preceding edge (e.g., edge 2006).

Moving downward to level 3 of DAG 2000, another execution node (e.g. execution node EU-R3) corresponding to service R may be identified. Any dependencies of the releases of EU-R3 on one or more capabilities and/or skills (e.g., capabilities and/or skills published by executing releases B1, G2, and Y1) may likewise be associated with BM-R3.

Moving downward in DAG 2002, edge 2008 may be associated with any suitable number of releases corresponding to the execution unit node EU-R3. By way of example, edge 2008 may be associated with a release corresponding to release nodes R4 and R5 (e.g., release nodes R4 and R5 of DAG 1800 of FIG. 18) and any suitable metadata corresponding to those releases/nodes, based at least in part on the association of release nodes R4 and R5 and execution unit node EU-R3.

Moving downward in DAG 2002 to BM-R4, BM-R4 may be associated with a superset of the capabilities and/or skills that are expected to be published/installed upon completing releases R4 and R5 corresponding to the execution unit associated with the preceding edge (e.g., edge 2008).

The DAG 2002 (and any DAG generated for a given service) may be utilized to derive the build milestone entities of FIG. 11 and/or the execution unit entities of FIGS. 12 and 13 corresponding to a single service (e.g., service R). By way of example, code segment 1102 and/or 1110 may be generated from the metadata associated with build milestone node BM-R1. Code segment 1104 and/or 1112 may be generated from the metadata associated with build milestone node BM-R2. Code segment 1106 and/or 1114 may be generated from the metadata associated with build milestone node BM-R3. Code segment 1108 and/or 1116 may be generated from the metadata associated with build milestone node BM-R4. Code segments 1202 and/or 1302 may be generated from the metadata associated with edge 2004. Code segments 1204 and/or 1304 may be generated from the metadata associated with edge 2006. Similar code segments (e.g., execution units) may be generated from edge 2008.

Figure 21:
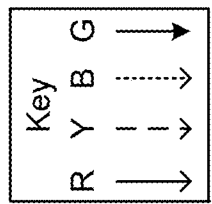
FIG. 21 is a block diagram depicting a number of service plans and service dependencies, in accordance with at least one embodiment.

FIG. 21 is a block diagram 2100 depicting a number of service plans and service dependencies, in accordance with at least one embodiment. Block diagram 2100 depicts the service plans generated for services R, Y, G, and B based at least in part on the operations discussed above in connection with FIGS. 18-20. Each of the service plans includes a corresponding set of build milestones and execution units derived in the manner described above in connection with FIGS. 18-20. Indicators 2102, 2104, and 2106 depict capability and/or skill publications/productions of service A. Dependencies 2108 and 2110 depict inter-service dependencies of service A. Intra-service and inter-service dependencies are similarly depicted for the service plans of Services B, C, and D, where the higher positioned group of dependencies between execution units represents FIG. 22 is a flow diagram depicting an example method 2200 for deriving one or more build milestones and/or one or more execution units from a directed acyclic graph. The operations of method 2200 may be performed in any suitable order by any suitable combination of the components of CIOS 102 and/or CIOS 402 of FIGS. 1 and 4, respectively, or a separate device, system, or process.

The method 2200 may begin at 2202, where a first directed acyclic graph (e.g., DAG 1800 of FIG. 18, Build Dependency Graph 338 of FIG. 3) may be obtained. The first directed acyclic graph may comprise a first plurality of nodes (e.g., the release nodes of DAG 1800) corresponding to a plurality of levels of the first directed acyclic graph. In some embodiments, the first directed acyclic graph comprises a first plurality of edges, each node of the first plurality of nodes representing a release of a plurality of releases associated with bootstrapping a plurality of services of a data center, and each edge of the first plurality of edges representing a dependency between two releases.

At 2204, a second directed acyclic graph (e.g., DAG 2000 of FIG. 20) may be generated based at least in part on executing a clustering process (e.g., the method 1900 of FIG. 19) on the first plurality of nodes of the first directed acyclic graph. In some embodiments, the first plurality of nodes of the first directed acyclic graph may be clustered based at least in part on a respective level and a respective service associated with each of the first plurality of nodes.

At 2206, a third directed acyclic graph (e.g., DAG 2002 of FIG. 20) specific to a service of the plurality of services may be generated, the third directed acyclic graph being generated based at least in part on identifying nodes of the second directed acyclic graph that correspond to a single service of the plurality of services.

At 2208, a service plan for bootstrapping the service within the data center (e.g., service plan for service A of FIG. 21, an example of the service build definition 1000 of FIG. 10) may be generated. In some embodiments, the service plan may be generated based at least in part on the third directed acyclic graph (e.g., DAG 2002 of FIG. 20) according to the operations discussed in connection with FIG. 20.

Example Cloud Service Infrastructure Architecture

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 23 is a block diagram 2300 illustrating an example pattern of an IaaS architecture, according to at least one embodiment. Service operators 2302 can be communicatively coupled to a secure host tenancy 2304 that can include a virtual cloud network (VCN) 2306 and a secure host subnet 2308. In some examples, the service operators 2302 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 2306 and/or the Internet.

The VCN 2306 can include a local peering gateway (LPG) 2310 that can be communicatively coupled to a secure shell (SSH) VCN 2312 via an LPG 2310 contained in the SSH VCN 2312. The SSH VCN 2312 can include an SSH subnet 2314, and the SSH VCN 2312 can be communicatively coupled to a control plane VCN 2316 via the LPG 2310 contained in the control plane VCN 2316. Also, the SSH VCN 2312 can be communicatively coupled to a data plane VCN 2318 via an LPG 2310. The control plane VCN 2316 and the data plane VCN 2318 can be contained in a service tenancy 2319 that can be owned and/or operated by the IaaS provider.

The control plane VCN 2316 can include a control plane demilitarized zone (DMZ) tier 2320 that acts as a perimeter network (e.g., portions of a corporate network between the corporate intranet and external networks). The DMZ-based servers may have restricted responsibilities and help keep breaches contained. Additionally, the DMZ tier 2320 can include one or more load balancer (LB) subnet(s) 2322, a control plane app tier 2324 that can include app subnet(s) 2326, a control plane data tier 2328 that can include database (DB) subnet(s) 2330 (e.g., frontend DB subnet(s) and/or backend DB subnet(s)). The LB subnet(s) 2322 contained in the control plane DMZ tier 2320 can be communicatively coupled to the app subnet(s) 2326 contained in the control plane app tier 2324 and an Internet gateway 2334 that can be contained in the control plane VCN 2316, and the app subnet(s) 2326 can be communicatively coupled to the DB subnet(s) 2330 contained in the control plane data tier 2328 and a service gateway 2336 and a network address translation (NAT) gateway 2338. The control plane VCN 2316 can include the service gateway 2336 and the NAT gateway 2338.

The control plane VCN 2316 can include a data plane mirror app tier 2340 that can include app subnet(s) 2326. The app subnet(s) 2326 contained in the data plane mirror app tier 2340 can include a virtual network interface controller (VNIC) 2342 that can execute a compute instance 2344. The compute instance 2344 can communicatively couple the app subnet(s) 2326 of the data plane mirror app tier 2340 to app subnet(s) 2326 that can be contained in a data plane app tier 2346.

The data plane VCN 2318 can include the data plane app tier 2346, a data plane DMZ tier 2348, and a data plane data tier 2350. The data plane DMZ tier 2348 can include LB subnet(s) 2322 that can be communicatively coupled to the app subnet(s) 2326 of the data plane app tier 2346 and the Internet gateway 2334 of the data plane VCN 2318. The app subnet(s) 2326 can be communicatively coupled to the service gateway 2336 of the data plane VCN 2318 and the NAT gateway 2338 of the data plane VCN 2318. The data plane data tier 2350 can also include the DB subnet(s) 2330 that can be communicatively coupled to the app subnet(s) 2326 of the data plane app tier 2346.

The Internet gateway 2334 of the control plane VCN 2316 and of the data plane VCN 2318 can be communicatively coupled to a metadata management service 2352 that can be communicatively coupled to public Internet 2354. Public Internet 2354 can be communicatively coupled to the NAT gateway 2338 of the control plane VCN 2316 and of the data plane VCN 2318. The service gateway 2336 of the control plane VCN 2316 and of the data plane VCN 2318 can be communicatively coupled to cloud services 2356.

In some examples, the service gateway 2336 of the control plane VCN 2316 or of the data plane VCN 2318 can make application programming interface (API) calls to cloud services 2356 without going through public Internet 2354. The API calls to cloud services 2356 from the service gateway 2336 can be one-way: the service gateway 2336 can make API calls to cloud services 2356, and cloud services 2356 can send requested data to the service gateway 2336. But, cloud services 2356 may not initiate API calls to the service gateway 2336.

In some examples, the secure host tenancy 2304 can be directly connected to the service tenancy 2319, which may be otherwise isolated. The secure host subnet 2308 can communicate with the SSH subnet 2314 through an LPG 2310 that may enable two-way communication over an otherwise isolated system. Connecting the secure host subnet 2308 to the SSH subnet 2314 may give the secure host subnet 2308 access to other entities within the service tenancy 2319.

The control plane VCN 2316 may allow users of the service tenancy 2319 to set up or otherwise provision desired resources. Desired resources provisioned in the control plane VCN 2316 may be deployed or otherwise used in the data plane VCN 2318. In some examples, the control plane VCN 2316 can be isolated from the data plane VCN 2318, and the data plane mirror app tier 2340 of the control plane VCN 2316 can communicate with the data plane app tier 2346 of the data plane VCN 2318 via VNICs 2342 that can be contained in the data plane mirror app tier 2340 and the data plane app tier 2346.

In some examples, users of the system, or customers, can make requests, for example create, read, update, or delete (CRUD) operations, through public Internet 2354 that can communicate the requests to the metadata management service 2352. The metadata management service 2352 can communicate the request to the control plane VCN 2316 through the Internet gateway 2334. The request can be received by the LB subnet(s) 2322 contained in the control plane DMZ tier 2320. The LB subnet(s) 2322 may determine that the request is valid, and in response to this determination, the LB subnet(s) 2322 can transmit the request to app subnet(s) 2326 contained in the control plane app tier 2324. If the request is validated and requires a call to public Internet 2354, the call to public Internet 2354 may be transmitted to the NAT gateway 2338 that can make the call to public Internet 2354. Metadata that may be desired to be stored by the request can be stored in the DB subnet(s) 2330.

In some examples, the data plane mirror app tier 2340 can facilitate direct communication between the control plane VCN 2316 and the data plane VCN 2318. For example, changes, updates, or other suitable modifications to configuration may be desired to be applied to the resources contained in the data plane VCN 2318. Via a VNIC 2342, the control plane VCN 2316 can directly communicate with, and can thereby execute the changes, updates, or other suitable modifications to configuration to, resources contained in the data plane VCN 2318.

In some embodiments, the control plane VCN 2316 and the data plane VCN 2318 can be contained in the service tenancy 2319. In this case, the user, or the customer, of the system may not own or operate either the control plane VCN 2316 or the data plane VCN 2318. Instead, the IaaS provider may own or operate the control plane VCN 2316 and the data plane VCN 2318, both of which may be contained in the service tenancy 2319. This embodiment can enable isolation of networks that may prevent users or customers from interacting with other users', or other customers', resources. Also, this embodiment may allow users or customers of the system to store databases privately without needing to rely on public Internet 2354, which may not have a desired level of threat prevention, for storage.

In other embodiments, the LB subnet(s) 2322 contained in the control plane VCN 2316 can be configured to receive a signal from the service gateway 2336. In this embodiment, the control plane VCN 2316 and the data plane VCN 2318 may be configured to be called by a customer of the IaaS provider without calling public Internet 2354. Customers of the IaaS provider may desire this embodiment since database(s) that the customers use may be controlled by the IaaS provider and may be stored on the service tenancy 2319, which may be isolated from public Internet 2354.

Figure 24:
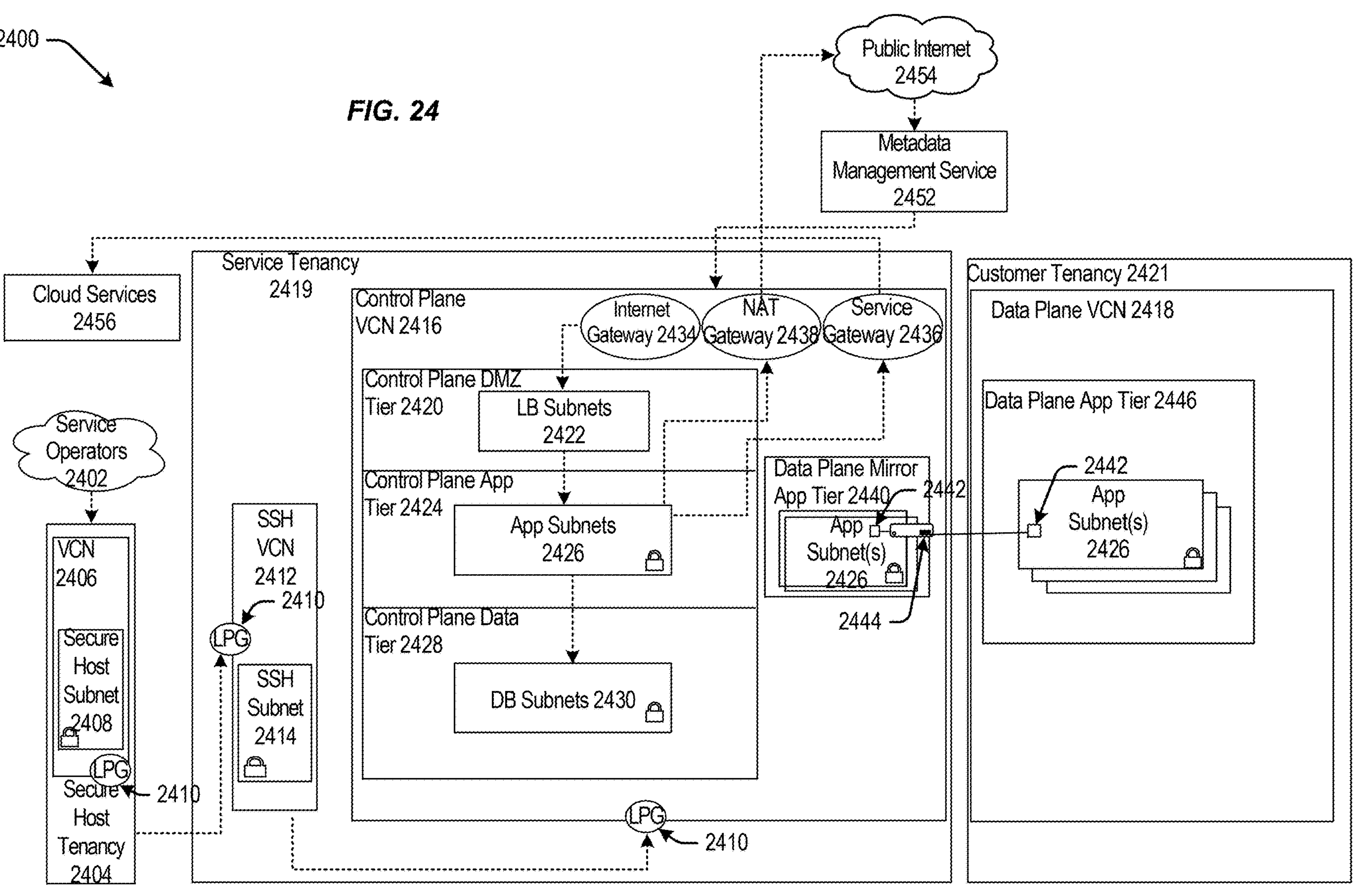
FIG. 24 is a block diagram illustrating another pattern for implementing a cloud infrastructure as a service system, according to at least one embodiment.

FIG. 24 is a block diagram 2400 illustrating another example pattern of an IaaS architecture, according to at least one embodiment. Service operators 2402 (e.g., service operators 2302 of FIG. 23) can be communicatively coupled to a secure host tenancy 2404 (e.g., the secure host tenancy 2304 of FIG. 23) that can include a virtual cloud network (VCN) 2406 (e.g., the VCN 2306 of FIG. 23) and a secure host subnet 2408 (e.g., the secure host subnet 2308 of FIG. 23). The VCN 2406 can include a local peering gateway (LPG) 2410 (e.g., the LPG 2310 of FIG. 23) that can be communicatively coupled to a secure shell (SSH) VCN 2412 (e.g., the SSH VCN 2312 of FIG. 23) via an LPG 2310 contained in the SSH VCN 2412. The SSH VCN 2412 can include an SSH subnet 2414 (e.g., the SSH subnet 2314 of FIG. 23), and the SSH VCN 2412 can be communicatively coupled to a control plane VCN 2416 (e.g., the control plane VCN 2316 of FIG. 23) via an LPG 2410 contained in the control plane VCN 2416. The control plane VCN 2416 can be contained in a service tenancy 2419 (e.g., the service tenancy 2319 of FIG. 23), and the data plane VCN 2418 (e.g., the data plane VCN 2318 of FIG. 23) can be contained in a customer tenancy 2421 that may be owned or operated by users, or customers, of the system.

The control plane VCN 2416 can include a control plane DMZ tier 2420 (e.g., the control plane DMZ tier 2320 of FIG. 23) that can include LB subnet(s) 2422 (e.g., LB subnet(s) 2322 of FIG. 23), a control plane app tier 2424 (e.g., the control plane app tier 2324 of FIG. 23) that can include app subnet(s) 2426 (e.g., app subnet(s) 2326 of FIG. 23), a control plane data tier 2428 (e.g., the control plane data tier 2328 of FIG. 23) that can include database (DB) subnet(s) 2430 (e.g., similar to DB subnet(s) 2330 of FIG. 23). The LB subnet(s) 2422 contained in the control plane DMZ tier 2420 can be communicatively coupled to the app subnet(s) 2426 contained in the control plane app tier 2424 and an Internet gateway 2434 (e.g., the Internet gateway 2334 of FIG. 23) that can be contained in the control plane VCN 2416, and the app subnet(s) 2426 can be communicatively coupled to the DB subnet(s) 2430 contained in the control plane data tier 2428 and a service gateway 2436 (e.g., the service gateway 2336 of FIG. 23) and a network address translation (NAT) gateway 2438 (e.g., the NAT gateway 2338 of FIG. 23). The control plane VCN 2416 can include the service gateway 2436 and the NAT gateway 2438.

The control plane VCN 2416 can include a data plane mirror app tier 2440 (e.g., the data plane mirror app tier 2340 of FIG. 23) that can include app subnet(s) 2426. The app subnet(s) 2426 contained in the data plane mirror app tier 2440 can include a virtual network interface controller (VNIC) 2442 (e.g., the VNIC of 2342) that can execute a compute instance 2444 (e.g., similar to the compute instance 2344 of FIG. 23). The compute instance 2444 can facilitate communication between the app subnet(s) 2426 of the data plane mirror app tier 2440 and the app subnet(s) 2426 that can be contained in a data plane app tier 2446 (e.g., the data plane app tier 2346 of FIG. 23) via the VNIC 2442 contained in the data plane mirror app tier 2440 and the VNIC 2442 contained in the data plane app tier 2446.

The Internet gateway 2434 contained in the control plane VCN 2416 can be communicatively coupled to a metadata management service 2452 (e.g., the metadata management service 2352 of FIG. 23) that can be communicatively coupled to public Internet 2454 (e.g., public Internet 2354 of FIG. 23). Public Internet 2454 can be communicatively coupled to the NAT gateway 2438 contained in the control plane VCN 2416. The service gateway 2436 contained in the control plane VCN 2416 can be communicatively coupled to cloud services 2456 (e.g., cloud services 2356 of FIG. 23).

In some examples, the data plane VCN 2418 can be contained in the customer tenancy 2421. In this case, the IaaS provider may provide the control plane VCN 2416 for each customer, and the IaaS provider may, for each customer, set up a unique compute instance 2444 that is contained in the service tenancy 2419. Each compute instance 2444 may allow communication between the control plane VCN 2416, contained in the service tenancy 2419, and the data plane VCN 2418 that is contained in the customer tenancy 2421. The compute instance 2444 may allow resources, that are provisioned in the control plane VCN 2416 that is contained in the service tenancy 2419, to be deployed or otherwise used in the data plane VCN 2418 that is contained in the customer tenancy 2421.

In other examples, the customer of the IaaS provider may have databases that live in the customer tenancy 2421. In this example, the control plane VCN 2416 can include the data plane mirror app tier 2440 that can include app subnet(s) 2426. The data plane mirror app tier 2440 can reside in the data plane VCN 2418, but the data plane mirror app tier 2440 may not live in the data plane VCN 2418. That is, the data plane mirror app tier 2440 may have access to the customer tenancy 2421, but the data plane mirror app tier 2440 may not exist in the data plane VCN 2418 or be owned or operated by the customer of the IaaS provider. The data plane mirror app tier 2440 may be configured to make calls to the data plane VCN 2418 but may not be configured to make calls to any entity contained in the control plane VCN 2416. The customer may desire to deploy or otherwise use resources in the data plane VCN 2418 that are provisioned in the control plane VCN 2416, and the data plane mirror app tier 2440 can facilitate the desired deployment, or other usage of resources, of the customer.

In some embodiments, the customer of the IaaS provider can apply filters to the data plane VCN 2418. In this embodiment, the customer can determine what the data plane VCN 2418 can access, and the customer may restrict access to public Internet 2454 from the data plane VCN 2418. The IaaS provider may not be able to apply filters or otherwise control access of the data plane VCN 2418 to any outside networks or databases. Applying filters and controls by the customer onto the data plane VCN 2418, contained in the customer tenancy 2421, can help isolate the data plane VCN 2418 from other customers and from public Internet 2454.

In some embodiments, cloud services 2456 can be called by the service gateway 2436 to access services that may not exist on public Internet 2454, on the control plane VCN 2416, or on the data plane VCN 2418. The connection between cloud services 2456 and the control plane VCN 2416 or the data plane VCN 2418 may not be live or continuous. Cloud services 2456 may exist on a different network owned or operated by the IaaS provider. Cloud services 2456 may be configured to receive calls from the service gateway 2436 and may be configured to not receive calls from public Internet 2454. Some cloud services 2456 may be isolated from other cloud services 2456, and the control plane VCN 2416 may be isolated from cloud services 2456 that may not be in the same region as the control plane VCN 2416. For example, the control plane VCN 2416 may be located in "Region 1," and cloud service "Deployment 23," may be located in Region 1 and in "Region 2." If a call to Deployment 23 is made by the service gateway 2436 contained in the control plane VCN 2416 located in Region 1, the call may be transmitted to Deployment 23 in Region 1. In this example, the control plane VCN 2416, or Deployment 23 in Region 1, may not be communicatively coupled to, or otherwise in communication with, Deployment 23 in Region 2.

FIG. 25 is a block diagram 2500 illustrating another example pattern of an IaaS architecture, according to at least one embodiment. Service operators 2502 (e.g., service operators 2302 of FIG. 23) can be communicatively coupled to a secure host tenancy 2504 (e.g., the secure host tenancy 2304 of FIG. 23) that can include a virtual cloud network (VCN) 2506 (e.g., the VCN 2306 of FIG. 23) and a secure host subnet 2508 (e.g., the secure host subnet 2308 of FIG. 23). The VCN 2506 can include an LPG 2510 (e.g., the LPG 2310 of FIG. 23) that can be communicatively coupled to an SSH VCN 2512 (e.g., the SSH VCN 2312 of FIG. 23) via an LPG 2510 contained in the SSH VCN 2512. The SSH VCN 2512 can include an SSH subnet 2514 (e.g., the SSH subnet 2314 of FIG. 23), and the SSH VCN 2512 can be communicatively coupled to a control plane VCN 2516 (e.g., the control plane VCN 2316 of FIG. 23) via an LPG 2510 contained in the control plane VCN 2516 and to a data plane VCN 2518 (e.g., the data plane 2318 of FIG. 23) via an LPG 2510 contained in the data plane VCN 2518. The control plane VCN 2516 and the data plane VCN 2518 can be contained in a service tenancy 2519 (e.g., the service tenancy 2319 of FIG. 23).

The control plane VCN 2516 can include a control plane DMZ tier 2520 (e.g., the control plane DMZ tier 2320 of FIG. 23) that can include load balancer (LB) subnet(s) 2522 (e.g., LB subnet(s) 2322 of FIG. 23), a control plane app tier 2524 (e.g., the control plane app tier 2324 of FIG. 23) that can include app subnet(s) 2526 (e.g., similar to app subnet(s) 2326 of FIG. 23), a control plane data tier 2528 (e.g., the control plane data tier 2328 of FIG. 23) that can include DB subnet(s) 2530. The LB subnet(s) 2522 contained in the control plane DMZ tier 2520 can be communicatively coupled to the app subnet(s) 2526 contained in the control plane app tier 2524 and to an Internet gateway 2534 (e.g., the Internet gateway 2334 of FIG. 23) that can be contained in the control plane VCN 2516, and the app subnet(s) 2526 can be communicatively coupled to the DB subnet(s) 2530 contained in the control plane data tier 2528 and to a service gateway 2536 (e.g., the service gateway of FIG. 23) and a network address translation (NAT) gateway 2538 (e.g., the NAT gateway 2338 of FIG. 23). The control plane VCN 2516 can include the service gateway 2536 and the NAT gateway 2538.

The data plane VCN 2518 can include a data plane app tier 2546 (e.g., the data plane app tier 2346 of FIG. 23), a data plane DMZ tier 2548 (e.g., the data plane DMZ tier 2348 of FIG. 23), and a data plane data tier 2550 (e.g., the data plane data tier 2350 of FIG. 23). The data plane DMZ tier 2548 can include LB subnet(s) 2522 that can be communicatively coupled to trusted app subnet(s) 2560 and untrusted app subnet(s) 2562 of the data plane app tier 2546 and the Internet gateway 2534 contained in the data plane VCN 2518. The trusted app subnet(s) 2560 can be communicatively coupled to the service gateway 2536 contained in the data plane VCN 2518, the NAT gateway 2538 contained in the data plane VCN 2518, and DB subnet(s) 2530 contained in the data plane data tier 2550. The untrusted app subnet(s) 2562 can be communicatively coupled to the service gateway 2536 contained in the data plane VCN 2518 and DB subnet(s) 2530 contained in the data plane data tier 2550. The data plane data tier 2550 can include DB subnet(s) 2530 that can be communicatively coupled to the service gateway 2536 contained in the data plane VCN 2518.

The untrusted app subnet(s) 2562 can include one or more primary VNICs 2564(1)-(N) that can be communicatively coupled to tenant virtual machines (VMs) 2566(1)-(N). Each tenant VM 2566(1)-(N) can be communicatively coupled to a respective app subnet 2567(1)-(N) that can be contained in respective container egress VCNs 2568(1)-(N) that can be contained in respective customer tenancies 2570(1)-(N). Respective secondary VNICs 2572(1)-(N) can facilitate communication between the untrusted app subnet(s) 2562 contained in the data plane VCN 2518 and the app subnet contained in the container egress VCNs 2568(1)-(N). Each container egress VCNs 2568(1)-(N) can include a NAT gateway 2538 that can be communicatively coupled to public Internet 2554 (e.g., public Internet 2354 of FIG. 23).

The Internet gateway 2534 contained in the control plane VCN 2516 and contained in the data plane VCN 2518 can be communicatively coupled to a metadata management service 2552 (e.g., the metadata management system 2352 of FIG. 23) that can be communicatively coupled to public Internet 2554. Public Internet 2554 can be communicatively coupled to the NAT gateway 2538 contained in the control plane VCN 2516 and contained in the data plane VCN 2518. The service gateway 2536 contained in the control plane VCN 2516 and contained in the data plane VCN 2518 can be communicatively coupled to cloud services 2556.

In some embodiments, the data plane VCN 2518 can be integrated with customer tenancies 2570. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 2546. Code to run the function may be executed in the VMs 2566(1)-(N), and the code may not be configured to run anywhere else on the data plane VCN 2518. Each VM 2566(1)-(N) may be connected to one customer tenancy 2570. Respective containers 2571(1)-(N) contained in the VMs 2566(1)-(N) may be configured to run the code. In this case, there can be a dual isolation (e.g., the containers 2571(1)-(N) running code, where the containers 2571(1)-(N) may be contained in at least the VM 2566(1)-(N) that are contained in the untrusted app subnet(s) 2562), which may help prevent incorrect or otherwise undesirable code from damaging the network of the IaaS provider or from damaging a network of a different customer. The containers 2571(1)-(N) may be communicatively coupled to the customer tenancy 2570 and may be configured to transmit or receive data from the customer tenancy 2570. The containers 2571(1)-(N) may not be configured to transmit or receive data from any other entity in the data plane VCN 2518. Upon completion of running the code, the IaaS provider may kill or otherwise dispose of the containers 2571(1)-(N).

In some embodiments, the trusted app subnet(s) 2560 may run code that may be owned or operated by the IaaS provider. In this embodiment, the trusted app subnet(s) 2560 may be communicatively coupled to the DB subnet(s) 2530 and be configured to execute CRUD operations in the DB subnet(s) 2530. The untrusted app subnet(s) 2562 may be communicatively coupled to the DB subnet(s) 2530, but in this embodiment, the untrusted app subnet(s) may be configured to execute read operations in the DB subnet(s) 2530. The containers 2571(1)-(N) that can be contained in the VM 2566(1)-(N) of each customer and that may run code from the customer may not be communicatively coupled with the DB subnet(s) 2530.

In other embodiments, the control plane VCN 2516 and the data plane VCN 2518 may not be directly communicatively coupled. In this embodiment, there may be no direct communication between the control plane VCN 2516 and the data plane VCN 2518. However, communication can occur indirectly through at least one method. An LPG 2510 may be established by the IaaS provider that can facilitate communication between the control plane VCN 2516 and the data plane VCN 2518. In another example, the control plane VCN 2516 or the data plane VCN 2518 can make a call to cloud services 2556 via the service gateway 2536. For example, a call to cloud services 2556 from the control plane VCN 2516 can include a request for a service that can communicate with the data plane VCN 2518.

FIG. 26 is a block diagram 2600 illustrating another example pattern of an IaaS architecture, according to at least one embodiment. Service operators 2602 (e.g., service operators 2302 of FIG. 23) can be communicatively coupled to a secure host tenancy 2604 (e.g., the secure host tenancy 2304 of FIG. 23) that can include a virtual cloud network (VCN) 2606 (e.g., the VCN 2306 of FIG. 23) and a secure host subnet 2608 (e.g., the secure host subnet 2308 of FIG. 23). The VCN 2606 can include an LPG 2610 (e.g., the LPG 2310 of FIG. 23) that can be communicatively coupled to an SSH VCN 2612 (e.g., the SSH VCN 2312 of FIG. 23) via an LPG 2610 contained in the SSH VCN 2612. The SSH VCN 2612 can include an SSH subnet 2614 (e.g., the SSH subnet 2314 of FIG. 23), and the SSH VCN 2612 can be communicatively coupled to a control plane VCN 2616 (e.g., the control plane VCN 2316 of FIG. 23) via an LPG 2610 contained in the control plane VCN 2616 and to a data plane VCN 2618 (e.g., the data plane 2318 of FIG. 23) via an LPG 2610 contained in the data plane VCN 2618. The control plane VCN 2616 and the data plane VCN 2618 can be contained in a service tenancy 2619 (e.g., the service tenancy 2319 of FIG. 23).

The control plane VCN 2616 can include a control plane DMZ tier 2620 (e.g., the control plane DMZ tier 2320 of FIG. 23) that can include LB subnet(s) 2622 (e.g., LB subnet(s) 2322 of FIG. 23), a control plane app tier 2624 (e.g., the control plane app tier 2324 of FIG. 23) that can include app subnet(s) 2626 (e.g., app subnet(s) 2326 of FIG. 23), a control plane data tier 2628 (e.g., the control plane data tier 2328 of FIG. 23) that can include DB subnet(s) 2630 (e.g., DB subnet(s) 2530 of FIG. 25). The LB subnet(s) 2622 contained in the control plane DMZ tier 2620 can be communicatively coupled to the app subnet(s) 2626 contained in the control plane app tier 2624 and to an Internet gateway 2634 (e.g., the Internet gateway 2334 of FIG. 23) that can be contained in the control plane VCN 2616, and the app subnet(s) 2626 can be communicatively coupled to the DB subnet(s) 2630 contained in the control plane data tier 2628 and to a service gateway 2636 (e.g., the service gateway of FIG. 23) and a network address translation (NAT) gateway 2638 (e.g., the NAT gateway 2338 of FIG. 23). The control plane VCN 2616 can include the service gateway 2636 and the NAT gateway 2638.

The data plane VCN 2618 can include a data plane app tier 2646 (e.g., the data plane app tier 2346 of FIG. 23), a data plane DMZ tier 2648 (e.g., the data plane DMZ tier 2348 of FIG. 23), and a data plane data tier 2650 (e.g., the data plane data tier 2350 of FIG. 23). The data plane DMZ tier 2648 can include LB subnet(s) 2622 that can be communicatively coupled to trusted app subnet(s) 2660 (e.g., trusted app subnet(s) 2560 of FIG. 25) and untrusted app subnet(s) 2662 (e.g., untrusted app subnet(s) 2562 of FIG. 25) of the data plane app tier 2646 and the Internet gateway 2634 contained in the data plane VCN 2618. The trusted app subnet(s) 2660 can be communicatively coupled to the service gateway 2636 contained in the data plane VCN 2618, the NAT gateway 2638 contained in the data plane VCN 2618, and DB subnet(s) 2630 contained in the data plane data tier 2650. The untrusted app subnet(s) 2662 can be communicatively coupled to the service gateway 2636 contained in the data plane VCN 2618 and DB subnet(s) 2630 contained in the data plane data tier 2650. The data plane data tier 2650 can include DB subnet(s) 2630 that can be communicatively coupled to the service gateway 2636 contained in the data plane VCN 2618.

The untrusted app subnet(s) 2662 can include primary VNICs 2664(1)-(N) that can be communicatively coupled to tenant virtual machines (VMs) 2666(1)-(N) residing within the untrusted app subnet(s) 2662. Each tenant VM 2666(1)-(N) can run code in a respective container 2667(1)-(N), and be communicatively coupled to an app subnet 2626 that can be contained in a data plane app tier 2646 that can be contained in a container egress VCN 2668. Respective secondary VNICs 2672(1)-(N) can facilitate communication between the untrusted app subnet(s) 2662 contained in the data plane VCN 2618 and the app subnet contained in the container egress VCN 2668. The container egress VCN can include a NAT gateway 2638 that can be communicatively coupled to public Internet 2654 (e.g., public Internet 2354 of FIG. 23).

The Internet gateway 2634 contained in the control plane VCN 2616 and contained in the data plane VCN 2618 can be communicatively coupled to a metadata management service 2652 (e.g., the metadata management system 2352 of FIG. 23) that can be communicatively coupled to public Internet 2654. Public Internet 2654 can be communicatively coupled to the NAT gateway 2638 contained in the control plane VCN 2616 and contained in the data plane VCN 2618. The service gateway 2636 contained in the control plane VCN 2616 and contained in the data plane VCN 2618 can be communicatively coupled to cloud services 2656.

In some examples, the pattern illustrated by the architecture of block diagram 2600 of FIG. 26 may be considered an exception to the pattern illustrated by the architecture of block diagram 2500 of FIG. 25 and may be desirable for a customer of the IaaS provider if the IaaS provider cannot directly communicate with the customer (e.g., a disconnected region). The respective containers 2667(1)-(N) that are contained in the VMs 2666(1)-(N) for each customer can be accessed in real-time by the customer. The containers 2667(1)-(N) may be configured to make calls to respective secondary VNICs 2672(1)-(N) contained in app subnet(s) 2626 of the data plane app tier 2646 that can be contained in the container egress VCN 2668. The secondary VNICs 2672(1)-(N) can transmit the calls to the NAT gateway 2638 that may transmit the calls to public Internet 2654. In this example, the containers 2667(1)-(N) that can be accessed in real-time by the customer can be isolated from the control plane VCN 2616 and can be isolated from other entities contained in the data plane VCN 2618. The containers 2667(1)-(N) may also be isolated from resources from other customers.

In other examples, the customer can use the containers 2667(1)-(N) to call cloud services 2656. In this example, the customer may run code in the containers 2667(1)-(N) that requests a service from cloud services 2656. The containers 2667(1)-(N) can transmit this request to the secondary VNICs 2672(1)-(N) that can transmit the request to the NAT gateway that can transmit the request to public Internet 2654. Public Internet 2654 can transmit the request to LB subnet(s) 2622 contained in the control plane VCN 2616 via the Internet gateway 2634. In response to determining the request is valid, the LB subnet(s) can transmit the request to app subnet(s) 2626 that can transmit the request to cloud services 2656 via the service gateway 2636.

It should be appreciated that IaaS architectures 2300, 2400, 2500, 2600 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 27:
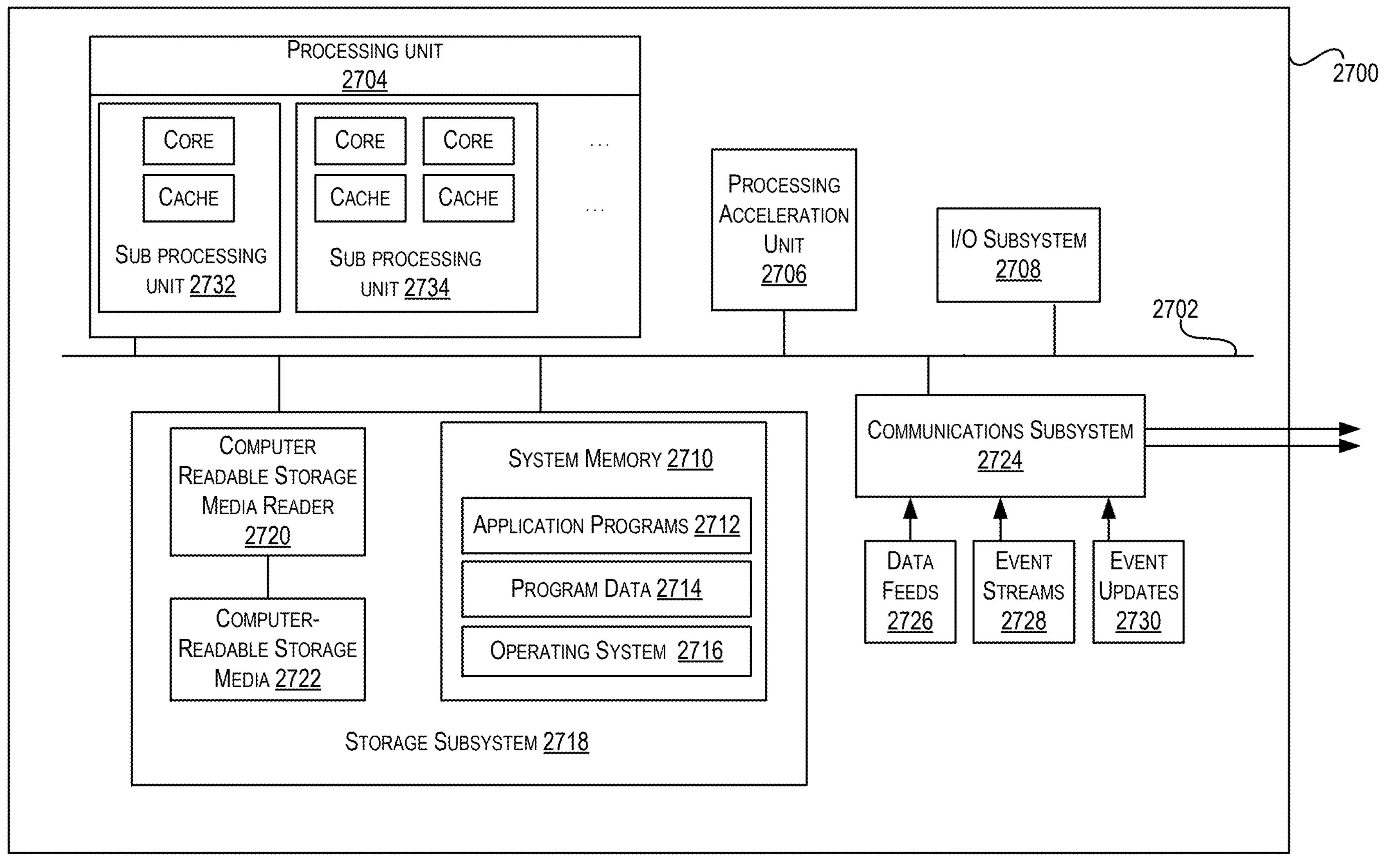
FIG. 27 is a block diagram illustrating an example computer system, according to at least one embodiment.

FIG. 27 illustrates an example computer system 2700, in which various embodiments may be implemented. The system 2700 may be used to implement any of the computer systems described above. As shown in the figure, computer system 2700 includes a processing unit 2704 that communicates with a number of peripheral subsystems via a bus subsystem 2702. These peripheral subsystems may include a processing acceleration unit 2706, an I/O subsystem 2708, a storage subsystem 2718 and a communications subsystem 2724. Storage subsystem 2718 includes tangible computer-readable storage media 2722 and a system memory 2710.

Bus subsystem 2702 provides a mechanism for letting the various components and subsystems of computer system 2700 communicate with each other as intended. Although bus subsystem 2702 is shown schematically as a single bus, alternative embodiments of the bus subsystem may utilize multiple buses. Bus subsystem 2702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2704, which can be implemented as one or more integrated circuits (e.g., a conventional microprocessor or microcontroller), controls the operation of computer system 2700. One or more processors may be included in processing unit 2704. These processors may include single core or multicore processors. In certain embodiments, processing unit 2704 may be implemented as one or more independent processing units 2732 and/or 2734 with single or multicore processors included in each processing unit. In other embodiments, processing unit 2704 may also be implemented as a quad-core processing unit formed by integrating two dual-core processors into a single chip.

In various embodiments, processing unit 2704 can execute a variety of programs in response to program code and can maintain multiple concurrently executing programs or processes. At any given time, some or all of the program code to be executed can be resident in processor(s) 2704 and/or in storage subsystem 2718. Through suitable programming, processor(s) 2704 can provide various functionalities described above. Computer system 2700 may additionally include a processing acceleration unit 2706, which can include a digital signal processor (DSP), a special-purpose processor, and/or the like.

I/O subsystem 2708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2700 may comprise a storage subsystem 2718 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 2704 provide the functionality described above. Storage subsystem 2718 may also provide a repository for storing data used in accordance with the present disclosure.

As depicted in the example in FIG. 27, storage subsystem 2718 can include various components including a system memory 2710, computer-readable storage media 2722, and a computer readable storage media reader 2720. System memory 2710 may store program instructions that are loadable and executable by processing unit 2704. System memory 2710 may also store data that is used during the execution of the instructions and/or data that is generated during the execution of the program instructions. Various different kinds of programs may be loaded into system memory 2710 including but not limited to client applications, Web browsers, mid-tier applications, relational database management systems (RDBMS), virtual machines, containers, etc.

System memory 2710 may also store an operating system 2716. Examples of operating system 2716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 2700 executes one or more virtual machines, the virtual machines along with their guest operating systems (GOSs) may be loaded into system memory 2710 and executed by one or more processors or cores of processing unit 2704.

System memory 2710 can come in different configurations depending upon the type of computer system 2700. For example, system memory 2710 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 2710 may include a basic input/output system (BIOS) containing basic routines that help to transfer information between elements within computer system 2700, such as during start-up.

Computer-readable storage media 2722 may represent remote, local, fixed, and/or removable storage devices plus storage media for temporarily and/or more permanently containing, storing, computer-readable information for use by computer system 2700 including instructions executable by processing unit 2704 of computer system 2700.

Computer-readable storage media 2722 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 2722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2722 may include, but is not limited to, Zip® drives, flash memory cards, universal serial bus (USB) flash drives, secure digital (SD) cards, DVD disks, digital video tape, and the like. Computer-readable storage media 2722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2700.

Machine-readable instructions executable by one or more processors or cores of processing unit 2704 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 2724 provides an interface to other computer systems and networks. Communications subsystem 2724 serves as an interface for receiving data from and transmitting data to other systems from computer system 2700. For example, communications subsystem 2724 may enable computer system 2700 to connect to one or more devices via the Internet. In some embodiments communications subsystem 2724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 2724 can provide wired network connectivity (e.g., Ethernet) in addition to or instead of a wireless interface.

In some embodiments, communications subsystem 2724 may also receive input communication in the form of structured and/or unstructured data feeds 2726, event streams 2728, event updates 2730, and the like on behalf of one or more users who may use computer system 2700.

By way of example, communications subsystem 2724 may be configured to receive data feeds 2726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2724 may also be configured to receive data in the form of continuous data streams, which may include event streams 2728 of real-time events and/or event updates 2730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2724 may also be configured to output the structured and/or unstructured data feeds 2726, event streams 2728, event updates 2730, and the like to one or more databases that may be in communication with one or more streaming data source computers coupled to computer system 2700.

Computer system 2700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:

obtaining, by a computing system, a first directed acyclic graph comprising a first plurality of edges and a first plurality of nodes corresponding to a plurality of levels, each node of the first plurality of nodes representing a release of a plurality of releases associated with bootstrapping a plurality of services of a data center, and each edge of the first plurality of edges representing a dependency between two releases of the plurality of releases;

generating, by the computing system, a second directed acyclic graph based at least in part on executing a clustering procedure on the first plurality of nodes of the first directed acyclic graph, the first plurality of nodes being clustered based at least in part on a respective level and a respective service associated with each of the first plurality of nodes;

generating, by the computing system, a third directed acyclic graph specific to a service of the plurality of services based at least in part on identifying nodes of the second directed acyclic graph that correspond to the service of the plurality of services; and generating, by the computing system and based at least in part on the third directed acyclic graph, at least one code segment of a service plan for bootstrapping the service within the data center.

2. The computer-implemented method of claim 1, wherein a set of nodes of the third directed acyclic graph individually correspond to a respective build milestone of a plurality of build milestones of the service plan.

3. The computer-implemented method of claim 2, further comprising generating a respective plurality of code segments corresponding to each build milestone of the plurality of build milestones.

4. The computer-implemented method of claim 1, wherein a plurality of edges of the third directed acyclic graph individually correspond to a respective execution unit of a plurality of execution units of the service plan.

5. The computer-implemented method of claim 4, further comprising generating a respective plurality of code segments corresponding to each execution unit of the plurality of execution units.

6. The computer-implemented method of claim 1, wherein the clustering procedure comprises, for each service of the plurality of services:

identifying a first node of a first level of the first directed acyclic graph, the first node being associated with a respective service;

identifying whether a second node exists that depends from the first node and that is associated with the respective service; and generating, for the second directed acyclic graph, a node to represent the first node and the second node, based at least in part on identifying that the second node exists.

7. The computer-implemented method of claim 1, further comprising associating a respective node of the second directed acyclic graph with a superset of publications produced by one or more releases associated with the respective node.

8. A computing device, comprising:

one or more processors; and one or more memories storing computer-executable instructions that, when executed by the one or more processors, cause the one or more processors to:

obtain a first directed acyclic graph comprising a first plurality of edges and a first plurality of nodes corresponding to a plurality of levels, each node of the first plurality of nodes representing a release of a plurality of releases associated with bootstrapping a plurality of services of a data center, and each edge of the first plurality of edges representing a dependency between two releases of the plurality of releases;

generate a second directed acyclic graph based at least in part on executing a clustering procedure on the first plurality of nodes of the first directed acyclic graph, the first plurality of nodes being clustered based at least in part on a respective level and a respective service associated with each of the first plurality of nodes;

generate a third directed acyclic graph specific to a service of the plurality of services based at least in part on identifying nodes of the second directed acyclic graph that correspond to the service of the plurality of services; and generate, based at least in part on the third directed acyclic graph, at least one code segment of a service plan for bootstrapping the service within the data center.

9. The computing device of claim 8, wherein a set of nodes of the third directed acyclic graph individually correspond to a respective build milestone of a plurality of build milestones of the service plan.

10. The computing device of claim 9, wherein executing the computer-executable instructions further causes the one or more processors to generate a respective plurality of code segments corresponding to each build milestone of the plurality of build milestones.

11. The computing device of claim 8, wherein a plurality of edges of the third directed acyclic graph individually correspond to a respective execution unit of a plurality of execution units of the service plan.

12. The computing device of claim 11, wherein executing the computer-executable instructions further causes the one or more processors to generate a respective plurality of code segments corresponding to each execution unit of the plurality of execution units.

13. The computing device of claim 8, wherein the clustering procedure comprises, for each service of the plurality of services:

identifying a first node of a first level of the first directed acyclic graph, the first node being associated with a respective service;

identifying whether a second node exists that depends from the first node and that is associated with the respective service; and generating, for the second directed acyclic graph, a node to represent the first node and the second node, based at least in part on identifying that the second node exists.

14. The computing device of claim 8, wherein executing the computer-executable instructions further causes the one or more processors to associate a respective node of the second directed acyclic graph with a superset of publications produced by one or more releases associated with the respective node.

15. A non-transitory computer-readable medium storing computer-executable instructions that, when executed by one or more processors, cause the one or more processors to:

obtain a first directed acyclic graph comprising a first plurality of edges and a first plurality of nodes corresponding to a plurality of levels, each node of the first plurality of nodes representing a release of a plurality of releases associated with bootstrapping a plurality of services of a data center, and each edge of the first plurality of edges representing a dependency between two releases of the plurality of releases;

generate a second directed acyclic graph based at least in part on executing a clustering procedure on the first plurality of nodes of the first directed acyclic graph, the first plurality of nodes being clustered based at least in part on a respective level and a respective service associated with each of the first plurality of nodes;

generate a third directed acyclic graph specific to a service of the plurality of services based at least in part on identifying nodes of the second directed acyclic graph that correspond to the service of the plurality of services; and generate, based at least in part on the third directed acyclic graph, at least one code segment of a service plan for bootstrapping the service within the data center.

16. The non-transitory computer-readable medium of claim 15, wherein a set of nodes of the third directed acyclic graph individually correspond to a respective build milestone of a plurality of build milestones of the service plan.

17. The non-transitory computer-readable medium of claim 16, wherein executing the computer-executable instructions further causes the one or more processors to generate a respective plurality of code segments corresponding to each build milestone of the plurality of build milestones.

18. The non-transitory computer-readable medium of claim 16, wherein a plurality of edges of the third directed acyclic graph individually correspond to a respective execution unit of a plurality of execution units of the service plan, and wherein executing the computer-executable instructions further causes the one or more processors to generate a respective plurality of code segments corresponding to each execution unit of the plurality of execution units.

19. The non-transitory computer-readable medium of claim 16, wherein the clustering procedure comprises, for each service of the plurality of services:

identifying a first node of a first level of the first directed acyclic graph, the first node being associated with a respective service;

identifying whether a second node exists that depends from the first node and that is associated with the respective service; and generating, for the second directed acyclic graph, a node to represent the first node and the second node, based at least in part on identifying that the second node exists.

20. The non-transitory computer-readable medium of claim 16, wherein executing the computer-executable instructions further causes the one or more processors to associate a respective node of the second directed acyclic graph with a superset of publications produced by one or more releases associated with the respective node.

* * * * *